US012799409B2

(12) United States Patent
Mountainland et al.

(10) Patent No.: US 12,799,409 B2
(45) Date of Patent: Nov. 17, 2026

(54) METHOD AND SYSTEM FOR INTRODUCING CATALYST PRECURSOR INTO HEAVY OIL USING PARALLEL MIXER LINES AND BYPASS LINE

(71) Applicant: HYDROCARBON TECHNOLOGY & INNOVATION, LLC, Lawrenceville, NJ (US)

(72) Inventors: David M. Mountainland, Princeton, NJ (US); Brett M. Silverman, Salt Lake City, UT (US); Everette Harris, Ivyland, PA (US); Paul Sadelski, Plainsboro Township, NJ (US)

(73) Assignee: HYDROCARBON TECHNOLOGY & INNOVATION, LLC, Lawrenceville, NJ (US)

( * ) Notice: Subject to any disclaimer, the term of this patent is extended or adjusted under 35 U.S.C. 154(b) by 177 days.

(21) Appl. No.: 18/200,455

(22) Filed: May 22, 2023

(65) Prior Publication Data

US 2023/0383198 A1 Nov. 30, 2023

Related U.S. Application Data

(60) Provisional application No. 63/346,107, filed on May 26, 2022.

(51) Int. Cl.
*C10G 49/00* (2006.01)
*B01J 27/04* (2006.01)
(Continued)

(52) U.S. Cl.
CPC .............. *C10G 49/02* (2013.01); *B01J 27/04* (2013.01); *B01J 35/40* (2024.01); *B01J 35/45* (2024.01);
(Continued)

(58) Field of Classification Search
CPC . B01J 27/04; B01J 35/40; B01J 35/45; C10G 75/00; C10G 49/02; C10G 47/26;
(Continued)

(56) References Cited

U.S. PATENT DOCUMENTS 2,850,552 A 9/1958 Ogle
3,019,180 A 1/1962 Schreiner et al.
(Continued)

FOREIGN PATENT DOCUMENTS

CA 2004882 A1 6/1991
CA 2088402 A1 7/1994
(Continued)

OTHER PUBLICATIONS

Etchells et al., Mixing in Pipelines, Handbook of Industrial Mixing, Chapter 7 (2003) (Year: 2003).*
(Continued)

*Primary Examiner* — Prem C Singh
*Assistant Examiner* — Brandi M Doyle
(74) *Attorney, Agent, or Firm* — Workman Nydegger

(57) ABSTRACT

System and method for mixing a catalyst precursor into heavy oil include parallel mixing lines configured to receive and mix a diluted precursor mixture (catalyst precursor premixed with a hydrocarbon diluent) with heavy oil to form a conditioned feedstock. One of the mixing lines can be periodically taken offline (e.g., for maintenance) while one or more remaining mixing lines continue to form conditioned feedstock. A bypass line maintains substantially continuous flow volume of heavy oil when one of the mixing lines is taken offline. Valves and flow meters can be used to regulate flow through the mixing lines and bypass line. The system permits virtually unlimited scaleup of the mixing process while permitting periodic maintenance of the system without taking it completely offline. Mixing a catalyst pre-
(Continued)

cursor into heavy oil forms colloidal-sized catalyst particles in situ having high catalytic activity that promote beneficial upgrading reactions when hydroprocessing heavy oil.

31 Claims, 13 Drawing Sheets

(51) Int. Cl.
*B01J 35/40* (2024.01)
*B01J 35/45* (2024.01)
*C10G 49/02* (2006.01)
*C10G 75/00* (2006.01)

(52) U.S. Cl.
CPC ..... *C10G 75/00* (2013.01); *C10G 2300/1044* (2013.01); *C10G 2300/4037* (2013.01); *C10G 2300/703* (2013.01); *C10G 2300/802* (2013.01)

(58) Field of Classification Search
CPC ........ C10G 2300/703; C10G 2300/802; C10G 2300/1044; C10G 2300/4037
See application file for complete search history.

(56) References Cited

U.S. PATENT DOCUMENTS

| | | | |
|---|---|---|---|
| 3,161,585 | A | 12/1964 | Gleim et al. |
| 3,254,017 | A | 5/1966 | Arey et al. |
| 3,267,021 | A | 8/1966 | Gould |
| 3,297,563 | A | 1/1967 | Doumani |
| 3,349,713 | A | 10/1967 | Fassbender |
| 3,362,972 | A | 1/1968 | Wallington |
| 3,578,690 | A | 5/1971 | Becker |
| 3,595,891 | A | 7/1971 | Cavitt |
| 3,622,497 | A | 11/1971 | Gleim |
| 3,622,498 | A | 11/1971 | Stolfa et al. |
| 3,694,351 | A | 9/1972 | White |
| 3,694,352 | A | 9/1972 | Gleim |
| 3,816,020 | A | 6/1974 | Ogles |
| 3,870,623 | A | 3/1975 | Johnson et al. |
| 3,892,389 | A | 7/1975 | Contastin |
| 3,915,842 | A | 10/1975 | Gatsis |
| 3,919,074 | A | 11/1975 | Gatsis |
| 3,953,362 | A | 4/1976 | Lines et al. |
| 3,983,028 | A | 9/1976 | Mccollum et al. |
| 3,992,285 | A | 11/1976 | Hutchings |
| 4,022,681 | A | 5/1977 | Sheng et al. |
| 4,066,530 | A | 1/1978 | Aldridge et al. |
| 4,066,561 | A | 1/1978 | Nnadi |
| 4,067,798 | A | 1/1978 | Hauschildt et al. |
| 4,067,799 | A | 1/1978 | Bearden et al. |
| 4,068,830 | A | 1/1978 | Gray |
| 4,077,867 | A | 3/1978 | Aldridge et al. |
| 4,083,803 | A | 4/1978 | Oswald et al. |
| 4,125,455 | A | 11/1978 | Herbstman |
| 4,134,825 | A | 1/1979 | Bearden et al. |
| 4,148,750 | A | 4/1979 | Pine |
| 4,151,070 | A | 4/1979 | Allan et al. |
| 4,169,038 | A | 9/1979 | Metrailer et al. |
| 4,178,227 | A | 12/1979 | Aldridge et al. |
| 4,181,601 | A | 1/1980 | Sze |
| 4,192,735 | A | 3/1980 | Aldridge et al. |
| 4,196,072 | A | 4/1980 | Aldridge et al. |
| 4,226,742 | A | 10/1980 | Bearden et al. |
| 4,252,634 | A | 2/1981 | Khulbe et al. |
| 4,271,323 | A | 6/1981 | Durand et al. |
| 4,285,804 | A | 8/1981 | Jacquin et al. |
| 4,298,454 | A | 11/1981 | Aldridge et al. |
| 4,305,808 | A | 12/1981 | Bowes et al. |
| 4,313,818 | A | 2/1982 | Aldridge et al. |
| 4,325,802 | A | 4/1982 | Porter et al. |
| 4,338,183 | A | 7/1982 | Gatsis |
| 4,352,729 | A | 10/1982 | Jacquin et al. |
| 4,370,221 | A | 1/1983 | Patmore et al. |
| 4,389,301 | A | 6/1983 | Dahlberg et al. |
| 4,411,768 | A | 10/1983 | Unger et al. |
| 4,420,008 | A | 12/1983 | Shu |
| 4,422,927 | A | 12/1983 | Kowalczyk et al. |
| 4,422,960 | A | 12/1983 | Shiroto et al. |
| 4,427,532 | A | 1/1984 | Varghese |
| 4,430,207 | A | 2/1984 | Kukes |
| 4,435,314 | A | 3/1984 | Van et al. |
| 4,452,265 | A | 6/1984 | Arne |
| 4,454,023 | A | 6/1984 | Lutz |
| 4,455,218 | A | 6/1984 | Dymock et al. |
| 4,465,630 | A | 8/1984 | Akashi et al. |
| 4,467,049 | A | 8/1984 | Yoshii et al. |
| 4,485,004 | A | 11/1984 | Fisher et al. |
| 4,485,008 | A | 11/1984 | Maa et al. |
| 4,508,616 | A | 4/1985 | Larrauri et al. |
| 4,513,098 | A | 4/1985 | Tsao |
| 4,525,267 | A | 6/1985 | Inooka |
| 4,551,230 | A | 11/1985 | Kukes et al. |
| 4,557,823 | A | 12/1985 | Kukes et al. |
| 4,557,824 | A | 12/1985 | Kukes et al. |
| 4,561,964 | A | 12/1985 | Singhal et al. |
| 4,564,441 | A | 1/1986 | Kukes et al. |
| 4,567,156 | A | 1/1986 | Bearden et al. |
| 4,568,657 | A | 2/1986 | Sepulveda et al. |
| 4,578,181 | A | 3/1986 | Derouane et al. |
| 4,579,646 | A | 4/1986 | Grosboll et al. |
| 4,581,344 | A | 4/1986 | Ledoux et al. |
| 4,582,432 | A | 4/1986 | Mehta |
| 4,585,545 | A | 4/1986 | Yancey et al. |
| 4,590,172 | A | 5/1986 | Isaacs |
| 4,592,827 | A | 6/1986 | Galiasso et al. |
| 4,592,830 | A | 6/1986 | Howell et al. |
| 4,606,809 | A | 8/1986 | Garg |
| 4,608,152 | A | 8/1986 | Howell et al. |
| 4,613,427 | A | 9/1986 | Sepulveda et al. |
| 4,614,726 | A | 9/1986 | Walters et al. |
| 4,626,340 | A | 12/1986 | Galiasso et al. |
| 4,633,001 | A | 12/1986 | Cells |
| 4,652,311 | A | 3/1987 | Gulla et al. |
| 4,652,647 | A | 3/1987 | Schlosberg et al. |
| 4,674,885 | A | 6/1987 | Erwin et al. |
| 4,676,886 | A | 6/1987 | Rahbe et al. |
| 4,678,557 | A | 7/1987 | Rodriguez et al. |
| 4,693,991 | A | 9/1987 | Bjornson et al. |
| 4,695,369 | A | 9/1987 | Garg et al. |
| 4,701,435 | A | 10/1987 | Garcia et al. |
| 4,707,245 | A | 11/1987 | Baldasarri et al. |
| 4,707,246 | A | 11/1987 | Gardner et al. |
| 4,710,486 | A | 12/1987 | Lopez et al. |
| 4,713,167 | A | 12/1987 | Reno et al. |
| 4,716,142 | A | 12/1987 | Laine et al. |
| 4,724,069 | A | 2/1988 | Aldag et al. |
| 4,734,186 | A | 3/1988 | Parrott et al. |
| 4,740,295 | A | 4/1988 | Bearden et al. |
| 4,746,419 | A | 5/1988 | Peck et al. |
| 4,762,607 | A | 8/1988 | Aldridge et al. |
| 4,762,812 | A | 8/1988 | Lopez et al. |
| 4,762,814 | A | 8/1988 | Parrott et al. |
| 4,764,266 | A | 8/1988 | Chen et al. |
| 4,765,882 | A | 8/1988 | Aldridge et al. |
| 4,770,764 | A | 9/1988 | Ohtake et al. |
| 4,772,378 | A | 9/1988 | Miyauchi et al. |
| 4,772,387 | A | 9/1988 | Simoni |
| 4,802,972 | A | 2/1989 | Kukes et al. |
| 4,808,007 | A | 2/1989 | King |
| 4,812,228 | A | 3/1989 | Angevine et al. |
| 4,824,611 | A | 4/1989 | Cells |
| 4,824,821 | A | 4/1989 | Lopez et al. |
| 4,834,865 | A | 5/1989 | Kukes et al. |
| 4,837,193 | A | 6/1989 | Akizuki et al. |
| 4,851,107 | A | 7/1989 | Kretschmar et al. |
| 4,851,109 | A | 7/1989 | Chen et al. |
| 4,857,496 | A | 8/1989 | Lopez et al. |
| 4,859,309 | A | 8/1989 | De Vries et al. |
| 4,863,887 | A | 9/1989 | Ohtake et al. |
| 4,883,582 | A | 11/1989 | Mc Cants |
| 4,959,140 | A | 9/1990 | Kukes et al. |

(56) References Cited

U.S. PATENT DOCUMENTS 4,963,247 A 10/1990 Belinko et al.
4,970,190 A 11/1990 Lopez et al.
4,983,273 A 1/1991 Kennedy et al.
4,983,558 A 1/1991 Born et al.
5,013,427 A 5/1991 Mosby et al.
5,017,535 A 5/1991 Schoonhoven et al.
5,017,712 A 5/1991 Usui et al.
5,038,392 A 8/1991 Morris et al.
5,039,392 A 8/1991 Bearden et al.
5,055,174 A 10/1991 Howell et al.
5,076,705 A * 12/1991 Brickhouse ........... F16K 15/033
366/337
5,094,991 A 3/1992 Lopez et al.
5,108,581 A 4/1992 Aldridge et al.
5,110,443 A 5/1992 Gregoli et al.
5,114,900 A 5/1992 King
5,134,108 A 7/1992 Thakur et al.
5,154,818 A 10/1992 Harandi et al.
5,162,282 A 11/1992 Lopez et al.
5,164,075 A 11/1992 Lopez
5,166,118 A 11/1992 Kretschmar et al.
5,171,916 A 12/1992 Le et al.
5,178,749 A 1/1993 Lopez et al.
5,191,131 A 3/1993 Takahata et al.
5,254,240 A 10/1993 Galiasso et al.
5,281,328 A 1/1994 Degnan et al.
5,320,500 A 6/1994 Cholet
5,332,709 A 7/1994 Nappier et al.
5,358,634 A 10/1994 Rankel
5,364,524 A 11/1994 Partridge et al.
5,372,705 A 12/1994 Bhattacharya et al.
5,374,348 A 12/1994 Sears et al.
5,409,595 A 4/1995 Harandi et al.
5,435,908 A 7/1995 Nelson et al.
5,452,954 A 9/1995 Handke et al.
5,460,714 A 10/1995 Fixari et al.
5,474,977 A 12/1995 Gatsis
5,578,197 A 11/1996 Cyr et al.
5,597,236 A 1/1997 Fasano
5,622,616 A 4/1997 Porter et al.
5,865,537 A 2/1999 Streiff et al.
5,866,501 A 2/1999 Pradhan et al.
5,868,923 A 2/1999 Porter et al.
5,871,638 A 2/1999 Pradhan et al.
5,913,324 A 6/1999 Signer
5,916,432 A 6/1999 Mcfarlane et al.
5,925,235 A 7/1999 Habib
5,932,090 A 8/1999 Marchionna et al.
5,935,419 A 8/1999 Khan et al.
5,954,945 A 9/1999 Cayton et al.
5,962,364 A 10/1999 Wilson et al.
5,972,202 A 10/1999 Benham et al.
6,004,453 A 12/1999 Benham et al.
6,059,957 A 5/2000 Khan et al.
6,068,758 A 5/2000 Strausz
6,086,749 A 7/2000 Kramer et al.
6,090,858 A 7/2000 El-Sayed
6,093,824 A 7/2000 Reichle et al.
6,136,179 A 10/2000 Sherwood et al.
6,139,723 A 10/2000 Pelrine et al.
6,190,542 B1 2/2001 Comolli et al.
6,214,195 B1 4/2001 Yadav et al.
6,217,746 B1 4/2001 Thakkar et al.
6,239,054 B1 5/2001 Shukis et al.
6,270,654 B1 8/2001 Colyar et al.
6,274,530 B1 8/2001 Cayton et al.
6,277,270 B1 8/2001 Morel et al.
6,342,224 B1 1/2002 Bruck et al.
6,379,532 B1 4/2002 Hoehn et al.
6,454,932 B1 9/2002 Baldassari et al.
6,455,594 B1 9/2002 Tsuji
6,462,095 B1 10/2002 Boensel et al.
6,550,960 B2 4/2003 Catalfamo et al.
6,596,155 B1 7/2003 Gates et al.
6,660,157 B2 12/2003 Que et al.
6,686,308 B2 2/2004 Mao et al.
6,698,197 B1 3/2004 Peterson
6,698,917 B2 3/2004 Etchells et al.
6,712,955 B1 3/2004 Hou et al.
6,783,661 B1 8/2004 Briot et al.
6,797,153 B1 9/2004 Fukuyama et al.
6,884,340 B1 4/2005 Bogdan
6,916,762 B2 7/2005 Shibuya et al.
7,011,807 B2 3/2006 Zhou et al.
7,090,767 B2 8/2006 Kaminsky et al.
7,285,698 B2 10/2007 Liu et al.
7,288,200 B1 10/2007 Hotier et al.
7,449,103 B2 11/2008 Lott et al.
7,517,446 B2 4/2009 Lott et al.
7,578,928 B2 8/2009 Lott et al.
7,815,870 B2 10/2010 Lott et al.
8,034,232 B2 10/2011 Lott et al.
8,142,645 B2 3/2012 Zhou et al.
8,303,082 B2 11/2012 Menzel et al.
8,309,041 B2 11/2012 Lott et al.
8,431,016 B2 4/2013 Lott et al.
8,440,071 B2 5/2013 Lott et al.
8,557,105 B2 10/2013 Lott et al.
8,673,130 B2 3/2014 Lott et al.
9,018,124 B2 4/2015 Mironov et al.
9,605,215 B2 3/2017 Lott et al.
2002/0179493 A1 12/2002 Etter
2003/0094400 A1 5/2003 Levy et al.
2003/0171207 A1 9/2003 Shih et al.
2004/0013601 A1 1/2004 Butz et al.
2004/0147618 A1 7/2004 Lee et al.
2005/0109674 A1 5/2005 Klein
2005/0241991 A1 11/2005 Lott et al.
2005/0241992 A1 11/2005 Lott et al.
2005/0241993 A1 11/2005 Lott et al.
2005/0258073 A1 11/2005 Oballa et al.
2005/0279670 A1 12/2005 Long et al.
2006/0060501 A1 3/2006 Gauthier et al.
2006/0079396 A1 4/2006 Saito
2006/0175229 A1 8/2006 Montanari et al.
2006/0201854 A1 9/2006 Lott
2006/0224000 A1 10/2006 Papp et al.
2006/0254956 A1 11/2006 Khan
2006/0289340 A1 12/2006 Brownscombe et al.
2007/0012595 A1 1/2007 Brownscombe et al.
2007/0029228 A1 2/2007 Aoki et al.
2007/0108100 A1 5/2007 Satchell
2007/0131587 A1 6/2007 Fukuyama et al.
2007/0138059 A1 6/2007 Farshid et al.
2007/0158236 A1 7/2007 Zhou et al.
2007/0158238 A1 7/2007 Wu et al.
2007/0158239 A1 7/2007 Satchell
2007/0163921 A1 7/2007 Keusenkothen et al.
2007/0175797 A1 8/2007 Iki et al.
2007/0209965 A1 9/2007 Duddy et al.
2009/0107881 A1* 4/2009 Lott ....................... C10G 65/10
422/140
2009/0152165 A1 6/2009 Etter
2009/0159505 A1 6/2009 Da et al.
2009/0173666 A1 7/2009 Zhou et al.
2009/0310435 A1 12/2009 Lott
2010/0065472 A1 3/2010 Chabot
2010/0122931 A1 5/2010 Zimmerman et al.
2010/0294701 A1 11/2010 Lott et al.
2011/0017637 A1 1/2011 Reynolds et al.
2011/0017641 A1 1/2011 Gupta et al.
2011/0163001 A1 7/2011 Lourenco et al.
2013/0068658 A1 3/2013 Lott et al.
2013/0075304 A1 3/2013 Chang
2013/0233765 A1 9/2013 Lott et al.
2014/0027344 A1 1/2014 Harris et al.
2014/0093433 A1 4/2014 Lott et al.
2017/0066978 A1 3/2017 Lott et al.
2017/0081599 A1 3/2017 Mountainland et al.
2017/0081600 A1 3/2017 Mountainland et al.

(56) References Cited

U.S. PATENT DOCUMENTS

FOREIGN PATENT DOCUMENTS

| | | | |
|---|---|---|---|
| CA | 2579528 | A1 | 9/2007 |
| CN | 1295112 | A | 5/2001 |
| CN | 2579528 | Y | 10/2003 |
| CN | 1966618 | A | 5/2007 |
| CN | 103228355 | A | 7/2013 |
| DE | 2324441 | A1 | 12/1973 |
| DE | 2315114 | A1 | 10/1974 |
| DE | 2421934 | A1 | 11/1974 |
| EP | 0199399 | A2 | 10/1986 |
| EP | 0546686 | A1 | 6/1993 |
| EP | 0559399 | A1 | 9/1993 |
| EP | 0732389 | A2 | 9/1996 |
| EP | 0753846 | A1 | 1/1997 |
| EP | 1043069 | A1 | 10/2000 |
| EP | 1753846 | A2 | 2/2007 |
| EP | 1893666 | A1 | 3/2008 |
| EP | 3369801 | A1 | 9/2018 |
| GB | 1047698 | A | 11/1966 |
| GB | 1412155 | A | 10/1975 |
| GB | 1455663 | A | 11/1976 |
| JP | 59-050276 | A | 6/1984 |
| JP | 59-108091 | A | 6/1984 |
| JP | 60-044587 | A | 3/1985 |
| JP | 61-195155 | A | 8/1986 |
| JP | 62-039634 | B1 | 8/1987 |
| JP | 63-027596 | A | 2/1988 |
| JP | 01-165692 | A | 6/1989 |
| JP | 05-501829 | A | 4/1993 |
| JP | 05-339357 | A | 12/1993 |
| JP | 06-009966 | A | 1/1994 |
| JP | 06-287574 | A | 10/1994 |
| JP | 06-346064 | A | 12/1994 |
| JP | 07-062355 | A | 3/1995 |
| JP | 07-090282 | A | 4/1995 |
| JP | 08-325580 | A | 12/1996 |
| JP | 2863858 | B2 | 3/1999 |
| JP | 2001-165692 | A | 6/2001 |
| JP | 2003-193074 | A | 7/2003 |
| JP | 2009-541499 | A | 11/2009 |
| JP | 2012-503072 | A | 2/2012 |
| WO | 92/00807 | A1 | 1/1992 |
| WO | 97/23582 | A1 | 7/1997 |
| WO | 97/34967 | A1 | 9/1997 |
| WO | 00/75336 | A2 | 12/2000 |
| WO | 01/01408 | A1 | 1/2001 |
| WO | 01/41799 | A1 | 6/2001 |
| WO | 2005/104749 | A2 | 11/2005 |
| WO | 2005/104752 | A2 | 11/2005 |
| WO | 2006/116913 | A1 | 11/2006 |
| WO | 2006/132671 | A1 | 12/2006 |
| WO | 2007/078622 | A2 | 7/2007 |
| WO | 2007/106783 | A2 | 9/2007 |
| WO | 2009/058785 | A2 | 5/2009 |
| WO | 2010/033487 | A2 | 3/2010 |

OTHER PUBLICATIONS

Levitronix, Redundancy with Levitronix Pump Systems, PR2400-05 Rev01 (2005) (Year: 2005).*
European Search Report received for EP Patent Application No. 05739913.1, mailed on Nov. 12, 2010, 4 pages.
European Search Report received for EP Patent Application No. 05772351, mailed on Nov. 12, 2010, 4 pages.
European Search Report received for EP Patent Application No. 07758375, mailed on Mar. 15, 2011, 2 pages.
European Search Report received for EP Patent Application No. 10174815, mailed on Nov. 12, 2010, 6 pages.
European Search Report received for EP Patent Application No. 13176119.9, mailed on Aug. 23, 2013, 3 pages.
European Search Report received for EP Patent Application No. 14171296, mailed on Nov. 11, 2014, 2 pages.
European Search Report received for EP Patent Application No. 14171297.6, mailed on Nov. 18, 2014, 04 pages.
International Preliminary Report on Patentability received for PCT Patent Application No. PCT/US05/014411, mailed on Nov. 1, 2006, 6 pages.
International Preliminary Report on Patentability received for PCT Patent Application No. PCT/US05/014435, mailed on Nov. 1, 2006, 8 pages.
International Preliminary Report on Patentability received for PCT Patent Application No. PCT/US07/063819, mailed on Sep. 16, 2008, 6 pages.
International Search Report and Written Opinion received for PCT Patent Application No. PCT/US23/23398, mailed on Aug. 21, 2023, 12 pages.
International Search Report and Written Opinion received for PCT Patent Application No. PCT/US05/014411, mailed on Nov. 15, 2005, 7 pages.
International Search Report and Written Opinion received for PCT Patent Application No. PCT/US05/014435, mailed on Feb. 14, 2006, 8 pages.
International Search Report and Written Opinion received for PCT Patent Application No. PCT/US07/063819, mailed on Oct. 1, 2007, 7 pages.
Panariti et al., "Petroleum residue upgrading with dispersed catalysts Part 1. Catalysts activity and sensitivity", Mar. 31, 2000, pp. 203-213.
Aspen Hydrocracke(Trademark): A simulation system for monitoring, planning and optimizing hydrocracking and hydrotreating units, www.aspentec.com/brochures/hydrocracker.pdf (2001).
ChemBioFinder.com, Scientific Database Gateway, Molecular Profile Report for cobalt benzoate, at least as early as Sep. 10, 2010.
Criterion: Hydrocracking Process Description and CRITERION/CEOLYST Hydrocracking Catalyst Applications, www.criterioncatalysts.com (2001).
Database CA [on line] Chemical Abstracts Service retrieved from STN Database accession No. 1991:42412.
Del Bianco et al. "Upgrading Heavy Oil Using Slurry Processes" Chemtech, Nov. 30, 1995 (Nov. 30, 1995), pp. 35-43.
Ex Parte Quayle Action received for U.S. Appl. No. 11/374,369, mailed on Sep. 21, 2020, 5 pages.
Hydrocracking of Liaohe Vacuum Residue With Bimeta:, Shen et al., Preprints of Symposia—American Chemical society, Division of Fuel Chemistry (1998), 43(3), 481-485, OCDEN: Psadfz, 1998,XP009117504.
Hyvahl, Significantly Improved RFCC Performance or Low Sulfur Fuel Oils via Residue Hydrotreatment Axens IPF Group Technologies, pp. 1,2; (Jan. 2003).
Lee, Sunggyu et al., Handook of Alternative Fuel Technologies, 2007, pp. 187-188.
Lewis, Richard J., Hawley's Condensed Chemical Dictionary, 15 Edition, 2007, p. 321.
Lott et al.: "(HC)3 Process—A Slurry Hydrocracking Technology Designed to Convert Bottoms of Heavy Oils" 7th UNITAR International Conference of Heavy Crude and Tar Sands, Beijing, Oct. 27, 1998 (Oct. 27, 1998) pp. 1-8.
McFarlane et al. "Dispersion and Activity of Inorganic Catalyst Precursor in Heavy Oil" Boston Congress ACS Energy and Fuel Diversification, p. 496, Aug. 31, 1998.
N. Panariti et al.: "Petroleum Residue Upgrading with Dispered Catalysts Part 1. Catalysts Activity and Selctivity" Applied Catalysts A: General, vol. 204, Mar. 31, 2000 pp. 203-213.
OCR Moving Bed Technology for the Future, pp. 1-2 (at least as early as 2004).
Panariti et al., "Petroleum residue upgrading with dispersed catalysts Part2. Effect of operating conditions", Mar. 31, 2000, pp. 215-222.
Papaioannou et al., "Alkali-Metal- and Alkaline-Earth-Promoted Catalysts from Coal Liquefaction Applicatoins", Energy & Fuels, vol. 4, No. 1, pp. 38-42 (1990).
Plain et al., "Options for Resid Conversion", Axens IFP Group Technologies, pp. 1-10 (at least as early as 2004).

(56) References Cited

OTHER PUBLICATIONS

Santori, R., et al., “Eni Slurry Technology: A Technology to Convert the Bottom of the Barrel to Transportation Fuels”, 3rd Bottom of the Barrell Technology Conference & Exhibition (Oct. 2004).
Seader et al., “Perry’s Chemical Engineers’ Handbook”, 7th Edition, Section 13—Distillation, 1997, 13-25.
U.S. Appl. filed Apr. 19, 2013, Lott et al., U.S. Appl. No. 13/866,220.
U.S. Appl. filed Dec. 3, 2013, Lott et al., U.S. Appl. No. 14/095,698.
U.S. Appl. filed May 23, 2011, Lott et al., U.S. Appl. No. 13/113,722.
U.S. Application filed Apr. 19, 2013, by Lott et al., U.S. Appl. No. 13/865,726.
U.S. Application filed Apr. 19, 2013, by Lott et al., U.S. Appl. No. 13/866,220.
U.S. Application filed Jul. 30, 2012, by Harris et al., U.S. Appl. No. 13/561,479.
U.S. Application filed Sep. 7, 2016, by Mountainland et al., U.S. Appl. No. 15/258,653.
U.S. Application filed Sep. 7, 2016, by Mountainland et al., U.S. Appl. No. 15/258,706.
U.S. Patent Application filed Apr. 19, 2013, by Lott et al., U.S. Appl. No. 13/865,726.
U.S. Patent Application filed Aug. 26, 2015 by Harris et al., U.S. Appl. No. 14/836,792.
U.S. Patent Application filed Jul. 30, 2012, by Harris et al., U.S. Appl. No. 13/561,479.
U.S. Patent Application filed Jun. 6, 2017, by Mountainland et al., U.S. Appl. No. 15/615,574.
U.S. Patent Application filed May 23, 2011, by Lott et al., U.S. Appl. No. 13/113,722.
US. Appl. filed May 26, 2011, Lott et al., U.S. Appl. No. 13/116,195.
International Preliminary Report on Patentability received for PCT Patent Application No. PCT/US2023/023398, mailed on Dec. 5, 2024, 8 pages.

* cited by examiner

METHOD AND SYSTEM FOR INTRODUCING CATALYST PRECURSOR INTO HEAVY OIL USING PARALLEL MIXER LINES AND BYPASS LINE

CROSS REFERENCE TO RELATED APPLICATION

This Application claims the benefit of U.S. Provisional Application No. 63/346,107, filed May 26, 2022, which is incorporated by reference in its entirety.

BACKGROUND OF THE INVENTION

1. The Field of the Invention

The invention relates to methods and systems for mixing a catalyst precursor into a heavy oil feedstock prior to hydroprocessing.

2. The Relevant Technology

Converting heavy oil into useful end products involves extensive processing, such as reducing the boiling point of the heavy oil, increasing the hydrogen-to-carbon ratio, and removing impurities such as metals, sulfur, nitrogen, and coke precursors. Examples of hydrocracking processes using conventional heterogeneous catalysts to upgrade atmospheric tower bottoms and/or vacuum tower bottoms include fixed-bed hydroprocessing, ebullated-bed hydroprocessing, and moving-bed hydroprocessing. Hydrocracking can also be performed using a homogeneous catalyst in a slurry bed reactor. Noncatalytic upgrading processes for upgrading vacuum tower bottoms include thermal cracking, such as delayed coking, flexicoking, visbreaking, and solvent extraction.

There is an ever-increasing demand to more efficiently utilize low-quality heavy oil feedstocks and extract fuel values therefrom. Low quality feedstocks are characterized as including relatively high quantities of hydrocarbons that nominally boil at or above 524° C. (975° F.). They also contain relatively high concentrations of asphaltenes, sulfur, nitrogen and metals. High boiling fractions derived from these low-quality feedstocks typically have a high molecular weight (often indicated by higher density and viscosity) and/or low hydrogen/carbon ratio, which is related to the presence of high concentrations of undesirable components, including asphaltenes and carbon residue. Asphaltenes and carbon residue are difficult to process and commonly cause fouling of conventional catalysts and hydroconversion equipment because they contribute to the formation of coke and sediment.

Low quality heavy oil feedstocks contain high concentrations of asphaltenes, carbon residue, sulfur, nitrogen, and metals. Examples include heavy crude, oil sands bitumen, and residuum left over from conventional refinery process. Residuum (or "resid") can refer to atmospheric tower bottoms and vacuum tower bottoms. Atmospheric tower bottoms can have a boiling point of at least 343° C. (650° F.) although it is understood that the cut point can vary among refineries and be as high as 380° C. (716° F.). Vacuum tower bottoms (also known as "resid pitch" or "vacuum residue") can have a boiling point of at least 524° C. (975° F.), although it is understood that the cut point can vary among refineries and be as high as 538° C. (1000° F.) or even 565° C. (1050° F.).

By way of comparison, Alberta light crude contains about 9 vol % vacuum residue, while Lloydminster heavy oil contains about 41 vol % vacuum residue, Cold Lake bitumen contains about 50 vol % vacuum residue, and Athabasca bitumen contains about 51 vol % vacuum residue. As a further comparison, a relatively light oil such as Dansk Blend from the North Sea region only contains about 15 vol % vacuum residue, while a lower-quality European oil such as Ural contains more than 30 vol % vacuum residue, and an oil such as Arab Medium is even higher, with about 40 vol % vacuum residue.

In a given ebullated bed system, the rate of production of converted products is often limited by fouling. When attempts are made to increase the production of converted products beyond a certain practical limit, the rate of fouling of mixers, heat exchangers, strainers, and other process equipment becomes too rapid, requiring more frequent shutdowns for maintenance and cleaning. A refinery operator typically relates the observed rate of equipment fouling to measurements of sediment production and arrives at an operating sediment limit, above which the refinery will avoid operating the ebullated bed hydrocracker. Thus, sediment production and equipment fouling place practical upper limits on conversion and the rate of production of converted products. Such problems are exacerbated when using lower quality heavy oil feedstocks.

Ebullated bed reactors that utilize a dual catalyst system comprised of a heterogeneous catalyst and a highly dispersed (e.g., colloidal or molecular) metal sulfide catalyst have been used to reduce equipment fouling and/or permit an increase in the rate of production of converted products. The success or failure of the dual catalyst system depends on several variables, including the ability to disperse a catalyst precursor into the heavy oil without causing or allowing it to thermally decompose prematurely. Unless the catalyst precursor is adequately dispersed in the heavy oil prior to thermal decomposition, the resulting dispersed metal sulfide catalyst particles formed within the heavy oil feedstock will have low catalytic activity and may actually cause more equipment fouling, thus negating its effectiveness.

For example, U.S. Pat. No. 5,372,705 to Bhattacharya et al. ("Bhattacharya") discloses a dual catalyst system comprising a porous supported catalyst and an oil soluble catalyst, such as metal salts of aliphatic carboxylic acids. However, Bhattacharya teaches that such dual catalyst systems actually caused more plugging and equipment fouling, requiring mitigation by using 5-20% by weight of an aromatic heavy oil additive, such as heavy cycle gas oil (HCGO), in order for the dual catalyst systems to work properly and not increase equipment fouling. The use of HCGO was required due to the apparent failure of Bhattacharya to understand the importance of thoroughly mixing the oil soluble catalyst into the heavy oil feed prior to thermal decomposition, as evidenced by the lack of any meaningful teaching of a mixing system that would ensure thorough mixing of the oil soluble catalyst into the heavy oil feedstock. Also, calling it a "catalyst" rather than "catalyst precursor" suggests that thermal decomposition was not considered by Bhattacharya to be an issue.

U.S. Pub. No. 2005/0241991 A1 to Lott et al. ("Lott") discloses a dual catalyst system comprising a porous supported catalyst and a colloidal or molecular catalyst formed in situ within the heavy oil feedstock using an oil soluble catalyst precursor through proper mixing prior to thermal decomposition. The Examples in Lott used between 100-300 ppm of colloidal or molecular molybdenum sulfide catalyst to achieve the beneficial results. Lott teaches that the colloidal or molecular catalyst preferentially associates with asphaltene molecules, which are difficult to hydrocrack using the porous supported catalyst because size exclusion inhibits diffusion of asphaltene molecules into the catalyst pores. Lott teaches that association of the colloidal or molecular molybdenum sulfide catalyst with asphaltene molecules beneficially increases conversion of asphaltenes compared to using the porous supported catalyst by itself.

Existing methods and systems for introducing a catalyst precursor into heavy oil may not be scalable to accommodate larger hydroprocessing reactors. Another problem is that mixing systems often require periodic maintenance to resolve issues such as plugging of static in-line mixers, solids buildup in strainers, and leaking of seals in high shear mixers. During maintenance, the entire hydroprocessing system must be shut down or at least be operated using only the heterogeneous catalyst without the dispersed metal sulfide catalyst.

Thus, there remains a need to more efficiently and effectively blend a catalyst precursor into heavy oil that address existing problems that impede proper mixing.

SUMMARY

Disclosed herein are methods and systems for efficiently mixing a catalyst precursor into a heavy oil feedstock to form a conditioned feedstock preparatory to hydroprocessing the heavy oil using one or more hydroprocessing reactors. Mixing a catalyst precursor into the heavy oil feedstock forms dispersed metal sulfide catalyst particles in situ having high catalytic activity that promote beneficial upgrading reactions when hydroprocessing heavy oil.

The methods and systems employ multiple parallel mixing lines that can be scaled up for virtually any size hydroprocessing reactor and a bypass line to maintain substantially constant flow volume of feedstock to the hydroprocessing reactor(s) in the event one of the mixing lines is taken offline, such as for periodic cleaning and maintenance. In a preferred embodiment, the multiple parallel mixers can be operated with symmetrical distribution of heavy oil feedstock during normal operation. The bypass line is used to maintain flow through each online mixer within its design capacity when another mixer is offline for required maintenance. In addition, the inventive system includes flow control devices that can be used to adjust flow to the operating mixer (or mixers) during maintenance, and flow meters to ensure that the required flow is maintained through the remaining online mixing line(s) and bypass line.

The disclosed systems and methods allow for smaller, cost-efficient, commercially proven mixing equipment to be utilized, while ensuring the injection of the dispersed catalyst precursor is maintained and a high level of process performance is correspondingly sustained.

An example method for mixing a catalyst precursor into heavy oil comprises:

(1) blending a quantity of catalyst precursor with a quantity of diluent to form a diluted precursor mixture;
(2) mixing the diluted precursor mixture with a heavy oil feedstock using a plurality of parallel mixing lines to form a plurality of conditioned feedstock streams, each parallel mixing line including one or more mixers and at least one valve for regulating flow in the mixing line;
(3) combining the conditioned feedstock streams in a common discharge line downstream from the parallel mixing lines to form a common conditioned feedstock stream;
(4) stopping flow through a mixing line and causing or allowing a portion of the heavy oil feedstock to enter a bypass line, bypass the parallel mixing lines, and combine with the common conditioned feedstock stream in the common discharge line; and
(5) while the portion of the heavy oil feedstock is passing through the bypass line, continuing to mix at least a portion of the diluted precursor mixture with a remaining portion of the heavy oil feedstock using at least one other of the parallel mixing lines.

An example system for mixing a catalyst precursor into heavy oil comprises:

(1) at least one mixer configured to receive and blend a quantity of catalyst precursor with a quantity of diluent to form a diluted precursor mixture;
(2) a plurality of parallel mixing lines configured to receive and mix the diluted precursor mixture with a heavy oil feedstock to form a plurality of conditioned feedstock streams, each parallel mixing line including one or more mixers and at least one valve for regulating flow in the mixing line;
(3) a common discharge line configured to receive and combine the conditioned feedstock streams from the parallel mixing lines to form a common conditioned feedstock stream; and
(4) a bypass line configured to receive a portion of the heavy oil feedstock upon closing and stopping flow through at least one of the parallel mixing lines, cause the portion of the heavy oil feedstock to bypass the parallel mixing lines, and combine the bypassed portion of the heavy oil feedstock with the common conditioned feedstock stream in the common discharge line,
(5) wherein the system is configured so that when one of the mixing lines is closed and the portion of the heavy oil feedstock is passed through the bypass line, a remaining portion of the heavy feedstock continues to be mixed with the diluted precursor mixture by at least one other of the parallel mixing lines.

The parallel mixing lines include two or more parallel mixing lines. In some embodiments, the methods and systems can include two, three, four or more parallel mixing lines. In some embodiments, each mixing line includes a high shear mixer and optionally at least one other mixer, such as a static inline mixer. One or more filters (e.g., at least one strainer) can be positioned along the mixing line, typically before the high shear mixer. Other filtering apparatus and auxiliary devices known in the art may also be included in the mixing line, if desired. A pre-mixer zone, such as one or more static inline mixers, can be located on the heavy oil feed line upstream from where the parallel mixing lines split.

In some embodiments, flow through the plurality of mixing lines can be controlled by one or more valves associated with each mixing line. For example, each mixing line can include a first valve upstream from the first mixer and a second valve downstream from the last mixer. Closing the valves isolates the mixing line to permit maintenance and cleaning without pressurized hydrocarbons entering the mixing line from one or more other mixing lines.

In order to cause a portion of the heavy oil feedstock to enter the bypass line, bypass the parallel mixing lines, and enter the common discharge line, one or more valves associated with one or more operating parallel mixing lines and/or the common discharge line can be partially closed to restrict flow, which reduces pressure downstream from the valve(s) and increases pressure upstream from the valve.

The pressure change caused by partially closing the valve in the discharge lines of the one or more operating parallel mixing lines and/or the common discharge line increases upstream pressure, which causes a portion of the higher pressure heavy oil feedstock upstream of the parallel mixing lines to flow through the bypass line. The bypass line may also include one or more valves to help control and regulate the quantity and/or ratio of heavy oil flowing through the bypass line and the operating mixing line(s).

In some embodiments, when one of the mixing lines is closed, the same or similar quantity of diluted precursor mixture can be mixed with the remaining quantity of heavy oil feedstock in order to maintain the same quantity and/or rate of catalyst precursor flowing through the system. In some embodiments, the flow of heavy oil and diluted precursor mixture through the one or more remaining operational mixing lines can be temporarily increased to account for the reduction in flow caused by closing one of the mixing lines. While mixing efficiency may be reduced somewhat when one of the mixing lines is offline for maintenance, such effect is minimal and more than offset by the other benefits provided by the inventive methods and systems disclosed herein. Closing one of a plurality of parallel mixing lines is far preferable to stopping the mixing of catalyst precursor into the heavy oil feed altogether when performing periodic maintenance on a mixing system that includes a single mixing line.

To assist in adjusting and balancing flow rates through the parallel mixing lines, the common discharge line, and the bypass line, at least the common discharge line and the bypass line can include a flow meter. The parallel mixing lines may each optionally include a flow meter for more precise metering and control of flow rate through the various lines in the mixing system. One or more valves in the system may be opened and/or closed to regulate the flow rate of material through the various lines in response to information obtained from the flow meters. The valves are configured to be adjusted manually and/or automatically to adjust and balance flow rates.

The mixing system may further comprise a surge tank configured to receive the common conditioned feedstock stream from the common discharge line and any heavy oil feedstock from the bypass line. The surge tank helps to even out the flow of material through the hydroprocessing system when there are variations in flow rates between mixing system and hydroprocessing reactors and other processing equipment downstream from the mixing system. The surge tank also causes or permits additional diffusion and mixing of the catalyst precursor throughout the heavy oil feedstock prior to heating the conditioned feedstock to thermally decompose the catalyst precursor and form dispersed metal sulfide catalyst particles in situ within the heavy oil feedstock.

In some embodiments, a portion of the heavy oil feedstock can be used as diluent to form the diluted precursor mixture. In preferred embodiments, the heavy oil feedstock, when used as diluent, is used together with one or more other hydrocarbon diluents that remain flowable at lower temperatures (e.g., vacuum gas oil, atmospheric gas oil, decant oil, or cycle oil) in order to avoid premature decomposition of the catalyst precursor. The heavy oil feedstock or a feedstock-diluent mixture can advantageously be passed through a heat exchanger to reduce its temperature prior to being mixed with the catalyst precursor.

In some embodiments, a portion of the conditioned feedstock can be used as diluent to form the diluted precursor mixture. In preferred embodiments, the conditioned feedstock, when used as diluent, is used together with one or more other hydrocarbon diluents that remain flowable at lower temperatures in order to avoid premature decomposition of the catalyst precursor. The conditioned feedstock or conditioned feedstock-diluent mixture can advantageously be passed through a heat exchanger to reduce its temperature before being mixed with the catalyst precursor.

Examples of suitable hydrocarbon diluents include, but are not limited to, vacuum gas oil (which typically has a nominal boiling range of 360-524° C.) (680-975° F.), decant oil or cycle oil (which typically has a nominal boiling range of 360°-550° C.) (680-1022° F.), and atmospheric gas oil (which typically has a nominal boiling range of 200°-360° C.) (392-680° F.), a portion of the heavy oil feedstock or conditioned feedstock, and other hydrocarbons that nominally boil at a temperature higher than about 200° C.

The catalyst precursor is preferably oil-soluble and has a decomposition temperature in a range from about 100° C. (212° F.) to about 350° C. (662° F.), or in a range of about 150° C. (302° F.) to about 300° C. (572° F.), or in a range of about 175° C. (347° F.) to about 250° C. (482° F.). Example catalyst precursors include organometallic complexes or compounds, more specifically oil soluble compounds or complexes of transition metals and organic acids, having a decomposition temperature or range high enough to avoid substantial decomposition when mixed with a heavy oil feedstock under suitable mixing conditions. When mixing the catalyst precursor with a hydrocarbon oil diluent, it is advantageous to maintain the diluent at a temperature below which significant decomposition of the catalyst precursor occurs. One skilled in the art can select a mixing temperature profile that results in intimate mixing of a selected precursor composition without substantial decomposition prior to formation of the dispersed metal sulfide catalyst particles in situ In some embodiments, the common conditioned feedstock stream can be passed through a heater to decompose at least a portion of the catalyst precursor and form dispersed metal sulfide catalyst particles in situ within the heavy oil feedstock prior to entering the hydroprocessing reactor. For example, conditioned feedstock can be removed from the surge tank and passed through a heater. Alternatively, or in addition, at least a portion of the conditioned feedstock can be heated within the hydroprocessing reactor itself to decompose at least a portion of the catalyst precursor and form dispersed metal sulfide catalyst particles in situ within the heavy oil feedstock. It has been found that preheating the conditioned feedstock upstream from the hydroprocessing reactor yields a more active dispersed catalyst.

In some embodiments, the dispersed metal sulfide catalyst particles are less than 1 μm in size, or less than about 500 nm in size, or less than about 250 nm in size, or less than about 100 nm in size, or less than about 50 nm in size, or less than about 25 nm in size, or less than about 10 nm in size, or less than about 5 nm in size.

In some embodiments, the heavy oil feedstock with the in situ formed dispersed metal sulfide catalyst particles can be hydroprocessed at hydroprocessing conditions, wherein the dispersed metal sulfide catalyst particles promote beneficial hydrogenation and other upgrading reactions in the presence of heat and hydrogen. Hydroprocessing can be performed by one or more hydroprocessing reactors selected from slurry phase reactors, ebullated bed reactors, and fixed bed reactors.

For example, hydroprocessing of the heavy oil can be performed using one or more ebullated bed reactors that utilize the dispersed metal sulfide catalyst particles in combination with a heterogenous ebullated bed catalyst to produce the upgraded heavy oil. Instead of or in addition to the one or more ebullated bed reactors, hydroprocessing of the heavy oil can be performed using one or more slurry phase reactors that utilize the dispersed metal sulfide catalyst particles as the sole catalyst or in combination with a conventional slurry catalyst, and/or one or more fixed bed reactors that utilize the dispersed metal sulfide catalyst particles in combination with a heterogenous fixed bed catalyst.

Following hydroprocessing of the heavy oil, the upgraded heavy oil can be separated into one or more lower boiling hydrocarbon fractions and one or more liquid hydrocarbon fractions. For example, the upgraded heavy oil can be separated using one or more hot separation units, an interstage separator that induces a pressure drop, an atmospheric distillation tower, or a vacuum distillation tower.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings, in which.

DETAILED DESCRIPTION OF THE PREFERRED EMBODIMENTS

I. Introduction

Figure 1:
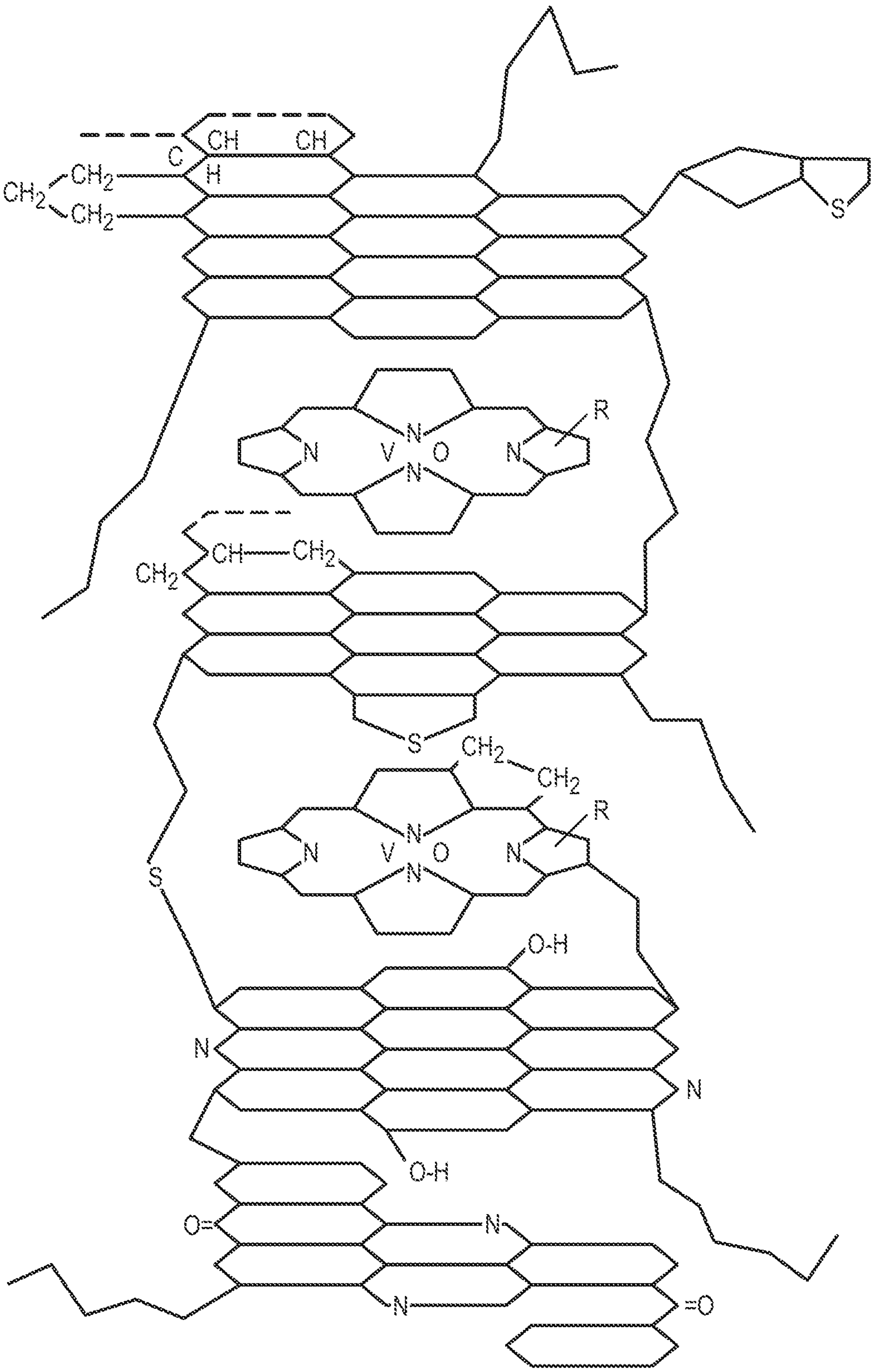
FIG. 1 depicts a hypothetical molecular structure of asphaltene.

Disclosed herein are methods and systems for mixing a catalyst precursor into a heavy oil feedstock preparatory to hydroprocessing the heavy oil. The disclosed mixing methods and systems can be scaled up to accommodate differently sized hydroprocessing reactors and provide the ability to perform maintenance on a mixing line without shutting down the entire mixing system. This is accomplished by means of multiple parallel mixing lines and a bypass line that permits a mixing line to be closed and taken offline for maintenance while the bypass line continues to provide the system with a substantially constant flow of heavy oil for hydroprocessing.

The disclosed mixing methods and systems provide efficient mixing of a dispersed catalyst precursor for hydroconversion units, such as ebullated bed units, fixed bed units, or slurry reactor units. The process is especially suitable for use in large hydroconversion units, which may be designed as single trains or as multiple trains, where the large capacity of the hydroconversion unit makes it difficult to provide a single mixing system for a dispersed catalyst precursor. To address this difficulty, the inventive methods and systems include two or more parallel mixing lines, each equipped with a high shear mixing apparatus of conventional size and design.

In addition to providing a means of using conventional mixing equipment for high capacity hydroconversion units, the present invention has the further advantage of facilitating periodic maintenance of mixing equipment without interrupting the mixing of catalyst precursor into the heavy oil feedstock. This is achieved by providing a bypass line for the mixing system, allowing a portion of the heavy oil feedstock for the hydroconversion unit to bypass the mixing system when a mixing line is offline for maintenance, with the balance of the heavy oil feedstock being processed by the remaining online mixing line(s) with no interruption of the mixing of the catalyst precursor into heavy oil.

As a further feature of the inventive mixing methods and systems, each parallel mixing line can be equipped with one or more flow control devices. The common discharge line that receives and combines the conditioned feedstock streams from the individual mixing lines can also include a flow control device. The operation of one or more flow control devices can be advantageous or critical for maintaining proper balance of flow between the remaining online mixing line(s) and the bypass line during maintenance intervals. At least one flow control device is located downstream of the online high-shear mixer(s), such as in each parallel mixing line and/or in the common discharge line, and may be a manual valve, an automatic control valve, or the like. During a maintenance operation, one or more flow control devices are used to partially restrict the discharge flow from the online high-shear mixer(s), thereby causing or allowing a desired portion of the heavy oil feedstock to instead flow through the bypass line. In the absence of such required flow control device(s), the online high-shear mixer (s) can generate sufficient positive discharge pressure such that desired flow through the bypass line will not be initiated or maintained because the pressure in the common discharge line will be higher than the pressures in the line(s) upstream of the parallel high-shear mixer(s) and in the bypass line.

An additional feature of the inventive mixing methods and systems is the use of one or more flow measurement device(s) (flow meters), which can be used with the one or more flow control devices (e.g., valves), to manage flow throughout the mixing system. One aspect of flow control is provided by a flow measurement device and a flow control device installed on the common discharge line downstream from the parallel mixing lines and a flow control device and an optional flow measurement device on the bypass line. Flow control can optionally comprise one or more alternative or additional flow measurement devices and/or valves on each of the mixing lines. Accurate and real time flow measurement and control by measuring and regulating flow through the various lines ensures that desired flow rates through the various lines and the overall system are maintained and provides critical low-flow protection for the mixers.

Additional features and advantages of the inventive mixing methods and systems are summarized in the following paragraphs.

Newer hydroconversion units can be very large, and it may be impractical to build single-train mixing equipment for proper dispersion of a dispersed catalyst precursor blend in the heavy oil feedstock to accommodate very large hydroconversion units. A mixing system with two or more parallel mixing lines facilitates the use of practical sized mixing equipment for such larger hydroconversion units.

Even for smaller hydroconversion units where single-train mixing equipment may be practical, maintenance of the mixing equipment will cause the entire dispersed catalyst mixing system to be off-line. This reduces the performance of the hydroconversion unit during the maintenance interval because there is no online backup to continue mixing catalyst precursor into heavy oil. In addition to permitting maintenance of the mixing line while continuing to produce a conditioned feedstock, the disclosed mixing systems permit the use of smaller capacity mixing lines rather than full-scale mixing lines that alternate back and forth to carry out the entire mixing process. In the latter case, one of the full-scale mixing lines remains dormant and nonoperational while the other mixing line is operational, which is a waste of mixing resources.

During normal operation of the parallel mixing lines, the system is advantageously or preferably operated with symmetrical distribution of feedstock flow (i.e., equal flow through each parallel mixing line). Advantageously or preferably, the parallel mixing lines are designed with symmetrical piping and mixing equipment so that pressure drop is substantially equal through each parallel mixing line and equal flow between the different mixing lines can be maintained.

When a mixing system with a simple arrangement of parallel mixing lines is used, a problem arises when one of the parallel mixing lines is offline for maintenance while the operation of the other mixing line(s) is continued. In this scenario, the remaining online mixing line(s) may not have sufficient capacity to accommodate the total required heavy oil feed rate to the hydroconversion unit. This may require a reduction in throughput of heavy oil by the hydroconversion unit during maintenance, which is undesirable because it would correspondingly reduce productivity of the unit.

To address the abovementioned problem, the inventive mixing methods and systems include a bypass line. During an interval when one of the parallel mixing lines is offline, the portion of heavy oil feedstock which would otherwise pass through that mixing line can instead be diverted though the bypass line. This allows total throughput of heavy oil feedstock to be substantially maintained during maintenance. Advantageously or preferably, during a maintenance interval, the flow of heavy oil feedstock and diluted precursor mixture is distributed to maximize flow through the remaining online high-shear mixer(s) (consistent with the capacity limitation of the mixer(s)), and the balance of heavy oil that exceeds the mixing capacity of the remaining online mixing line(s) is routed through the bypass line.

By maintaining the maximum possible feedstock flow through the remaining online mixing line(s) during maintenance intervals, uninterrupted mixing of catalyst precursor into a substantial portion of the heavy can be maintained. The full amount of dispersed catalyst precursor can normally be continued during maintenance by temporarily rerouting the portion of precursor that had been injected through the mixing line that is offline for maintenance to the remaining online mixing line(s). While mixing efficiency may be reduced somewhat when one of the mixing lines is offline for maintenance, such effect is minimal and more than offset by the other benefits provided by the inventive methods and systems disclosed herein.

A potential problem with successful operation of the bypass line is ensuring a desired distribution of heavy oil feedstock flow when a mixing line is taken offline for maintenance. As noted, a preferred flow distribution is to maximize the flow through the remaining online mixing line(s), subject to their capacity limitations, and to route the balance of flow through the bypass line. However, the operation of a high-shear mixer is analogous to a pump, such that higher pressure is generated in the discharge line (downstream from the high-shear mixer) than in the suction line (upstream of the high-shear mixer) by the action of the mixer. When the bypass line is opened, and in the absence of one or more flow control devices, it may not be possible for the feedstock to establish forward flow through the bypass line, because the pressure downstream from the remaining online high-shear mixer(s) would be higher than the upstream pressure in the suction line. In fact, in the absence of one or more flow control devices or valves, hydrocarbon flow may instead occur in the reverse direction in the bypass line, creating an undesirable circulation loop in the mixing system.

To address the abovementioned problem and achieve successful operation of the bypass line during maintenance intervals, the disclosed methods and systems include one or more flow control devices. These may be manual valves, automatic control valves, and the like. Preferably, a flow control device is positioned on the common discharge line downstream from where the parallel mixing lines converge. Alternatively, or in addition, flow control devices can be located on each mixing line downstream from the high-shear mixer. When a mixing line is offline for maintenance, the flow control device in the common discharge line and/or in the remaining online mixer(s) is/are adjusted to partially restrict the discharge flow from the online mixing lines, which changes the profile of pressures in the mixing system. The pressure in the feedstock line upstream of the mixing lines is increased, which enables forward flow of heavy oil feedstock to pass through the bypass line as desired. With proper adjustment of the flow control device(s), the desired distribution of flow between the remaining online mixing line(s) and the bypass line can be maintained.

An additional optional feature of the invention is the use of one or more flow measuring devices. Preferably, there is a flow measuring device on the common discharge line and/or on the parallel mixing lines downstream from the high-shear mixers, and upstream of the point where the bypass line joins the common discharge line. This allows monitoring of flow of heavy oil through the high-shear mixers, ensuring that the desired flow rate is maintained through the online high-shear mixers during both normal operation and maintenance operation.

An optional flow meter may also be located on the bypass line. Another optional feature of the invention is a flow control device on the bypass line to provide flow distribution flexibility in combination with the other flow control device (s).

Figure 5A:
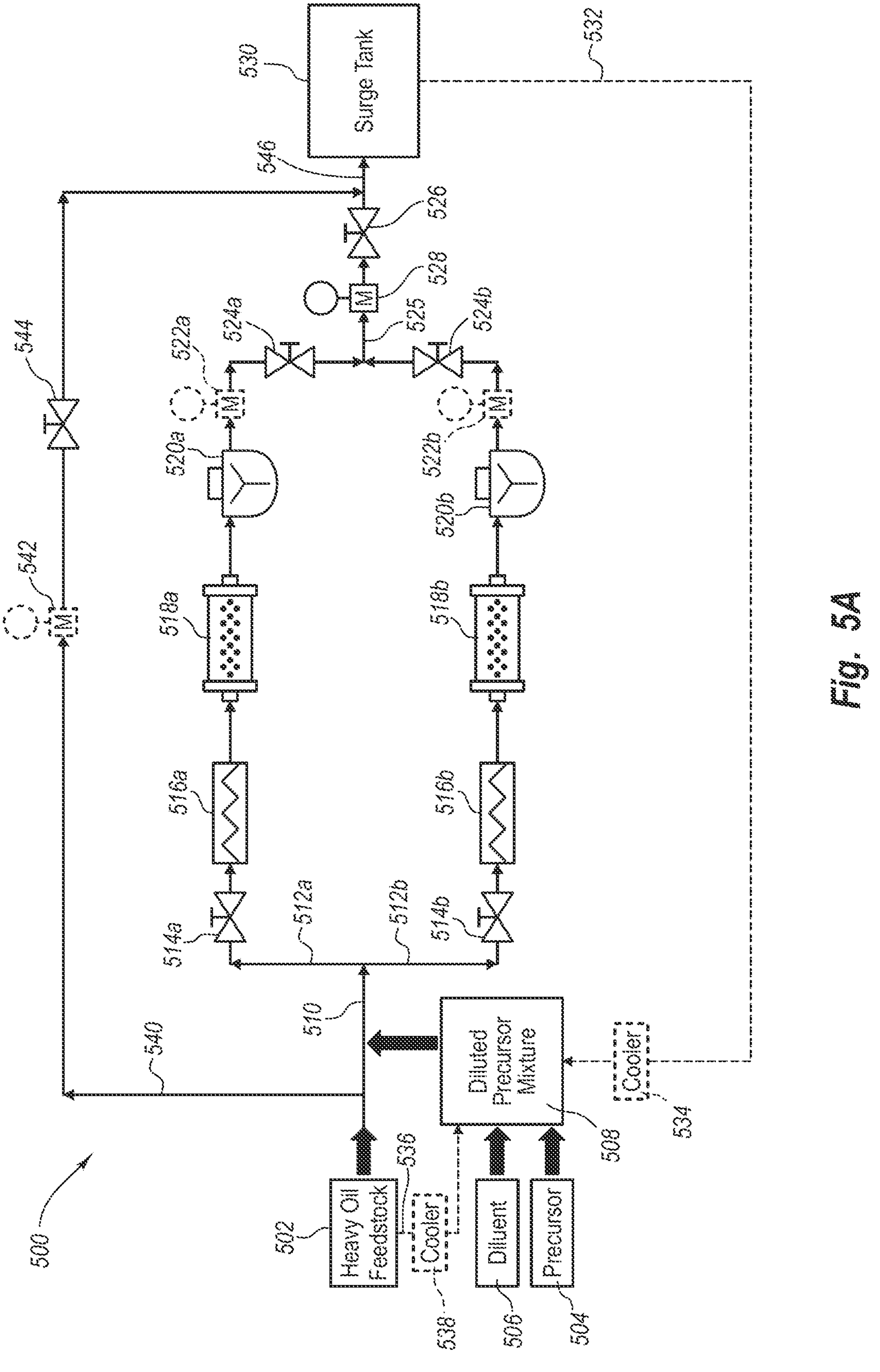
FIGS. 5A-5B schematically illustrate exemplary mixing systems having two parallel mixing lines and a bypass line.
Figure 5B:
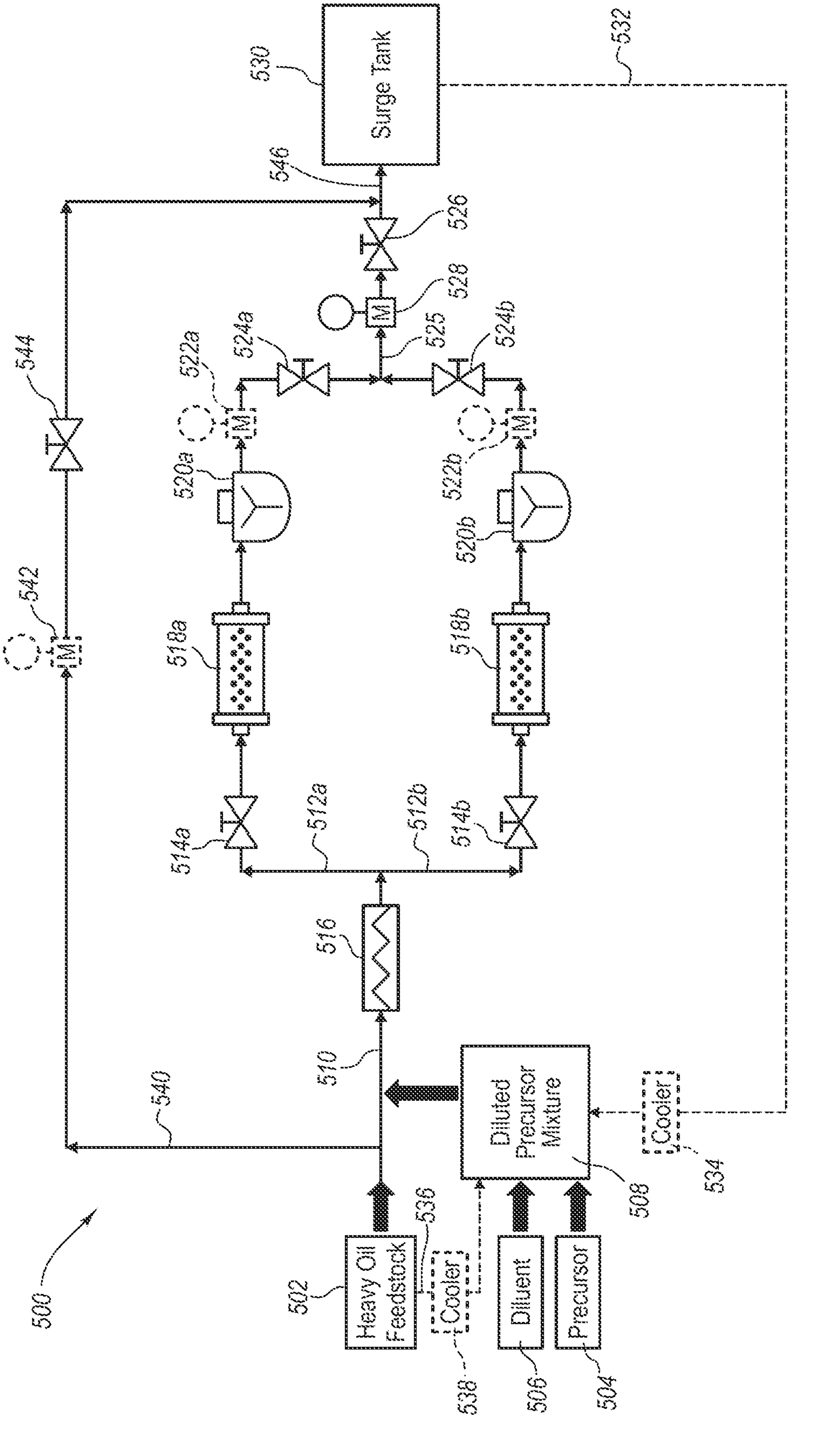

The disclosed mixing methods and systems are further illustrated in FIGS. 5A-7B below. FIGS. 5A-5B, for example, show embodiments of mixing systems and methods that use two parallel mixing lines together with a bypass line. According to some embodiments, the flow control device(s) can be a valve, which can be located on the common discharge line downstream from where the mixer discharge lines join each other, but upstream of the point where the bypass line joins the common discharge line. The flow control valve will generally be fully open during normal operations, when both high-shear mixers are operating with the preferred symmetrical distribution of flow. When one high-shear mixer is offline for maintenance, a flow control valve in the common discharge line and/or the remaining mixing line downstream from the high shear mixer is/are partially closed to restrict flow in the remaining parallel mixing line and/or the common discharge line and increase upstream pressure. This causes or allows a desired portion of heavy oil feedstock to flow through the bypass line, while still allowing a substantial portion of the heavy oil feedstock to flow through the remaining online high-shear mixer, which can be increased during the maintenance interval depending on the capacity of the mixer. FIG. 5A also illustrates a flow measuring device (flow meter) located on the common discharge line upstream of the flow-control valve, which is upstream of where the bypass line joins the common discharge line. FIGS. 5A-5B also show an optional flow measuring device located on the bypass line and optional flow measuring devices located on the individual mixing lines.

Figure 6A:
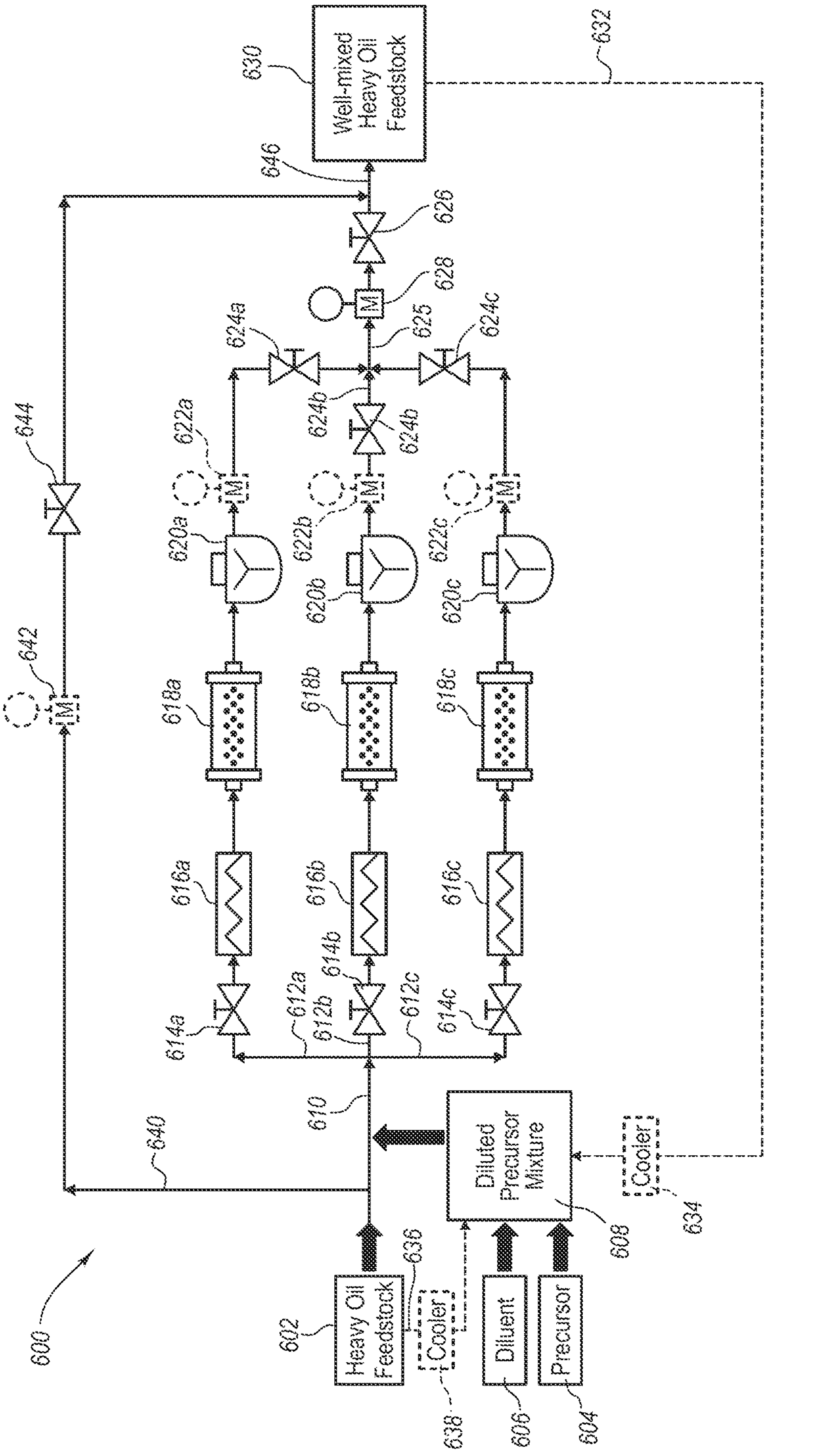
FIGS. 6A-6B schematically illustrate exemplary mixing systems having three parallel mixing lines and a bypass line.
Figure 6B:
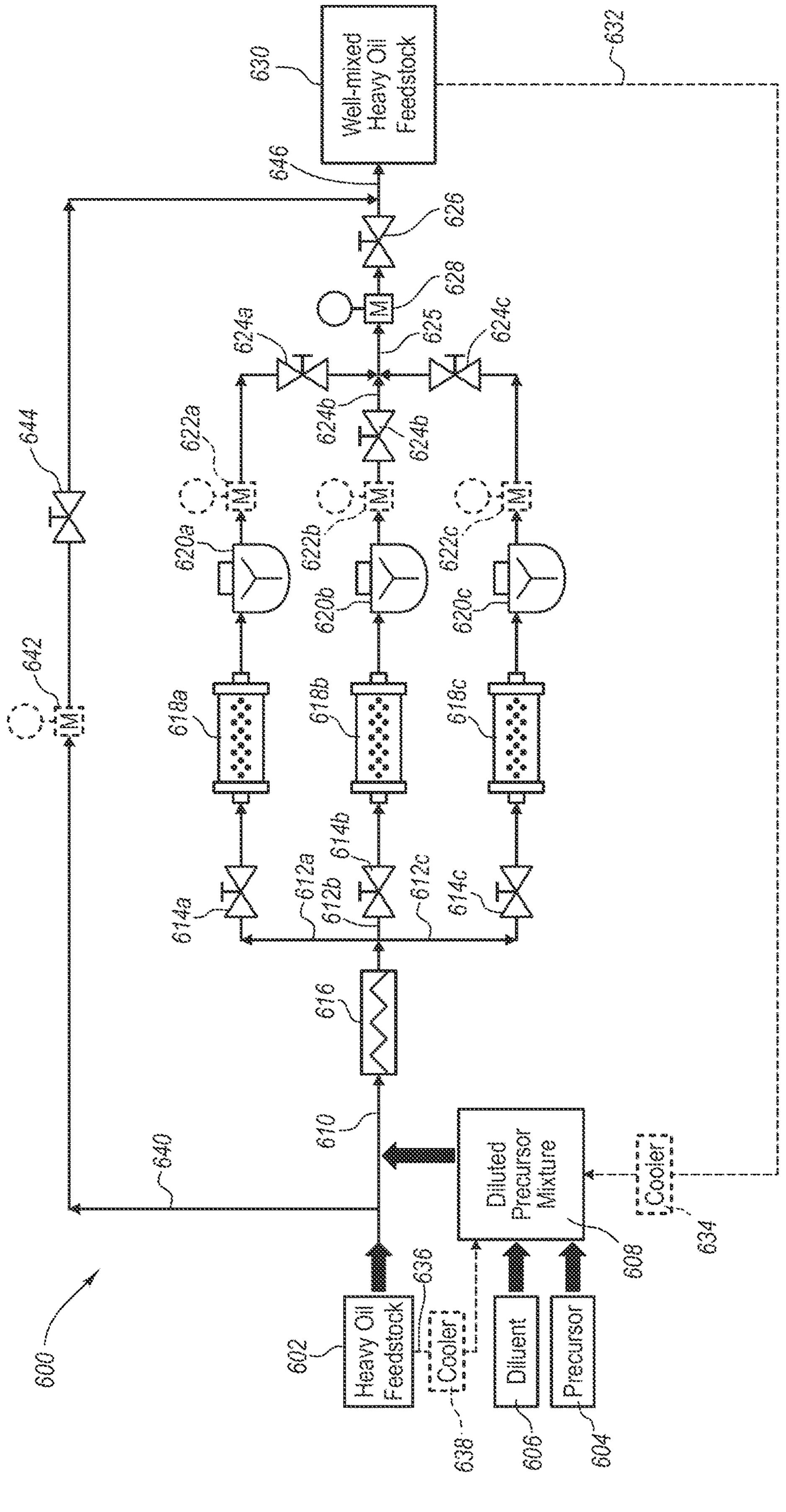
Figure 7A:
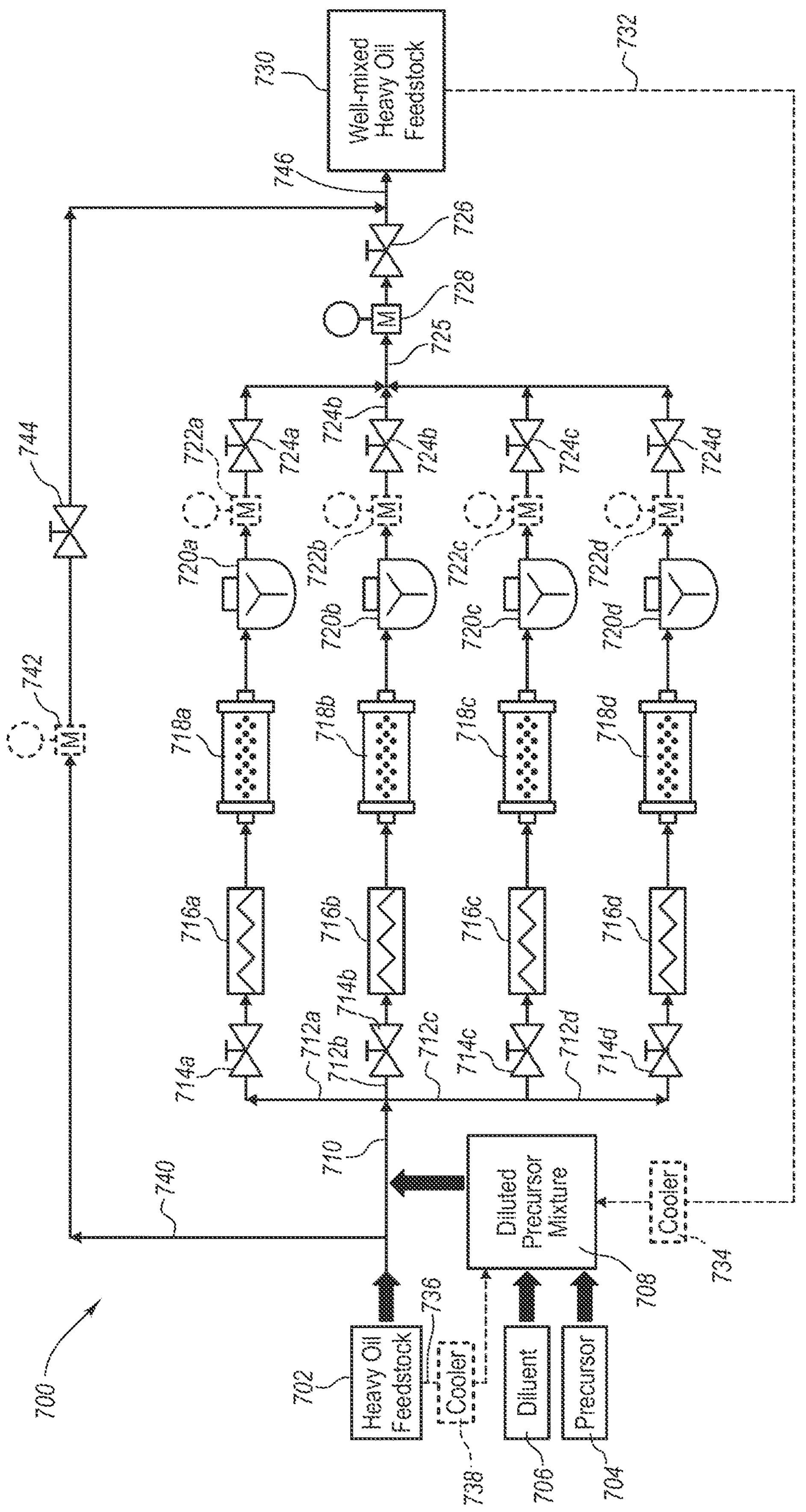
FIGS. 7A-7B schematically illustrate exemplary mixing systems having four parallel mixing lines and a bypass line.
Figure 7B:
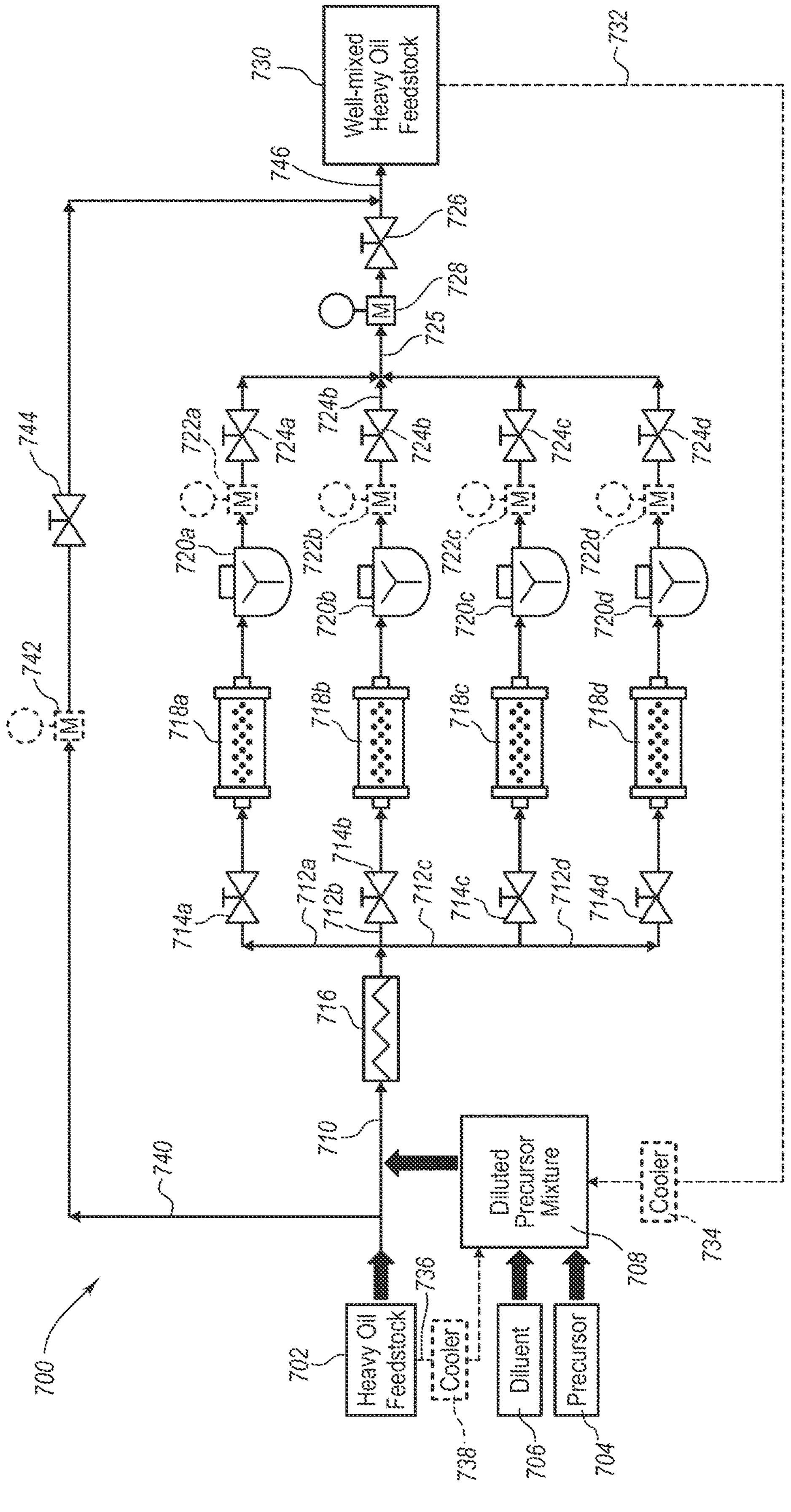

FIGS. 6A-6B illustrate embodiments of mixing systems and methods that are similar to the mixing systems and methods illustrated in FIGS. 5A-5B but include three parallel mixing lines. FIGS. 7A-7B illustrate embodiments of mixing systems and method that are similar to the mixing systems and methods illustrated in FIGS. 5A-5B and 6A-6B but include four parallel mixing lines.

Before providing a more detailed explanation of the features illustrated in FIGS. 5A-7B, which show example mixing systems that can be used in the disclosed mixing methods, reference is first made to proposed definitions for certain terms, followed by references to FIGS. 1-4B and existing hydroprocessing reactors and systems with which the inventive mixing methods and systems can be employed and/or integrated.

II. Definitions

"Asphaltene" and "asphaltenes" refer to materials in heavy oil that are insoluble in paraffinic solvents, such as propane, butane, pentane, hexane, and heptane. Asphaltenes can include sheets of condensed ring compounds held together by heteroatoms, such as sulfur, nitrogen, oxygen, and metals. Asphaltenes broadly include a wide range of complex compounds having from 80 to 1200 carbon atoms, with predominating molecular weights, as determined by solution techniques, in the 1200 to 16,900 range. About 80-90% of the metals in the crude oil are contained in the asphaltene fraction which, together with a higher concentration of non-metallic heteroatoms, render asphaltene molecules more hydrophilic and less hydrophobic than other hydrocarbons in heavy oil resids.

A hypothetical asphaltene molecule structure developed by A. G. Bridge and co-workers at Chevron is depicted in FIG. 1. Asphaltenes are typically defined based on the results of insolubles analyses, and more than one definition of asphaltenes may be used. Specifically, a commonly used definition of asphaltenes is heptane insolubles minus toluene insolubles (i.e., asphaltenes are soluble in toluene; sediments and residues insoluble in toluene are not counted as asphaltenes). Asphaltenes defined in this fashion may be referred to as "$C_7$ asphaltenes". Another definition is measured as pentane insolubles minus toluene insolubles, and commonly referred to as "$C_5$ asphaltenes". In the examples of the present invention, the $C_7$ asphaltene definition is used, but the $C_5$ asphaltene definition can be readily substituted.

"Fouling" refers to the formation of an undesirable phase (foulant) that interferes with processing. The foulant is normally a carbonaceous material or solid (e.g., sediment) that deposits and collects within the processing equipment. Equipment fouling can result in loss of production due to equipment shutdown, decreased performance of equipment, increased energy consumption due to the insulating effect of foulant deposits in heat exchangers or heaters, increased maintenance costs for equipment cleaning, reduced efficiency of fractionators, and reduced reactivity of the heterogeneous catalyst. Hydroprocessing equipment, such as mixing lines, require periodic maintenance to remove sediment and other foulants.

"Rate of equipment fouling" of a hydrocracking reactor can be determined by at least one of: (i) frequency of required heat exchanger clean-outs; (ii) frequency of switching to spare heat exchangers; (iii) frequency of filter changes; (iv) frequency of strainer clean-outs or changes; (v) rate of decrease in equipment skin temperatures, including in equipment selected from heat exchangers, separators, or distillation towers; (vi) rate of increase in furnace tube metal temperatures; (vii) rate of increase in calculated fouling resistance factors for heat exchangers and furnaces; (viii) rate of increase in differential pressure of heat exchangers; (ix) frequency of cleaning atmospheric and/or vacuum distillation towers; or (x) frequency of maintenance turnarounds.

"Heavy oil" and "heavy oil feedstock" refer to heavy crude, oil sands bitumen, bottom of the barrel and residuum left over from refinery processes, such as visbreaker bottoms, and any other lower quality materials that contain a substantial quantity of high boiling hydrocarbon fractions and/or that include a significant quantity of asphaltenes that can deactivate a heterogeneous catalyst and/or cause or result in formation of coke precursors and sediment. Examples of heavy oils include, but are not limited to, Lloydminster heavy oil, Cold Lake bitumen, Athabasca bitumen, atmospheric tower bottoms, vacuum tower bottoms, residuum (or "resid"), resid pitch, vacuum residue (e.g., Ural VR, Arab Medium VR, Athabasca VR, Cold Lake VR, Maya VR, and Chichimene VR), pyrolysis oils, deasphalted liquids obtained by solvent deasphalting, asphaltene liquids obtained as a byproduct of deasphalting, and nonvolatile liquid fractions that remain after subjecting crude oil, bitumen from tar sands, liquefied coal, oil shale, or coal tar feedstocks to distillation, hot separation, solvent extraction, and the like. By way of further example, atmospheric tower bottoms (ATB) can have a nominal boiling point of at least 343° C. (650° F.) although it is understood that the cut point can vary among refineries and be as high as 380° C.

(716° F.). Vacuum tower bottoms can have a nominal boiling point of at least 524° C. (975° F.), although it is understood that the cut point can vary among refineries and be as high as 538° C. (1000° F.) or even 565° C. (1050° F.).

"Hydrocracking" and "hydroconversion" refer to processes whose primary purpose is to reduce the boiling range of heavy oil and in which a substantial portion of the heavy oil is converted into products with boiling ranges lower than that of the original feed. Hydrocracking or hydroconversion generally involves fragmentation of larger hydrocarbon molecules into smaller molecular fragments having a smaller number of carbon atoms and a higher hydrogen-to-carbon ratio. The mechanism by which hydrocracking occurs typically involves the formation of hydrocarbon free radicals during thermal fragmentation, followed by capping of free radicals with hydrogen. The hydrogen atoms or radicals that react with hydrocarbon free radicals during hydrocracking can be generated at or by active catalyst sites.

"Hydrotreating" refers to processes whose primary purpose is to remove impurities such as sulfur, nitrogen, oxygen, halides, and trace metals from the feedstock and saturate olefins and/or stabilize hydrocarbon free radicals by reacting them with hydrogen rather than allowing them to react with themselves. The primary purpose is not to change the boiling range of the feedstock. Hydrotreating is most often carried out using a fixed bed reactor, although other hydroprocessing reactors can be used, examples of which are an ebullated bed hydrotreater and slurry phase hydrotreater.

"Hydrocracking" and "hydroconversion" may also involve the removal of sulfur and nitrogen from a feedstock as well as olefin saturation and other reactions typically associated with "hydrotreating". The terms "hydroprocessing" and "hydroconversion" shall broadly refer to both "hydrocracking" and "hydrotreating" processes, which define opposite ends of a spectrum, and everything in between along the spectrum.

"Hydrocracking reactor" refers to any vessel in which hydrocracking (i.e., reducing the boiling range) of a feedstock in the presence of hydrogen and a hydrocracking catalyst is the primary purpose. Hydrocracking reactors are characterized as having one or more inlet ports into which heavy oil and hydrogen are introduced, an outlet port from which an upgraded feedstock or material is withdrawn, and sufficient thermal energy that promotes fragmentation of larger hydrocarbon molecules into smaller molecules, causing formation of hydrocarbon free radicals. Examples of hydrocracking reactors include, but are not limited to, slurry phase reactors (i.e., two-phase, gas-liquid system), ebullated bed reactors (i.e., three-phase, gas-liquid-solid system), and fixed bed reactors (i.e., three-phase system that includes a liquid feed trickling downward over or flowing upward through a fixed bed of solid heterogeneous catalyst with hydrogen typically flowing co-currently with, but possibly counter-currently, to the heavy oil).

"Hydrocracking temperature" refers to a minimum temperature required to cause significant hydrocracking of a heavy oil feedstock. In general, hydrocracking temperatures will preferably fall within a range of about 399° C. (750° F.) to about 460° C. (860° F.), more preferably in a range of about 418° C. (785° F.) to about 443° C. (830° F.), and most preferably in a range of about 421° C. (790° F.) to about 440° C. (825° F.).

"Gas-liquid slurry phase hydrocracking reactor" refers to a hydroprocessing reactor that includes a continuous liquid phase and a gaseous dispersed phase, which forms a "slurry" of gaseous bubbles within the liquid phase. The liquid phase typically comprises a hydrocarbon feedstock that may contain a low concentration of dispersed metal sulfide catalyst particles, which can behave colloidally or as a pseudo solute, and the gaseous phase typically comprises hydrogen gas, hydrogen sulfide, and vaporized low boiling point hydrocarbon products. The liquid phase can optionally include a hydrogen donor solvent.

"Gas-liquid-solid, 3-phase slurry hydrocracking reactor" is used when a solid catalyst is employed along with liquid and gas. The gas may contain hydrogen, hydrogen sulfide, and vaporized low boiling hydrocarbon products. The term "slurry phase reactor" shall broadly refer to both type of reactors (e.g., those with dispersed metal sulfide catalyst particles, those with a micron-sized or larger particulate catalyst, and those that include both).

"Solid heterogeneous catalyst", "heterogeneous catalyst" and "supported catalyst" refer to catalysts typically used in ebullated bed and fixed bed hydroprocessing systems, including catalysts designed primarily for hydrocracking, hydroconversion, hydrodemetallization, and/or hydrotreating. A heterogeneous catalyst typically comprises a catalyst support structure having a large surface area and interconnected channels or pores and fine active catalyst particles, such as sulfides of cobalt, nickel, tungsten, and/or molybdenum, dispersed within the channels or pores. The pores of the support are typically of limited size to maintain mechanical integrity of the heterogeneous catalyst and prevent breakdown and formation of excessive fines in the reactor. Heterogeneous catalysts can be produced as cylindrical pellets, cylindrical extrudates, other shapes such as trilobes, rings, saddles, or the like, or spherical solids.

"Dispersed metal sulfide catalyst particles" and "dispersed catalyst" refer to catalyst particles having a particle size below 1 (submicron, or sub micrometer), preferably less than about 500 nm, or less than about 250 nm, or less than about 100 nm, or less than about 50 nm, or less than about 25 nm, or less than about 10 nm, or less than about 5 nm. The term "dispersed metal sulfide catalyst particles" may include molecular or molecularly-dispersed catalyst compounds. "Dispersed metal sulfide catalyst particles" typically excludes metal sulfide particles and agglomerates of metal sulfide particles that are larger than 1 μm.

"Molecularly-dispersed catalyst" refers to catalyst compounds that are essentially "dissolved" or dissociated from other catalyst compounds or molecules in a hydrocarbon feedstock or suitable diluent. It can include very small catalyst particles that contain a few catalyst molecules joined together (e.g., 15 molecules or less).

"Residual dispersed catalyst particles" and "residual dispersed metal sulfide catalyst particles" refer to catalyst particles that remain with a hydrocarbon product when transferred from one vessel to another (e.g., from a hydroprocessing reactor to a separator and/or other hydroprocessing reactor). Residual dispersed metal sulfide catalyst particles may also remain in a liquid residual fraction or pitch after separation of a hydrocarbon product into distillates and residual liquid or pitch, such as by flash separation, hot separation, atmospheric distillation, vacuum distillation, or vacuum stripping.

"Conditioned feedstock" refers to a hydrocarbon feedstock into which a catalyst precursor has been combined and mixed sufficiently so that, upon decomposition of the catalyst precursor and formation of the active catalyst, the catalyst will comprise dispersed metal sulfide catalyst particles formed in situ within the feedstock. Conditioned feedstocks include conditioned heavy oil.

"Upgrade", "upgrading" and "upgraded", when used to describe a feedstock that is being or has been subjected to hydroprocessing, or a resulting material or product, refer to one or more of a reduction in molecular weight of the feedstock, a reduction in boiling point range of the feedstock, a reduction in concentration of asphaltenes, a reduction in concentration of hydrocarbon free radicals, and/or a reduction in quantity of impurities, such as sulfur, nitrogen, oxygen, halides, and metals.

"Severity" refers to the amount of energy that is introduced into heavy oil during hydroprocessing and is related to the operating temperature of the hydroprocessing reactor (i.e., higher temperature is related to higher severity and lower temperature is related to lower severity at same or similar throughput) in combination with duration or residence time. Increased severity generally increases the quantity of converted products produced by the hydroprocessing reactor, including both desirable products and undesirable products. Conversion and throughput also affect severity. For example, when temperature is increased and throughput is held constant, conversion typically increases for a given feedstock. In order to maintain temperature while increasing throughput (i.e., increasing the liquid hourly space velocity), which decreases residence time of the heavy oil in the reactor, more heat energy must be added to the system to offset the cooling effect of passing a greater quantity per unit time of initially cooler heavy oil into the reactor.

Desirable conversion products include hydrocarbons of reduced molecular weight, boiling point, and specific gravity, which can include end products such as naphtha, diesel, jet fuel, kerosene, wax, fuel oil, and the like. Other desirable conversion products include higher boiling hydrocarbons that can be further processed using conventional refining and/or distillation processes. Bottoms products of sufficient quality to be useful as fuel oil are other examples of desirable conversion products.

Undesirable conversion products include coke, sediment, metals, and other solid materials that can deposit on hydroprocessing equipment and cause fouling, such as interior components of reactors, separators, filters, pipes, towers, heat exchangers, and the heterogeneous catalyst. Undesirable conversion products can also refer to unconverted resid that remains after distillation, such as atmospheric tower bottoms ("ATB") or vacuum tower bottoms ("VTB"), particularly which are of too low of quality to be useful as fuel oil or other desired use. Minimizing undesirable conversion products reduces equipment fouling and shutdowns required to clean the equipment. Nevertheless, there may be a desirable quantity of unconverted resid in order for downstream separation equipment to function properly and/or to provide a liquid transport medium for carrying coke, sediment, metals, and other solid materials that might otherwise deposit on and foul equipment but that can be transported away by the remaining resid.

In addition to temperature, "severity" can be related to one or both of "conversion" and "throughput". Whether increased severity involves increased conversion and/or increased or decreased throughput may depend on the quality of the heavy oil feedstock and/or the mass balance of the overall hydroprocessing system. For example, where it is desired to convert a greater quantity of feed material and/or provide a greater quantity of material to downstream equipment, increased severity may primarily involve increased throughput without necessarily increasing fractional conversion. This can include the case where resid fractions (ATB and/or VTB) are sold as fuel oil, and increased conversion without increased throughput might decrease the quantity of this product. In the case where it is desired to increase the ratio of upgraded materials to resid fractions, it may be desirable to primarily increase conversion without necessarily increasing throughput. Where the quality of heavy oil introduced into the hydroprocessing reactor fluctuates, it may be desirable to selectively increase or decrease one or both of conversion and throughput to maintain a desired ratio of upgraded materials to resid fractions and/or a desired absolute quantity or quantities of end product(s) being produced.

"Conversion" and "fractional conversion" refer to the proportion, often expressed as a percentage, of heavy oil that is converted into lower boiling and/or lower molecular weight materials. Conversion is expressed as a percentage of the initial resid content (i.e., components with boiling points greater than a defined residue cut point) that is converted to products with boiling points less than the defined cut point. The definition of residue cut point can vary and can nominally include 524° C. (975° F.), 538° C. (1000° F.), 565° C. (1050° F.), and the like. It can be measured by distillation analysis of feed and product streams to determine the concentration of components with boiling point greater than the defined cut point. Fractional conversion is expressed as (F−P)/F, where F is the quantity of resid in the combined feed streams and P is the quantity in the combined product streams, where both feed and product resid content are based on the same cut point definition. The quantity of resid is most often defined based on the mass of components with boiling point greater than the defined cut point, but volumetric or molar definitions can also be used.

The conversion of asphaltenes can be different than the overall conversion of heavy oil. For purposes of this disclosure, a useful definition of asphaltene conversion is based on the relative amounts of asphaltenes in the fresh feedstock and upgraded product, and can be defined by the following, which results in a decimal fraction between 0 and 1, which can be converted into a percentage by multiplying by 100:

$$\text{Conv}=[\text{Asph(fresh feed)}-\text{Asph(products)}]/\text{Asph(fresh feed)}.$$

The asphaltene content of a recycle stream is internal to the process. When conversion of asphaltenes is too low compared to conversion of heavy oil as a whole, recycle buildup of asphaltenes can occur.

"Throughput" refers to the quantity (mass or volume) of feed material introduced into the hydroprocessing reactor per unit of time. Throughput can be expressed in volumetric terms, such as barrels per hour or per day, or in mass terms, such as metric tons per hour or per day. In common usage, throughput is defined as the mass or volumetric feed rate of only the heavy oil feedstock itself (for example, vacuum tower bottoms or the like). The definition normally excludes the quantity of diluents or other components that can be added to or included in the overall feeds to a hydroconversion unit, although a definition which includes those other components can also be used.

"Space velocity" and "liquid hourly space velocity" are related to the throughput of a particular reactor or reactor size but are normalized to remove the size (volume) of the reactor. Thus, a larger reactor can have twice the throughput but the same space velocity as a reactor with half the volume size. Therefore, an increase in space velocity is typically proportional to an increase in throughput for a given reactor size. Space velocity is inversely proportional to residence time of heavy oil in a reactor of given reactor size.

"Production rate of converted products" is an absolute rate that can be expressed in volumetric terms, such as barrels per hour or per day, or in mass terms, such as metric tons per hour or per day. The “production rate of converted products” should not be confused with yield or efficiency, which are sometimes erroneously called “rate” (e.g., production rate per unit feed rate, or production rate per unit converted feed). It will be appreciated that the actual numeric values of both initial production rate of converted products and increased production rate of converted products are specific to an individual production facility and depend on the capacity of that facility. Therefore, it is valid to compare the production rate of the unit or facility in question before and after modification but not against a different unit or facility built with a different capacity.

III. Example Hydroprocessing Systems

FIGS. 2-4B illustrate example hydroprocessing reactors and systems that can be used with and benefitted by being combined or integrated with the disclosed mixing methods and systems. The disclosed mixing methods and systems can be employed or positioned anywhere within the illustrated hydroprocessing systems. In general, the mixing system will typically be positioned upstream from a hydroprocessing reactor that is configured to operate using the dispersed metal sulfide catalyst particles, which are generated in situ within heavy oil from a catalyst precursor. The disclosed methods and systems provide for continuous introduction of catalyst precursor into heavy oil and the formation of dispersed metal sulfide catalyst particles in situ within the heavy oil, while being scaled to accommodate differently sized hydroprocessing reactors and systems and that facilitate periodic maintenance of mixing equipment without having to shut down the entire mixing system.

Feedstocks that can be used in the disclosed mixing methods and systems and hydroprocessed using one or more hydroprocessing reactors may comprise any desired fossil fuel feedstock and/or fraction thereof, including, but not limited to, one or more of heavy crude, oil sands bitumen, bottom of the barrel fractions from crude oil, atmospheric tower bottoms, vacuum tower bottoms, coal tar, liquefied coal, other resid fractions, pyrolysis oil, and deasphalted oil. Heavy oils and resids can include a significant fraction of high boiling point hydrocarbons (i.e., nominally at or above 343° C. (650° F.), more particularly nominally at or above about 524° C. (975° F.)) and/or asphaltenes. As mentioned above and illustrated in FIG. 1, asphaltenes are complex hydrocarbon molecules that include a relatively low ratio of hydrogen to carbon and a substantial number of condensed aromatic and naphthenic rings with paraffinic side chains. Sheets consisting of condensed aromatic and naphthenic rings are held together by heteroatoms, such as sulfur or nitrogen, polymethylene bridges, thioether bonds, and/or vanadium and nickel complexes. Asphaltenes also have more sulfur and nitrogen than crude oil or the rest of a vacuum resid, and they also contain higher concentrations of carbon-forming compounds (i.e., that form coke precursors and sediment).

Figure 2:
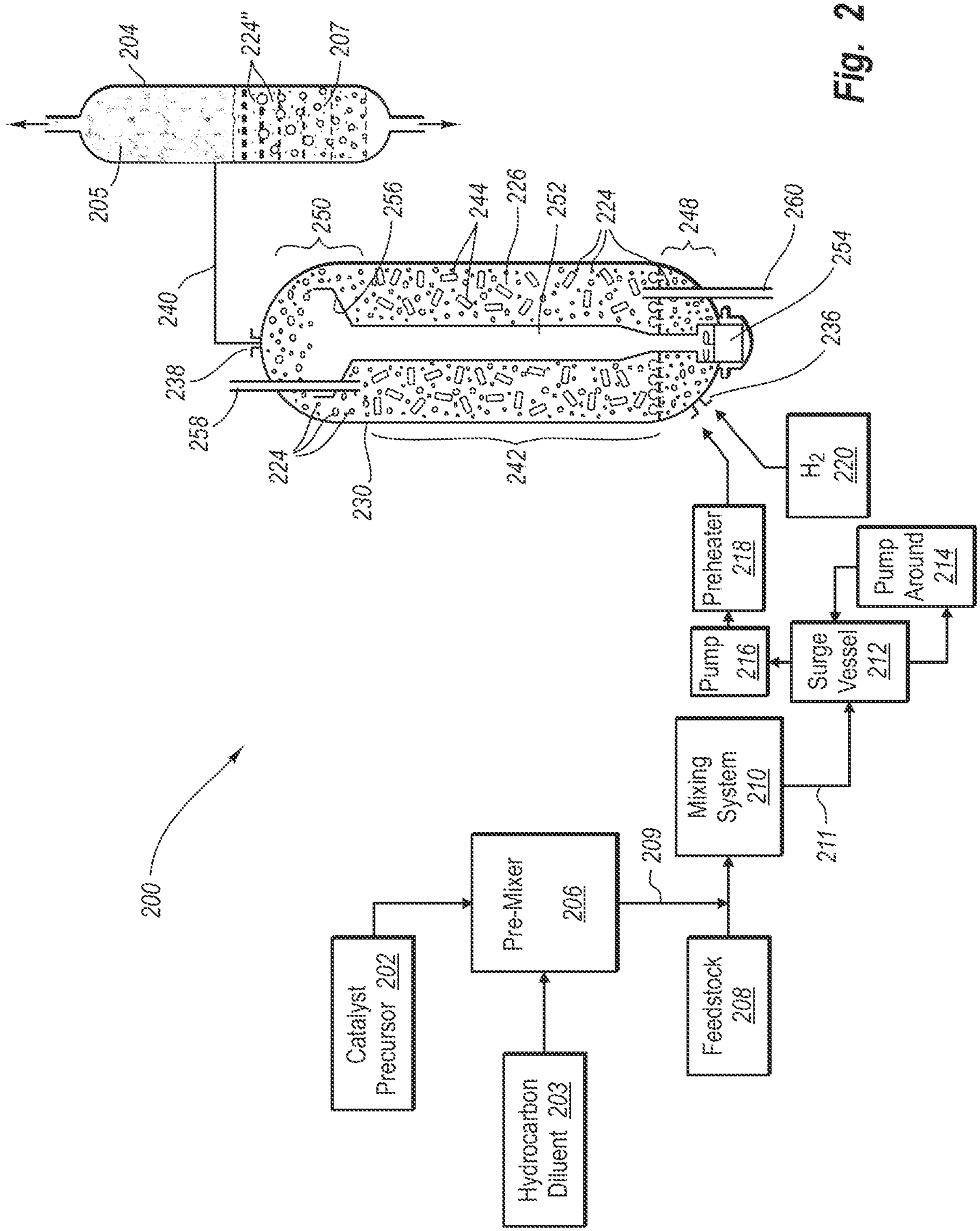
FIG. 2 schematically illustrates an exemplary ebullated bed hydroprocessing system using a dual catalyst system that can be used to hydroprocess heavy oil.

FIG. 2 schematically illustrates an example ebullated bed hydroprocessing system 200 that utilizes a dual catalyst system of dispersed metal sulfide catalyst particles and a heterogenous ebullated bed catalyst. The ebullated bed hydroprocessing system 200 includes an ebullated bed reactor 230 and a separator 204 (such as a hot separator, inter-stage pressure differential separator, or distillation tower). The ebullated bed reactor 230 is similar to that used in the LC-Fining hydrocracking system developed by C-E Lummus. A catalyst precursor 202 is blended with a hydrocarbon diluent 204 in one or more pre-mixers 206 to form a diluted precursor mixture 209. The diluted precursor mixture 209 is added to and blended with a heavy oil feedstock 208 using a mixing system 210 (i.e., which has multiple parallel mixing lines and a bypass line as disclosed herein) to form a conditioned feedstock 211.

The conditioned feedstock 211 is fed into a surge tank 212 with a pump around loop 214 to effect further mixing and dispersion of the catalyst precursor 202 within the feedstock 208. A bypass line (not shown) returns any heavy oil that bypasses the mixing lines (not shown) to a common discharge line (not shown) and/or feeds the heavy oil directly into the surge tank 212. The surge tank 212 and pump around loop 214 advantageously effect further mixing of the catalyst precursor into the heavy oil, including heavy oil from the bypass line. The conditioned feedstock from the surge tank 212 is pressurized by one or more pumps 216, passed through a pre-heater 218, and fed into the ebullated bed hydroprocessing reactor 230 together with hydrogen gas 220 through one or more inlet ports 236 located at or near the bottom of the ebullated bed reactor 230.

The ebullated bed reactor 230 includes a hydrocarbon material 226 and an expanded catalyst zone 242 comprising a heterogeneous catalyst 244 typical for ebullated bed reactors, which is maintained in an expanded or fluidized state against the force of gravity by upward movement of liquid hydrocarbons 226 and gas. A lower heterogeneous catalyst free zone 248 is located below a distributor grid plate defining the bottom of the expanded catalyst zone 242, and an upper heterogeneous catalyst free zone 250 is located above the expanded catalyst zone 242. Dispersed metal sulfide catalyst particles 224 are dispersed throughout the hydrocarbon material 226 within the ebullated bed reactor 230, including in the expanded catalyst zone 242 and the heterogeneous catalyst free zones 248, 250, thereby being available to promote beneficial upgrading reactions in the absence of the heterogeneous catalyst 244.

A funnel-shaped recycle cup 256 that feeds into a recycling channel 252 connected to an ebullating pump 254 continuously recirculate the hydrocarbon material 226 from the upper heterogeneous catalyst free zone 250 to the lower heterogeneous catalyst free zone 248. Downward suction by the recycle cup 256 at the top of the recycling channel 252 draws the hydrocarbon material 226 containing the dispersed catalyst particles 224 from the upper heterogeneous catalyst free zone 250 down through the recycling channel 252 and into the bottom of the ebullated bed reactor 230 by the ebullating pump 254. The recycled hydrocarbon material 226 is blended with new feedstock containing dispersed metal sulfide catalyst particles (and/or catalyst precursor) and hydrogen gas 220.

Fresh heterogeneous catalyst 244 can be introduced periodically into the ebullated bed reactor 230 through a catalyst inlet tube 258 and spent heterogeneous catalyst 244 can be withdrawn periodically through a catalyst withdrawal tube 260. The dispersed metal sulfide catalyst particles 224 provide additional catalytic activity within expanded catalyst zone 242, recycle channel 252, and lower and upper heterogeneous catalyst free zones 248, 250. The catalytic addition of hydrogen to hydrocarbons outside of the heterogeneous catalyst 244 reduces or minimizes formation of sediment and coke precursors, which are often responsible for deactivating the heterogeneous catalyst and causing system fouling.

The ebullated bed reactor 230 further includes an outlet port 238 at or near the top through which converted materials 240 are withdrawn. The converted materials 240 are introduced into a separator 204, which separates a volatile fraction 205 from a resid fraction 207. The volatile fraction 205 is withdrawn from the top of the hot separator 204, and the resid fraction 207 is withdrawn from a bottom of the hot separator 204. The resid fraction 207 contains residual dispersed metal sulfide catalyst particles, schematically depicted as catalyst particles 224". If desired, at least a portion of the resid fraction 207 can be recycled back to the ebullated bed reactor 230 to form part of the feed material and provide supplemental dispersed metal sulfide catalyst particles. Alternatively, the resid fraction 207 can be further processed using downstream processing equipment, such as another ebullated bed reactor, a distillation tower, a deasphalting unit, and the like. A portion of the resid fraction 207 can be used as diluent to form the catalyst precursor mixer.

Figure 3A:
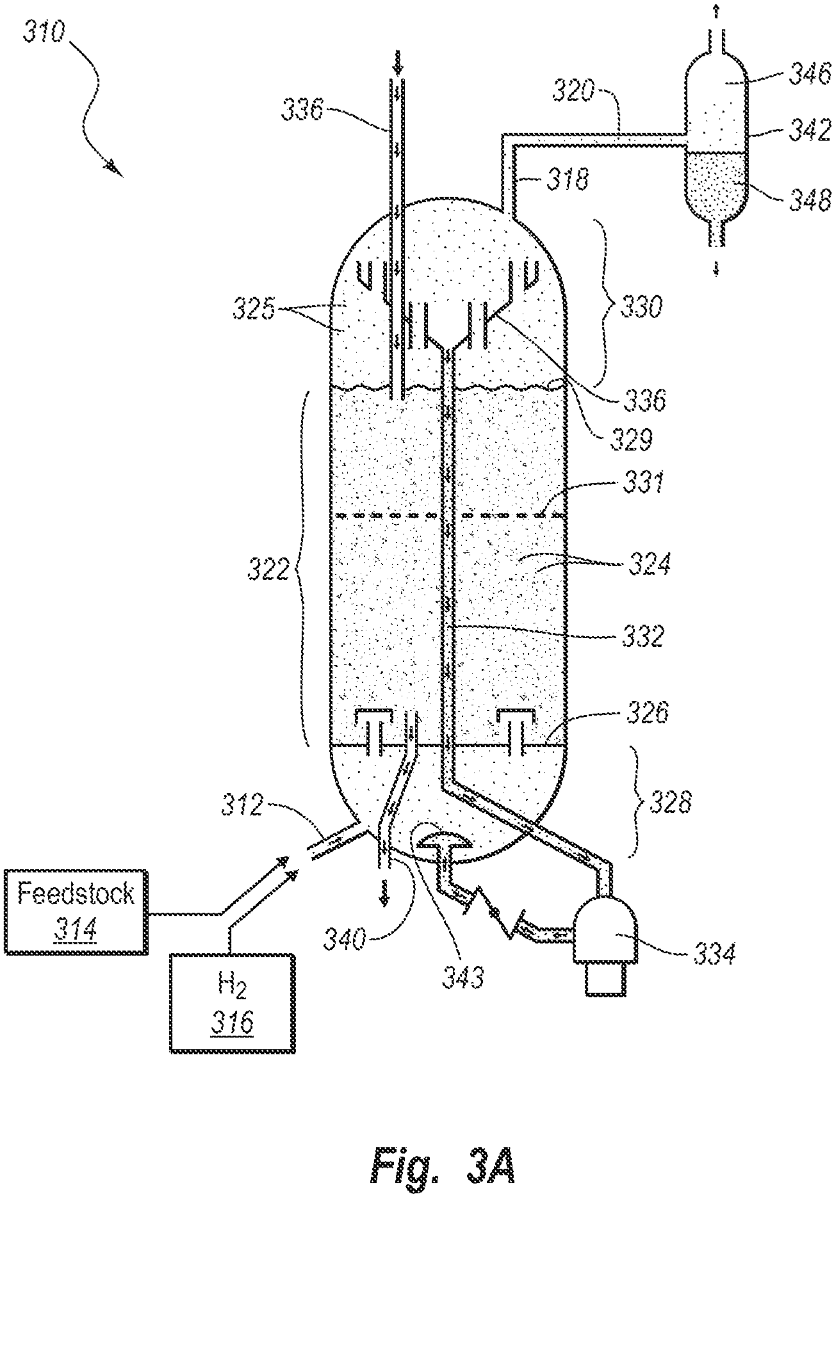
FIG. 3A schematically illustrates an exemplary ebullated bed reactor and a separator unit that separates volatilizable materials from non-volatilizable materials.

FIG. 3A schematically illustrates another type of ebullated bed hydroprocessing reactor 310 having a different recirculating system typical of the H-Oil hydrocracking system developed by Hydrocarbon Research, Inc. and currently licensed by Axens. The ebullated bed reactor 310 includes an inlet port 312 through which a heavy oil feedstock 314 and pressurized hydrogen gas 316 are introduced, and an outlet port 318 through which upgraded hydrocarbon material 320 is withdrawn.

An expanded catalyst zone 322 comprising a heterogeneous catalyst 324 is bounded by a distributor grid plate 326, which separates the expanded catalyst zone 322 from a lower catalyst free zone 328 below the distributor grid plate 326, and an upper end 329, which defines an approximate boundary between the expanded catalyst zone 322 and an upper catalyst free zone 330. A dotted boundary line 331 schematically illustrates the approximate level of the heterogeneous catalyst 324 when not in an expanded or fluidized state. Dispersed metal sulfide catalyst particles 325 are dispersed throughout the hydrocarbon material in the ebullated bed reactor 310, both in the expanded catalyst zone 322 and in lower and upper heterogeneous catalyst free zones 228, 230.

Hydrocarbons and other materials in the ebullated bed reactor 310 are continuously recirculated by a recycling channel 332 connected to an ebullating pump 334 positioned outside of the reactor 310. Materials are drawn through a funnel-shaped recycle cup 336 from the upper heterogeneous catalyst free zone 330. The recycle cup 336 is spiral-shaped, which helps separate hydrogen bubbles from recycled material passing down through recycle channel 332 to prevent cavitation in the ebullating pump 334. The recycled material enters the lower heterogeneous catalyst free zone 328 through a discharge bell cap 343, where it is blended with fresh heavy oil feedstock 314 and hydrogen gas 316. This mixture passes up through the distributor grid plate 326 and into the expanded catalyst zone 322. Fresh heterogeneous catalyst can be introduced periodically into the expanded catalyst zone 322 through a catalyst inlet tube 336 and spent heterogeneous catalyst can be periodically withdrawn through a catalyst discharge tube 340.

The main difference between the H-Oil ebullated bed reactor 310 illustrated in FIG. 3A and the LC-Fining ebullated bed reactor 200 illustrated in FIG. 2 is the location of the ebullating pump. The ebullating pump 334 in the H-Oil reactor 310 is located external to the reaction chamber. The recirculated material is introduced through a recirculation port with distributor cap 343 at the bottom of the ebullated bed reactor 310. The distributor cap 343 aids in evenly distributing materials through the lower catalyst free zone 328.

Upgraded material 320 is withdrawn from the outlet port 318 of the ebullated bed reactor 310 and introduced into a separator 342 (e.g., hot separator, inter-stage pressure differential separator, atmospheric distillation tower, or vacuum distillation tower). The separator 342 is configured to separate a volatile fraction (gas and distillates) 346 from a non-volatile fraction (or liquid) 348. Distillates and gases 346 are removed at one location (e.g., top) of the separator 3342, and a non-volatilized fraction 348 containing liquid hydrocarbons and residual dispersed metal sulfide catalyst particles are removed from another location (e.g., bottom) of the separator 342.

Figure 3B:
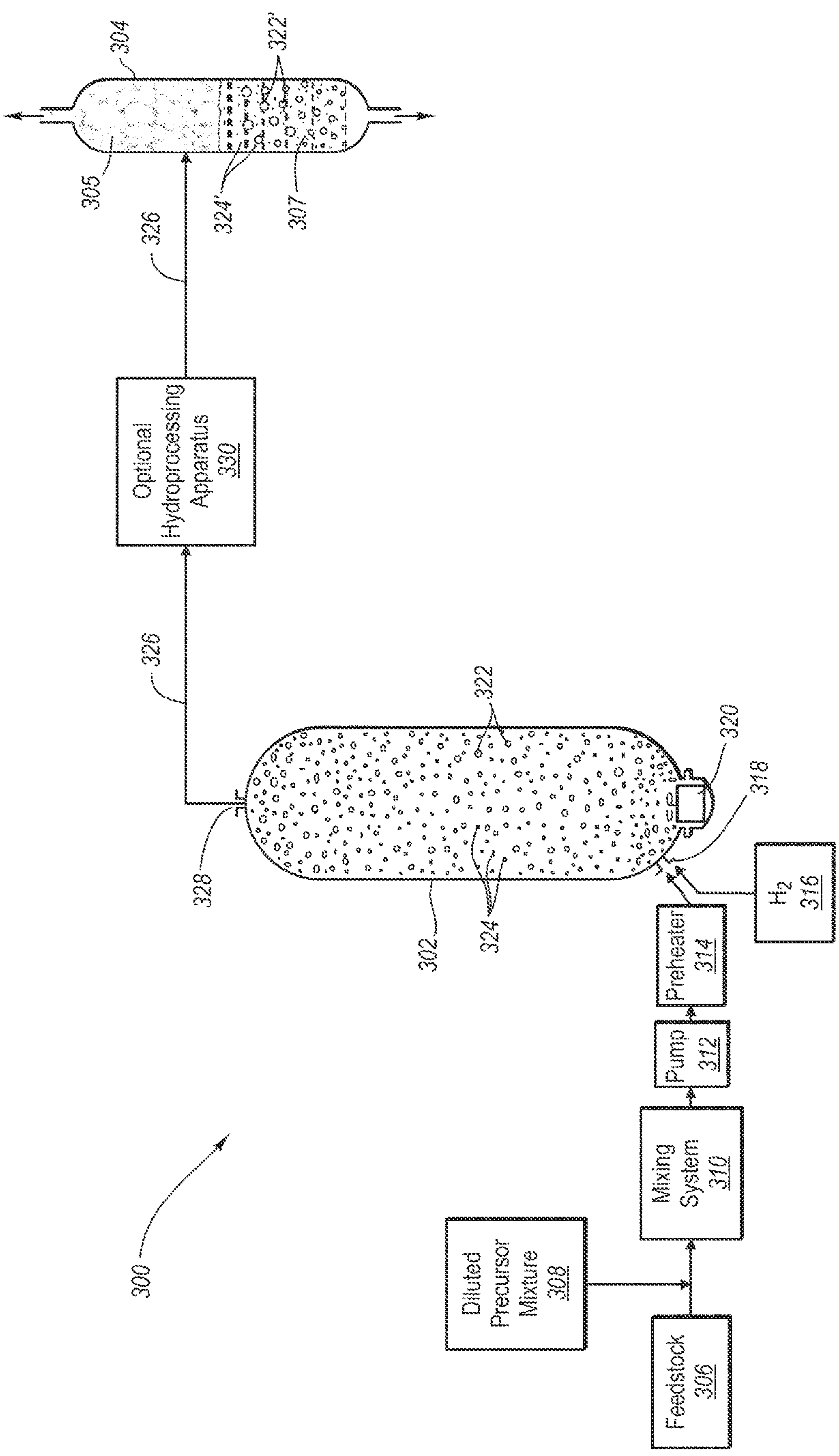
FIG. 3B schematically illustrates an exemplary slurry phase reactor and a separator unit that separates volatilizable materials from non-volatilizable materials.

FIG. 3B schematically depicts a hydroprocessing system 300 that includes a slurry phase reactor 302 and a separator 304 (e.g., hot separator, interstage pressure-differential separator, or distillation tower). A heavy oil feedstock 306 is blended and conditioned with a catalyst precursor mixture 308 using a mixing system 310 (i.e., multiple parallel mixing lines and a bypass line as disclosed herein). The diluted precursor mixing 308 comprises a catalyst mixed with a diluent formed in a pre-mixer (not shown). The conditioned feedstock from the mixing system 310 is pressurized by a pump 312, which can also serve as a multi-stage mixing device to further disperse the catalyst precursor throughout the heavy feedstock 306, passed through a pre-heater 314, and fed into the slurry phase reactor 302 together with hydrogen gas 316 through one or more input ports 318 located at or near the bottom of the slurry phase reactor 302.

A stirrer 320 at the bottom of the slurry phase reactor 302 induces mixing within the liquid phase, thus helping to more evenly disperse the heat generated by the hydrocracking reactions. Alternatively, or in addition to the stirrer 320, the slurry phase reactor 302 may include a recycle channel, recycling pump, and distributor grid plate (not shown) as in conventional ebullated bed reactors (See FIGS. 2 and 3A) to promote more even dispersion of reactants, catalyst, and heat. Hydrogen is schematically depicted as gas bubbles 322, and dispersed metal sulfide catalyst particles are schematically depicted as catalyst particles 324 in the reactor 302. It will be appreciated that gas bubbles 322 and catalyst particles 324 are shown oversized so that they may be seen in the drawing. In reality, they may be invisible to the naked eye.

The heavy oil feedstock 306 is catalytically upgraded in the presence of the hydrogen 316 and dispersed metal sulfide catalyst 324 within the slurry phase reactor 302 to form an upgraded hydrocarbon product 326. The upgraded product 326 is continuously withdrawn from the slurry phase reactor 302 through an output port 328 located at or near the top of the reactor 302 and then fed into the separator 304 (e.g., hot separator and/or distillation tower), optionally after passing through optional hydroprocessing apparatus 330. The upgraded product 326 fed to the separator 304 contains residual catalyst particles, schematically depicted as particles 324', and residual hydrogen, schematically depicted as bubbles 322', which can continue promoting beneficial upgrading reactions and reduce avoid equipment fouling. The separator 304 separates the volatile fraction 305 from a non-volatile fraction 307. The volatile fraction 305 is withdrawn from the top of hot separator 304, and the non-volatile fraction 307 is withdrawn from the bottom of hot separator 304.

Figure 3C:
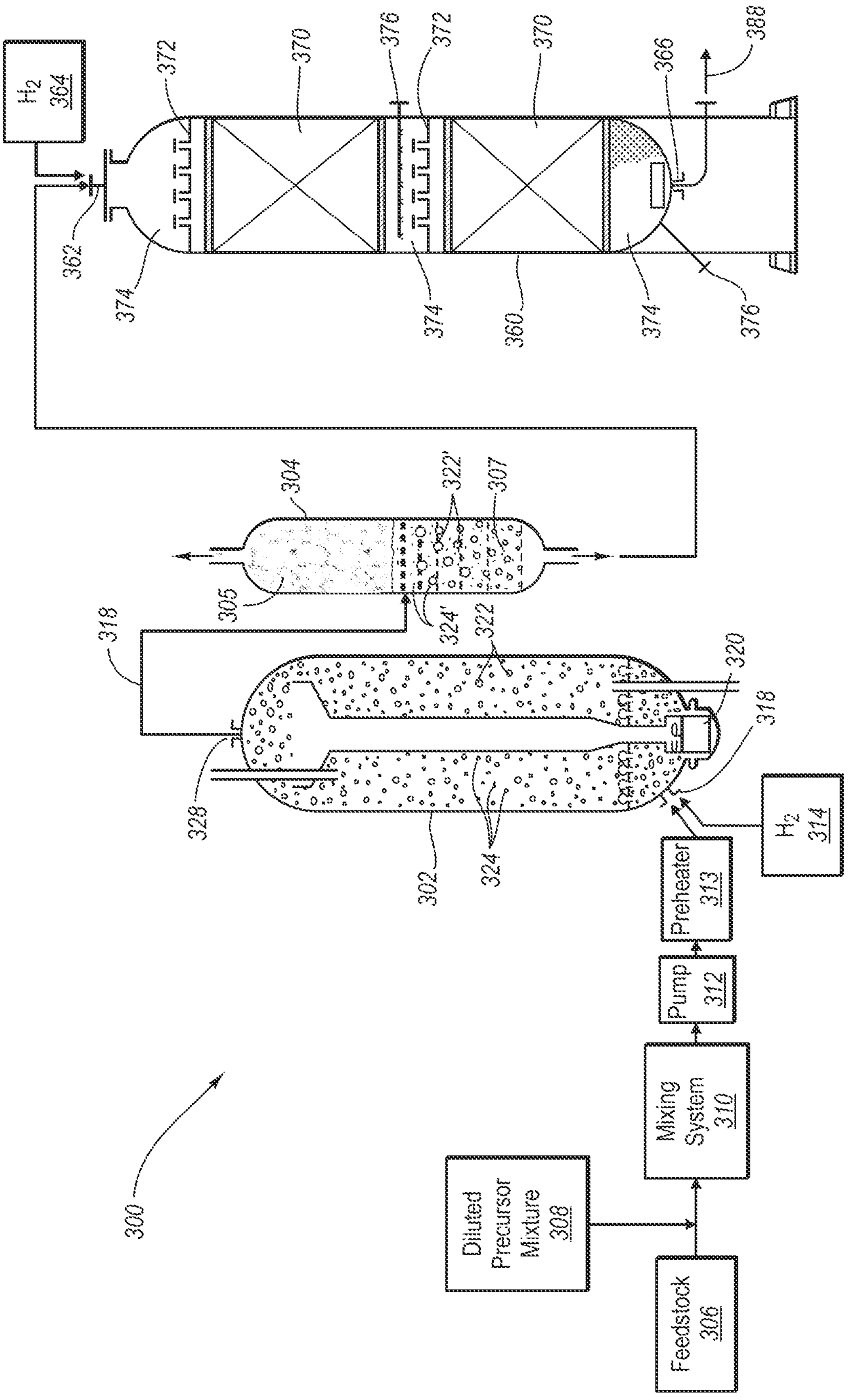
FIG. 3C schematically illustrates an exemplary hydroprocessing system that includes a slurry phase reactor, a separator unit that separates volatilizable materials from non-volatilizable materials, and a fixed bed reactor for further hydroprocessing the non-volatilizable materials.

FIG. 3C schematically depicts a hydroprocessing system 300 that includes a slurry phase reactor 302, a hot separator 304, and a fixed bed reactor 360. The upgraded hydrocarbon material 326 contains residual dispersed metal sulfide catalyst particles, schematically depicted as particles 324' within the hot separator 304. The liquid fraction 307 residual dispersed metal sulfide catalyst particles 324' from the hot separator 304 are introduced into the fixed bed reactor 360 for further hydroprocessing. The fixed bed reactor 360 may be designed to perform hydrocracking and/or hydrotreating reactions depending on the operating temperature and/or the type of solid supported catalyst that is used within the fixed bed reactor 360.

The fixed bed reactor 360 more particularly includes an input port 362 at the top through which the liquid fraction 307 and supplemental hydrogen gas 364 are introduced, and an output port 366 at the bottom through which a further hydroprocessed material 368 is withdrawn. The fixed bed reactor 360 further includes a plurality of vertically stacked and spaced apart catalyst beds 370 comprising a packed porous supported catalyst. Above each catalyst bed 370 is a distributor grid 372, which helps to more evenly distribute the flow of feedstock downward through the catalyst beds 370. Supported catalyst free zones 374 exist above and below each catalyst bed 370. The residual catalyst particles 324' remain dispersed throughout the feedstock within the fixed bed reactor 360, in both the catalyst beds 370 and the supported catalyst free zones 374, which further promote beneficial upgrading reactions. Auxiliary ports 376 in the center and/or bottom of the fixed bed reactor 360 may be provided through which a cooling oil and/or hydrogen quench can be introduced to cool heat generated by the hydroprocessing reactions, control the reaction rate, and thereby help prevent formation of coke precursors and sediment and/or excessive gas within the fixed bed reactor 360.

Figure 4A:
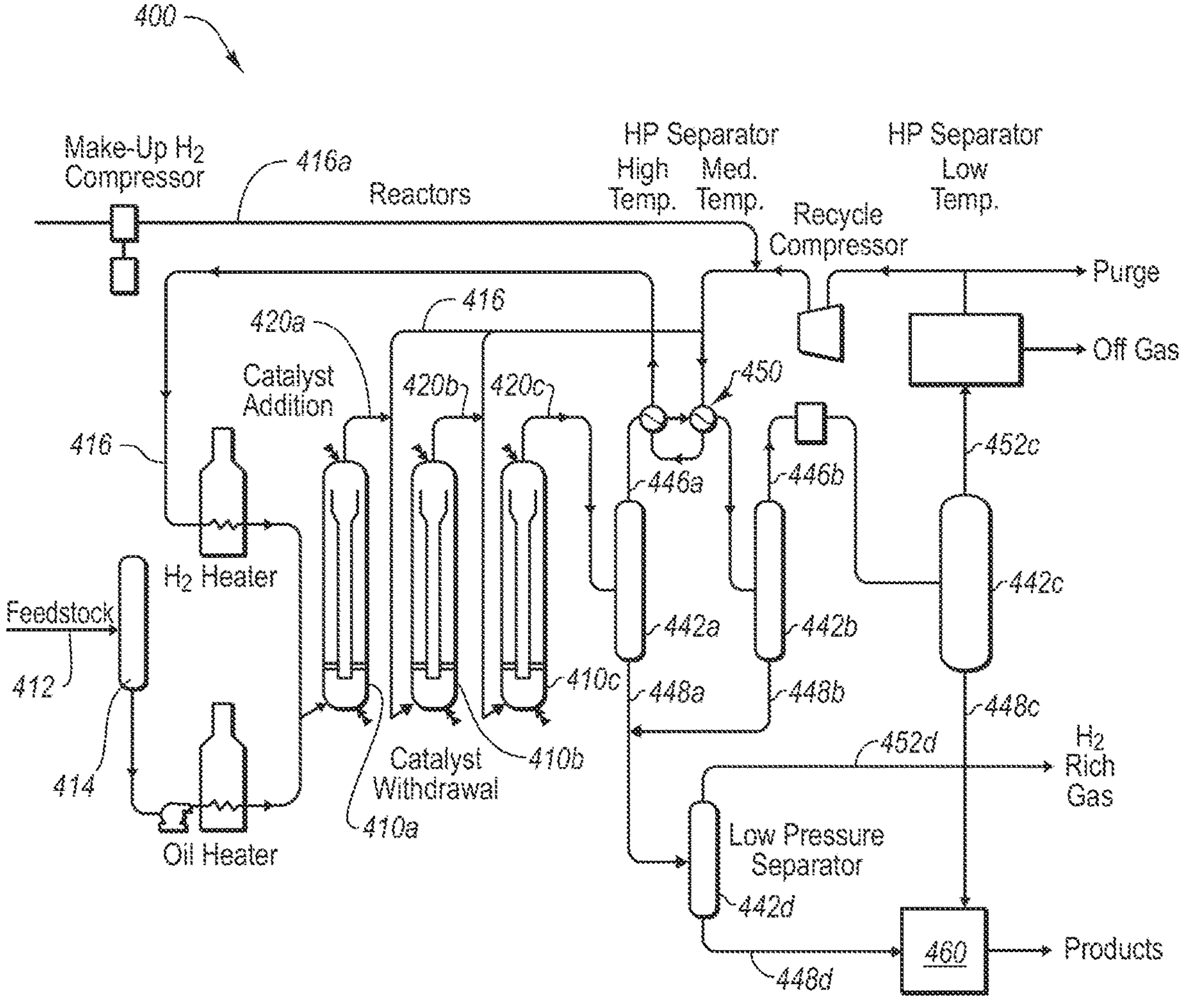
FIG. 4A schematically illustrates an exemplary ebullated bed hydroprocessing system with multiple ebullated bed reactors and other processing equipment.

FIG. 4A schematically illustrates an ebullated bed hydroprocessing system 400 comprising multiple ebullated bed reactors 410. Hydroprocessing system 400, an example of which is an LC-Fining or H-Oil hydroprocessing unit, may include three ebullated bed reactors 410*a*, 410*b*, 410*c* in series for upgrading a feedstock 412. The feedstock 412 from a surge tank 414 is pressurized, pre-heated, and introduced into a first ebullated bed reactor 410*a* together with hydrogen gas 416, both of which are passed through respective heaters prior to entering the first reactor 410*a*. Upgraded hydrocarbon material 420*a* from the first ebullated bed reactor 410*a* is introduced together with additional hydrogen gas 416 into a second ebullated bed reactor 410*b*. Upgraded hydrocarbon material 420*b* from the second ebullated bed reactor 410*b* is introduced together with additional hydrogen gas 416 into a third ebullated bed reactor 410*c*.

It should be understood that one or more interstage separators (not shown) can optionally be interposed between first and second ebullated bed reactors 410*a*, 410*b* and/or between second and third ebullated bed reactors 410*b*, 410*c*, in order to remove lower boiling fractions and gases from a non-volatile fraction containing liquid hydrocarbons and residual dispersed metal sulfide catalyst particles. It can be desirable to remove lower alkanes, such as hexanes and heptanes, which are valuable fuel products but poor solvents for asphaltenes. Removing volatile materials between multiple reactors enhances production of upgraded products and increases the solubility of asphaltenes in the liquid hydrocarbon material fed to downstream reactor(s). Both increase efficiency of the overall hydroprocessing system.

Upgraded hydrocarbon material 420*c* from the third ebullated bed reactor 410*c* is sent to a high temperature separator 442*a*, which separates volatile and non-volatile fractions. A volatile fraction 446*a* passes through a heat exchanger 450, which removes heat that can be used to preheat hydrogen gas 416 before it is fed into first ebullated bed reactor 410*a*. The somewhat cooled volatile fraction 446*a* is sent to a medium temperature separator 442*b*, which separates a remaining volatile fraction 446*b* from a resulting liquid fraction 448*b* that forms as a result of cooling by heat exchanger 450. The remaining volatile fraction 446*b* is sent downstream to a low temperature separator 442*c* for further separation into a gaseous fraction 452*c* and a degassed liquid fraction 448*c*.

A liquid fraction 448*a* from high temperature separator 442*a* is combined with the resulting liquid fraction 448*b* from the medium temperature separator 442*b* and the mixture sent to a low pressure separator 442*d*, which separates a hydrogen rich gas 452*d* from a degassed liquid fraction 448*d*, which is sent along with the degassed liquid fraction 448*c* from the low temperature separator 442*c* to a backend system 460, which includes one or more distillation towers, including a vacuum distillation tower, where the materials are fractionated into products.

Gaseous fraction 452*c* from low temperature separator 442*c* is purified into off-gas, purge gas, and hydrogen gas 416. Hydrogen gas 416 is compressed, mixed with make-up hydrogen gas 416*a*, and either passed through heat exchanger 450 and introduced into first ebullated bed reactor 410*a* together with feedstock 414 or introduced directly into second and third ebullated bed reactors 410*b*, 410*c*.

Figure 4B:
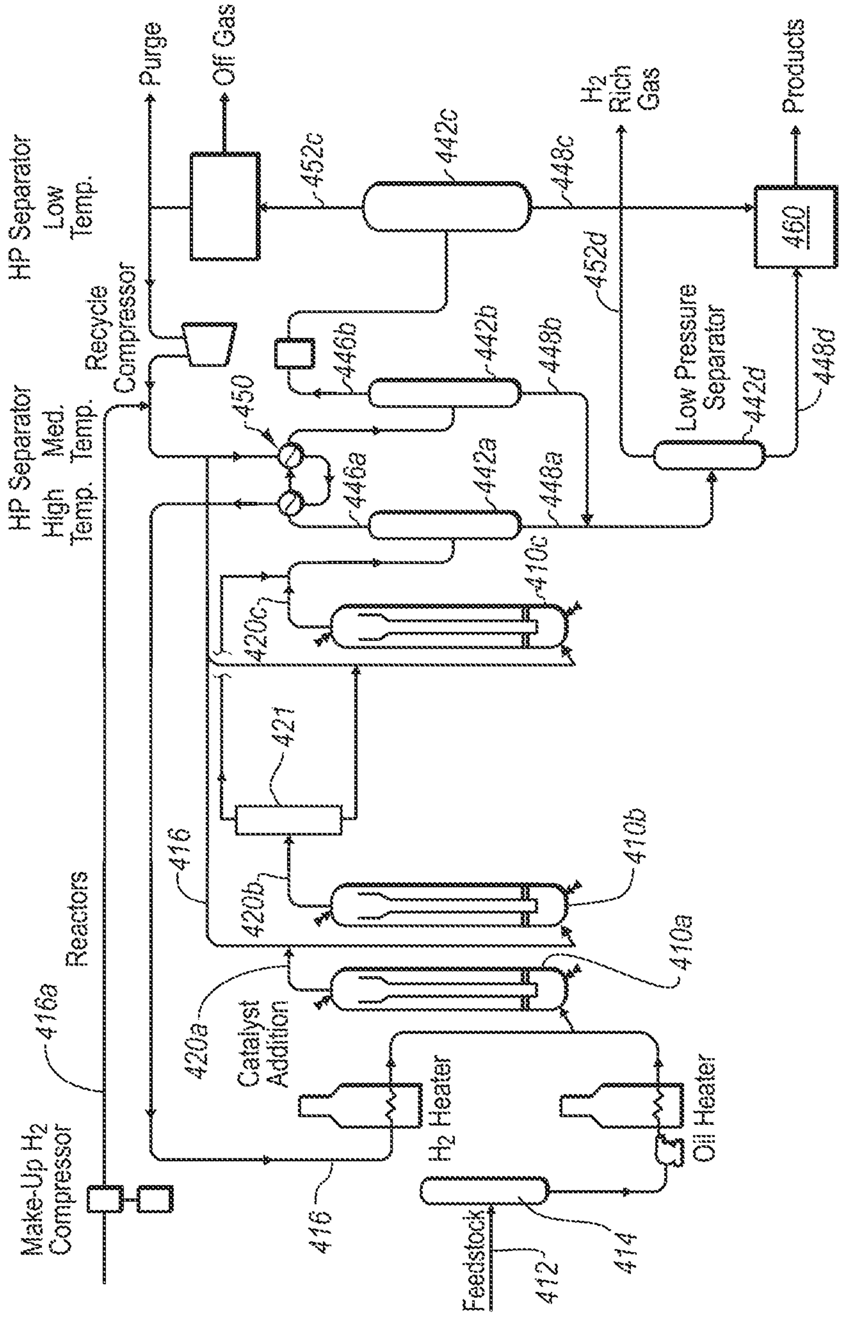
FIG. 4B schematically illustrates an exemplary ebullated bed hydroprocessing system comprising multiple ebullated bed reactors, similar to FIG. 4A, and an interstage separator between two of the reactors.

FIG. 4B schematically illustrates an ebullated bed hydroprocessing system 400 comprising multiple ebullated bed reactors, similar to the system illustrated in FIG. 4A, but showing an interstage separator 421 interposed between the second and third ebullated bed reactors 410*b*, 410*c* (although the interstage separator 421 (or other separator) may be interposed between the first and second ebullated bed reactors 410*a*, 410*b*). As illustrated, effluent from second stage ebullated bed reactor 410*b* enters the interstage separator 421, which can be a high-pressure, high-temperature separator. The liquid fraction from the separator 421 is combined with a portion of the recycle hydrogen from line 416 and fed into the third-stage reactor 410*c*. The vapor fraction from interstage separator 421 bypasses the third-stage reactor 410*c*, mixes with the effluent from third-stage reactor 410*c*, and then passes into a high-pressure, high-temperature separator 442*a*.

This allows lighter, more-saturated components formed in the first two reactor stages 410*a*, 410*b* to bypass the third stage reactor 410*c*. The benefits of this are (1) reduced vapor load on the third-stage reactor 410*c*, which increases volume utilization of the third-stage reactor for converting the remaining heavy components, and (2) reduced concentration of "anti-solvent" components (saturates) which can destabilize (e.g., precipitate) asphaltenes in the third-stage reactor 410*c*.

The hydroprocessing systems are typically configured and operated to promote more severe hydrocracking reactions rather than less severe hydroprocessing reactions, such as hydrotreating. Hydrocracking involves the breaking of carbon-carbon molecular bonds, such as reducing the molecular weight of larger hydrocarbon molecules and/or ring opening of aromatic compounds. Hydrotreating, on the other hand, mainly involves hydrogenation of unsaturated hydrocarbons, with minimal or no breaking of carbon-carbon molecular bonds.

To promote more severe hydrocracking reactions rather than less severe hydrotreating reactions, the hydroprocessing reactor(s) is/are preferably operated at a temperature in a range of about 750° F. (399° C.) to about 860° F. (460° C.), more preferably in a range of about 780° F. (416° C.) to about 830° F. (443° C.), are preferably operated at a pressure in a range of about 1000 psig (6.9 MPa) to about 3000 psig (20.7 MPa), more preferably in a range of about 1500 psig (10.3 MPa) to about 2500 psig (17.2 MPa), and are preferably operated at a liquid hourly space velocity (LHSV) of about 0.05 $hr^{-1}$ to about 0.45 $hr^{-1}$, more preferably about 0.1 $hr^{-1}$ to about 0.35 $hr^{-1}$. The difference between hydrocracking and hydrotreating can be expressed in terms of resid conversion (whereas hydrocracking results in the substantial conversion of higher boiling to lower boiling hydrocarbons, hydrotreating does not).

The hydroprocessing systems disclosed herein can result in an overall resid conversion in a range of about 60% to about 95%, preferably in a range of about 75% to about 90%. The preferred conversion range typically depends on the type of feedstock because of differences in processing difficulty between different feedstocks.

Operating an ebullated bed reactor using a dual catalyst system can result in the same or reduced equipment fouling compared to operating the ebullated bed reactor with only a heterogeneous catalyst. For example, the rate of equipment fouling when using a dual catalyst system rather than a heterogeneous catalyst by itself can result in one or more of the following benefits: (i) reduced frequency of heat exchanger shutdowns and/or distillation tower shutdowns for cleanout; (ii) reduced frequency of changes or cleaning of filters and strainers; (iii) reduced frequency of switches to spare heat exchangers; (iv) reduced rate of decreasing skin temperatures in equipment such as heat exchangers, separators, or distillation towers; (v) reduced rate of increasing furnace tube metal temperatures; and (vi) reduced rate of increasing calculated fouling resistance factors for heat exchangers.

IV. Mixing Systems And Methods

FIGS. 5A-7B illustrate example mixing systems and corresponding methods for producing a well-mixed conditioned heavy oil feedstock. FIGS. 5A-5B illustrate example mixing systems 500 having two parallel mixing lines. FIGS. 6A-6B illustrate example mixing systems 600 having three parallel mixing lines. FIGS. 7A-7B illustrate example mixing systems 700 having four parallel mixing lines. It will be appreciated that FIGS. 5A-7B are merely illustrative of mixing systems within the meaning and scope of the disclosure. The mixing systems may be modified, such as to include additional mixing lines and/or other processing equipment, as desired without deviated from the spirit of the invention.

FIGS. 5A-5B more particularly illustrate mixing systems 500 that are configured to mix a heavy oil feedstock 502 with a diluted precursor mixture 508. The diluted precursor mixture 508 is formed by mixing a catalyst precursor 504 (e.g., an oil soluble catalyst precursor) with a diluent 506 using one or more mixers known in the art, such as one or more in-line static mixers and/or one or more high shear mixers. The heavy oil feedstock 502 and diluted precursor mixture 508 are fed into a common feed line 510, which is split into first and second parallel mixing lines 512*a*, 512*b*.

A heavy oil feedstock side stream 536 can optionally be used as a diluent to make the diluted precursor mixture 508. A cooler 538 can be used to reduce the temperature of the heavy oil feedstock side stream 536 to prevent premature thermal decomposition of the catalyst precursor 504 in the diluted precursor mixture 508 prior to being thoroughly mixed with the heavy oil feedstock 502.

Each mixing line 512*a*, 512*b* may include an upstream valve 514*a*, 514*b*, which can be selectively opened during operation of the mixing lines 512*a*, 512*b* and closed to take a mixing line 512 offline for maintenance and cleaning. When online, the upstream valves 514*a*, 514*b* are open to permit the divided streams of the heavy oil feedstock 502 and diluted precursor mixture 508 to flow through the first and second mixing lines 512*a*, 512*b*. In a preferred embodiment, the first and second parallel mixing lines 512*a*, 512*b* are designed with symmetrical piping and mixing equipment so that pressure drop is substantially equal through each parallel mixing line 512 and equal flow between the different mixing lines 512 can be maintained. Nevertheless, mixing lines 512 of different capacity and flow can used, such as when retrofitting a single-train mixing line to include one or more additional mixing lines.

In the mixing system 500 shown in FIG. 5A, the divided streams of heavy oil feedstock 502 and diluted precursor mixture 508 pass through first and second static inline mixers 516*a*, 516*b* for initial mixing to produce first and second initial mixed streams, which then pass through first and second strainers 518*a*, 518*b* to remove any undesirable solids in the initial mixed streams. The first and second mixed streams are then fed into first and second high shear mixers 520*a*, 520*b*, which provide first and second conditioned feedstock streams. Optional first and second flow meters 522*a*, 522*b* can be provided to measure flow through the first and second mixing lines 512*a*, 512*b* downstream from the first and second high shear mixers 520*a*, 520*b*.

FIG. 5B is similar to FIG. 5A, except that a common static inline mixer 516 is positioned on the common feed line 510 and functions as a pre-mixer upstream from where the first and second parallel mixing lines 512*a* and 512*b* diverge, and the individual static inline mixers 516*a*, 516*b* in the mixing lines 512*a* and 512*b* are omitted.

First and second flow control devices 524*a*, 524*b* are positioned downstream from the high shear mixers 520*a*, 520*b*, respectively. The flow control devices 524*a*, 524*b* can provide multiple functions. When the first and second parallel mixing lines 512*a*, 512*b* are both online, the flow control devices 524*a*, 524*b* will be open. When one of the mixing lines 512 is taken offline, the corresponding flow control device 524 can be closed to prevent backup of pressurized conditioned feedstock from the other mixing line 512 still in operation. The flow control device 524 of the mixing line 512 that is still in operation can be open all the way or, alternatively, can be partially closed to restrict flow and increase upstream pressure to cause or allow a portion of the heavy oil feedstock 502 to enter a bypass line 540.

The conditioned feedstock streams from the first and second mixing lines 512*a*, 512*b* are fed into and combined in a common discharge line 525 to form a common conditioned feedstock stream 546. The common conditioned feedstock stream 546 passes through or past a common flow measurement device 528 (e.g., flow meter) and then through a common flow control device 526 (e.g., valve), is recombined with any heavy oil feedstock from bypass line 540, and then enters a surge tank 530.

A conditioned feedstock side stream 532 from the surge tank 530 can optionally be used as a diluent to make the diluted precursor mixture 508. A cooler 534 can be used to reduce the temperature of the conditioned feedstock side stream 532 to prevent premature thermal decomposition of the catalyst precursor 504 in the diluted precursor mixture 508 prior to being thoroughly mixed with the heavy oil feedstock 502.

When both of the parallel mixing lines 512*a*, 512*b* are online and operational, the common flow control device 526 is open. When one of the mixing lines 512*a*, 512*b* is closed and taken offline, the common flow control device 526 can be partially closed to restrict flow of material through the common discharge line 525 and increase upstream pressure to cause or allow a portion of the heavy oil feedstock to enter the bypass line 540. The common flow control device 526 can be used alone or in combination with one of the flow control devices 524 corresponding to the mixing line 512 that is still in operation.

The bypass line 540 typically does not have heavy oil feedstock 502 flowing through it when both the first and second mixing lines 512*a*, 512*b* are online and in operation. However, when one of the parallel mixing lines 512 is closed and taken offline, the portion of the heavy oil feedstock 502 not fed into the remaining online mixing line 512 is caused or allowed to pass through the bypass line 540 to maintain throughput of the heavy oil feedstock 502 through the mixing system 500. As discussed above, flow of heavy oil feedstock 502 though the bypass line 540 is caused or induced by restricting flow through the common discharge line 525 by partially closing common flow control valve 526 and/or the mixing line valve 524 of the operational mixing line 512. This induces a pressure drop and increases upstream pressure sufficient to cause a portion of the heavy oil feedstock 502 to enter the bypass line 540. An optional flow meter 542 on the bypass line 540 measures the flow rate of heavy oil feedstock 502 passing through the bypass line 540. The bypass line 540 is joined to the common discharge line 525 to combine the heavy oil feedstock 508 from the bypass line with the common conditioned feedstock stream 546 downstream from the flow control device 526 and the flow meter 528.

The flow rate of divided heavy oil feedstock streams that are passed respectively through the remaining operational mixing line 512 and the bypass line 540 can be measured, respectively, by the common flow meter 528 and optionally the bypass flow meter 542. The respective flow rates of material through the remaining operational mixing line 512 and the bypass line 540 can be adjusted by making adjustments to the common flow control valve 526 and/or a bypass line valve 544. By measuring flow rates using flow meters and making adjustments using flow control devices, a desired balance of flow through the various lines can be achieved and maintained. In addition to adjusting flow rate through the bypass line 540, the bypass line valve 544 can be closed or partially restricted to balance line pressure to ensure that heavy oil feedstock 502 does not pass through the bypass line 540, either in a forward or backward direction, when the first and second mixing lines 512*a*, 512*b* are open and operational.

An example method for mixing a catalyst precursor into heavy oil comprises using the mixing system 500 illustrated in FIG. 5A, comprises:

(1) blending a quantity of catalyst precursor 504 with a quantity of diluent 506 to form a diluted precursor mixture 508;

(2) mixing the diluted precursor mixture 508 with a heavy oil feedstock 502 using a plurality of parallel mixing lines 512 to form a plurality of conditioned feedstock streams, each parallel mixing line 512 including one or more mixers 516, 520 and at least one valve 514, 524 for regulating flow in the mixing line 512;

(3) combining the conditioned feedstock streams in a common discharge line 525 downstream from the parallel mixing lines 512 to form a common conditioned feedstock stream 546;

(4) stopping flow through a mixing line 512 and causing or allowing a portion of the heavy oil feedstock 502 to enter a bypass line 540, bypass the parallel mixing lines 512, and combine with the common conditioned feedstock stream 546 in the common discharge line 525; and (5) while the portion of the heavy oil feedstock 502 is passing through the bypass line 540, continuing to mix at least a portion of the diluted precursor mixture 508 with a remaining portion of the heavy oil feedstock 502 using at least one other of the parallel mixing lines 512.

When using the alternative mixing system 500 illustrated in FIG. 5B, the method alternatively includes the step of pre-mixing the diluted precursor mixture 508 with the heavy oil feedstock 502 using the common static inline mixer 516 upstream from where the first and second mixing lines 512*a*, 512*b* diverge. This method also omits mixing the diluted precursor mixture 508 with the heavy oil feedstock 502 using the static inline mixers 516*a*, 516*b* on the first and second mixing lines 512*a*, 512*b* illustrated in FIG. 5A.

By way of illustration and not limitation, a typical hydroprocessing system may require a flow rate of heavy oil of 100 to 300 tonnes per hour. When operating both of first and second parallel mixing lines 512*a*, 512*b*, it may be advantageous or preferable to divide the heavy oil feedstock 502 equally so that there is symmetrical (e.g., equal) flow of material through each of the first and second parallel mixing lines 512*a*, 512*b* (e.g., 50 tonnes per hour through each mixing line 512*a*, 512*b* for a mixing system designed to handle 100 tonnes per hour).

When one of the mixing lines 512 is closed and taken offline, a portion of the heavy oil feedstock is rerouted through the bypass line 540 to maintain the same or similar flow rate of approximately 100 to 300 tonnes per hour of heavy oil feedstock 502 through the mixing system 500. By way of example and not limitation, for a mixing system 500 designed with a total flow rate of 100 tonnes per hour, the flow rate of heavy oil feedstock 502 through the bypass line 540 and remaining online mixing line 512 can be the same, i.e., approximately 50 tonnes per hour through each line. In a preferred embodiment, the flow rate of heavy oil feedstock 502 through the remaining online mixing line 512 is increased to above 50 tonnes per hour, and the flow rate of heavy oil feedstock 502 through the bypass line 540 is decreased to below 50 tonnes per hour.

For example, the flow rate through the remaining online mixing line 512 can be increased, consistent with the capacity limitation of the mixing line and mixers, to at least about 55 tonnes per hour, at least about 60 tonnes per hour, at least about 65 tonnes per hour, or at least about 70 tonnes per hour, such as up to about 75 tonnes per hour. In order to maintain the same or similar flow rate of heavy oil feedstock through the system of 100 tonnes per hour, the corresponding flow rate through the bypass line can be about 45 tonnes or less per hour, or about 40 tonnes or less per hour, or about 35 tonnes or less per hour, or about tonnes or less per hour, such as about 25 tonnes per hour.

Alternatively, it is possible for the flow rate of heavy oil feedstock 502 through the bypass line 540 to be greater than the flow rate through the remaining online mixing line 512. For example, the flow rate through the bypass line 540 can be at least about 55 tonnes per hour, at least about 60 tonnes per hour, at least about 65 tonnes per hour, or at least about 70 tonnes per hour, such as up to about 75 tonnes per hour. In order to maintain the same or similar flow rate of heavy oil feedstock through the system of 100 tonnes per hour, the corresponding flow rate through the remaining online mixing line 512 can be reduced to about tonnes or less per hour, or about 40 tonnes or less per hour, or about 35 tonnes or less per hour, or about 30 tonnes or less per hour, such as about 25 tonnes per hour.

It will be appreciated that the mixing system 500 can be scaled up or down depending on the size of the hydroprocessing reactor(s) that is/are being fed and have a flow rate less than or greater than 100 tonnes per hour. In such cases, a percentage of normal capacity can be used to describe flow rates. If 100% represents the normal flow rate of heavy oil feedstock 502 through the mixing system 500, then during normal operation of the parallel mixing lines 512*a*, 512*b*, the quantity of heavy oil feedstock 502 passing through each mixing line 512 can be about 50% of the total flow. When one of the mixing lines 512 is closed and taken offline, about 50% of the total flow can be diverted to the bypass line 540 while about 50% of the total flow continues to pass through the remaining online mixing line 512.

In a preferred embodiment, and consistent with the capacity limitation of the mixing lines and mixers, the flow rate through the remaining online mixing line 512 can be increased to at least about 55% of total flow, at least about 60% of total flow, at least about 65% of total flow, or at least about 70% of total flow, such as up to about 75% of total flow, through the mixing system 500. In order to maintain the same or similar flow rate of heavy oil feedstock through the mixing system 500, the corresponding flow rate through the bypass line can be about 45% or less of total flow, or about 40% or less of total flow, or about 35% or less of total flow, or about 30% or less of total flow, such as about 25% of total flow, through the mixing system 500.

Alternatively, the flow rate of heavy oil feedstock 502 through the bypass line 540 can be greater than the flow rate through the remaining online mixing line 512. For example, the flow rate through the bypass line 540 can be at least about 55% of total flow, at least about 60% of total flow, at least about 65% of total flow, or at least about 70% of total flow, such as up to about 75% of total flow, through the mixing system 500. In order to maintain the same or similar flow rate of heavy oil feedstock through the mixing system 500, the corresponding flow rate through the remaining online mixing line 512 can be reduced to about 45% or less of total flow, or about 40% or less of total flow, or about 35% or less of total flow, or about 30% or less of total flow, such as about 25% of total flow, through the mixing system 500.

In view of the foregoing, each parallel mixing line 512*a*, 512*b* can have a capacity so as to operate with a flow rate of about 0-55 tonnes per hour, or about 0-60 tonnes per hour, or about 0-65 tonnes per hour, or about 0-70 tonnes per hour, or about 0-75 tonnes per hour. The bypass line 540 may be configured to have a flow capacity of about 0-50 tonnes per hour, about 0-55 tonnes per hour, or about 0-60 tonnes per hour, or about 0-65 tonnes per hour, or about 0-70 tonnes per hour, or about 0-75 tonnes per hour.

In the case where a heavy oil feedstock side stream 536 is used as a diluent to make the diluted precursor mixture 508, and the flow rate of heavy oil feedstock 502 through the mixing system 500 is about 100 tonnes per hour, the amount of the heavy oil feedstock side stream 536 can be up to about 10 tonnes per hour, or up to about 5 tonnes per hour (or between about 0-10 tonnes per hour, or about 0-5 tonnes per hour, depending on conditions within the mixing system 500). Where the flow rate of heavy oil feedstock 502 through the mixing system 500 is less than or greater than 100 tonnes per hour, the flow rate of the heavy oil feedstock side stream 536 used as diluent to make the diluted precursor mixture 508 can be up to about 10%, or about 5%, of total flow (or between about 0-10%, or about 5%, of total flow depending on conditions within the mixing system 500).

In the case where a conditioned feedstock side stream 532 is used as a diluent to make the diluted precursor mixture 508, and the flow rate of heavy oil feedstock 502 through the mixing system 500 is about 100 tonnes per hour, the amount of the conditioned feedstock side stream 532 can be up to about 10 tonnes per hour, or up to about 5 tonnes per hour (or between about 0-10 tonnes per hour, or about 0-5 tonnes per hour, depending on conditions within the mixing system 500). Where the flow rate of heavy oil feedstock 502 through the mixing system 500 is less than or greater than 100 tonnes per hour, the flow rate of the conditioned feedstock side stream 532 used as diluent to make the diluted precursor mixture 508 can be up to about 10%, or about 5%, of total flow (or between about 0-10%, or about 5%, of total flow depending on conditions within the mixing system 500).

FIGS. 6A-6B illustrates alternative mixing systems 600 that are similar to the mixing systems 500 in FIGS. 5A-5B but include three parallel mixing lines 612. The heavy oil feedstock 602 and diluted precursor mixture 608 are fed into a common feed line 610, which is split into first, second, and third parallel mixing lines 612*a*, 612*b*, 612*c*. By way of example, and not limitation, the mixing systems 600 can be configured to have a total flow rate of heavy oil through the system that is greater 100 tonnes per hour, such as 150 to 350 tonnes per hour for example, to accommodate the larger capacity of a larger hydroprocessing reactor and system.

Each mixing line 612*a*, 612*b*, 612*c* may include an upstream valve 614*a*, 614*b*, 614*c*, which can be selectively opened during operation of the mixing lines 612*a*, 612*b*, 612*c* and closed to take a mixing line 612 offline for maintenance and cleaning. When online, the upstream valves 614*a*, 614*b*, 614*c* are open to permit the divided streams of the heavy oil feedstock 602 and diluted precursor mixture 608 to flow through the first, second, and third mixing lines 612*a*, 612*b*, 612*c*. In a preferred embodiment, the parallel mixing lines 612 are designed with symmetrical piping and mixing equipment so that pressure drop is substantially equal through each parallel mixing line 612 and equal flow between the different mixing lines 612 can be maintained. Nevertheless, mixing lines 612 of different capacity and flow can used, such as when retrofitting a single-train or double-train mixing line to include one or more additional mixing lines.

In the mixing system 600 shown in FIG. 6A, the divided streams of heavy oil feedstock 602 and diluted precursor mixture 608 in mixing lines 612*a*, 612*b*, 612*c* are respectively passed through static inline mixers 616*a*, 616*b*, 616*c* for initial mixing to produce first, second, and third initial mixed streams, which are passed through corresponding strainers 618*a*, 618*b*, 618*c* to remove any undesirable solids in the initial mixed streams. The mixed streams are then fed respectively into first, second, and third high shear mixers 620*a*, 620*b*, 620*c*, which provide first, second, and third conditioned feedstock streams. Optional first, second, and third flow meters 622*a*, 622*b*, 622*c* can be provided to measure flow through each of the three mixing lines 612 downstream from the high shear mixers 620.

FIG. 6B is similar to FIG. 6A, except that a common static inline mixer 616 is positioned on the common feed line 610 and functions as a pre-mixer upstream from where the first, second, and third parallel mixing lines 612*a*, 612*b*, and 612*c* diverge, and the individual static inline mixers 616*a*, 616*b*, 616*c* in the mixing lines 612*a*, 612*b*, and 612*c* are omitted.

Flow control devices 624*a*, 624*b*, 624*c* are positioned downstream from each of the high shear mixers 620*a*, 620*b*, 620*c*, respectively. The flow control devices 624 can provide multiple functions. When the first, second, and third parallel mixing lines 612*a*, 612*b*, 612*c* are all online, the flow control devices 624*a*, 624*b*, 624*c* will be open. When one of the mixing lines 612 is taken offline, the corresponding flow control device 624 can be closed to prevent backup of pressured conditioned feedstock from the other mixing lines 612 that are still in operation. The flow control device 624 of each of the mixing lines 612 that is still in operation can be open all the way or, alternatively, can be partially closed to restrict flow and increase upstream pressure to cause or allow a portion of the heavy oil feedstock to enter a bypass line 640.

The conditioned feedstock streams from the first, second, and third mixing lines 612*a*, 612*b*, 612*c* are fed into and combined in a common discharge line 625 to form a common conditioned feedstock stream 646. The common conditioned feedstock stream 646 passes through or past a common flow measurement device 628 (e.g., flow meter) and then through a common flow control device 626 (e.g., valve), is recombined with any heavy oil feedstock from bypass line 640, and then enters a surge tank 630.

When the parallel mixing lines 612*a*, 612*b*, 612*c* are all online and operational, the flow control device 626 is open. When one of the mixing lines 612*a*, 612*b*, 612*c* is closed and taken offline, the common flow control device 626 can be partially closed to restrict flow of material through the common discharge line 625 and increase upstream pressure to cause or allow a portion of the heavy oil feedstock to enter the bypass line 640. The common flow control device 626 can be used alone or in combination with one or both flow control devices 624 corresponding to the mixing lines 612 that are still in operation.

The bypass line 640 typically does not have heavy oil feedstock 602 flowing through it when the mixing lines 612*a*, 612*b*, 612*c* are all online and in operation. However, when one of the parallel mixing lines 612 is closed and taken offline, the portion of the heavy oil feedstock 602 not fed into the remaining online mixing lines 612 is caused or allowed to pass through the bypass line 640 to maintain throughput of the heavy oil feedstock 602 through the mixing system 600. As discussed above, flow of heavy oil feedstock 602 though the bypass line 640 is caused or induced by restricting flow through the common discharge line 625 by partially closing common flow control valve 626 and/or the mixing line valves 624 of the operational mixing lines 612. This induces a pressure drop and increases upstream pressure sufficient to cause a portion of the heavy oil feedstock 602 to enter the bypass line 640. An optional flow meter 642 on the bypass line 640 measures the flow rate of heavy oil feedstock 602 passing through the bypass line 640. The bypass line 640 is joined to the common discharge line 625 to combine the heavy oil feedstock 608 from the bypass line with the common conditioned feedstock stream 646 downstream from the flow control device 626 and the flow meter 628.

The flow rates of divided heavy oil feedstock streams that are passed respectively through the remaining operational mixing lines 612, the common discharge line 625, and the bypass line 640 can be measured, respectively, by respective mixing line flow meters 622, the common flow meter 628, and optionally the bypass flow meter 642. The respective flow rates of material through the remaining operational mixing lines 612 and the bypass line 640 can be adjusted by making adjustments to the common flow control valve 626, a mixing line valve 624, and/or a bypass line valve 644. By measuring flow rates using flow meters and making adjustments using flow control devices, a desired balance of flow through the various lines can be achieved and maintained. In addition to adjusting flow rate through the bypass line 640, the bypass line valve 644 can be closed or partially restricted to balance line pressure to ensure that heavy oil feedstock 602 does not pass through the bypass line 640, either in a forward or backward direction, when the three mixing lines 612 are open and operational.

An example method for mixing a catalyst precursor into heavy oil comprises using the mixing system 600 illustrated in FIG. 6A, comprises:

(1) blending a quantity of catalyst precursor 604 with a quantity of diluent 606 to form a diluted precursor mixture 608;

(2) mixing the diluted precursor mixture 608 with a heavy oil feedstock 602 using three parallel mixing lines 612*a*, 612*b*, 612*c* to form three conditioned feedstock streams, each parallel mixing line 612 including one or more mixers 616, 620 and at least one valve 614, 624 for regulating flow in the mixing line 612;

(3) combining the conditioned feedstock streams in a common discharge line 625 downstream from the three parallel mixing lines 612 to form a common conditioned feedstock stream 646;

(4) stopping flow through one of the mixing lines 612 and causing or allowing a portion of the heavy oil feedstock 602 to enter a bypass line 640, bypass the parallel mixing lines 612, and combine with the common conditioned feedstock stream 646 in the common discharge line 625; and (5) while the portion of the heavy oil feedstock 602 is passing through the bypass line 640, continuing to mix at least a portion of the diluted precursor mixture 608 with a remaining portion of the heavy oil feedstock 602 using the other two parallel mixing lines 612.

When using the alternative mixing system 600 illustrated in FIG. 6B, the method alternatively includes the step of pre-mixing the diluted precursor mixture 608 with the heavy oil feedstock 602 using the common static inline mixer 616 upstream from where the first, second, and third mixing lines 612*a*, 612*b*, 612*c* diverge. This method also omits mixing the diluted precursor mixture 608 with the heavy oil feedstock 602 using the static inline mixers 616*a*, 616*b*, 616*c* on the mixing lines 612*a*, 612*b*, 616*c* illustrated in FIG. 6A.

By way of illustration and not limitation, a large hydroprocessing system may require a flow rate of heavy oil of 150 to 350 tonnes per hour. When operating the first, second, and third parallel mixing lines 612*a*, 612*b*, 612*c*, it may be advantageous or preferable to divide the heavy oil feedstock 602 equally so that there is symmetrical (e.g., equal) flow of material through each of the parallel mixing lines 612*a*, 612*b*, 612*c* (e.g., 50 tonnes per hour through each mixing line 612 for a mixing system designed to handle 150 tonnes per hour).

When one of the three mixing lines 612 is closed and taken offline, a portion of the heavy oil feedstock is rerouted through the bypass line 640 to maintain the same or similar flow rate of approximately 150 to 350 tonnes per hour of heavy oil feedstock 602 through the mixing system 600. By way of example and not limitation, for a mixing system 600 designed with a total flow rate of 150 tonnes per hour, the flow rate of heavy oil feedstock 602 through the bypass line 640 and each of the remaining online mixing line 612 can be the same, i.e., approximately 50 tonnes per hour through each line. In a preferred embodiment, the flow rate of heavy oil feedstock 602 through each remaining online mixing line 612 is increased to above 50 tonnes per hour, and the flow rate of heavy oil feedstock 602 through the bypass line 640 is decreased to below 50 tonnes per hour.

For example, the flow rate through one or both remaining online mixing lines 612 can be increased, consistent with the capacity limitation of the mixing lines and mixers, to at least about 53 tonnes per hour, at least about 56 tonnes per hour, at least about 59 tonnes per hour, or at least about 62 tonnes per hour, such as up to about 65 tonnes per hour. In order to maintain the same or similar flow rate of heavy oil feedstock through the system of 150 tonnes per hour, the corresponding flow rate through the bypass line can be about 44 tonnes or less per hour, or about 38 tonnes or less per hour, or about 32 tonnes or less per hour, or about 26 tonnes or less per hour, such as about 20 tonnes per hour.

Alternatively, it is possible for the flow rate of heavy oil feedstock 602 through the bypass line 640 to be greater than the flow rate through the remaining online mixing lines 612. For example, the flow rate through the bypass line 640 can be at least about 55 tonnes per hour, at least about 60 tonnes per hour, at least about 65 tonnes per hour, or at least about 70 tonnes per hour, such as up to about 75 tonnes per hour. In order to maintain the same or similar flow rate of heavy oil feedstock through the system of 150 tonnes per hour, the combined flow rate through one or both of the remaining online mixing lines 612 can be reduced to about 95 tonnes or less per hour, or about 90 tonnes or less per hour, or about 85 tonnes or less per hour, or about 80 tonnes or less per hour, such as about 75 tonnes per hour.

It will be appreciated that the mixing system 600 can be scaled up or down depending on the size of the hydroprocessing reactor(s) that is/are being fed and have a flow rate less than or greater than 150 tonnes per hour. In such cases, a percentage of normal capacity can be used to describe flow rates. If 100% represents the normal flow rate of heavy oil feedstock 602 through the mixing system 600, then during normal operation of the three parallel mixing lines 612*a*, 612*b*, 612*c*, the quantity of heavy oil feedstock 602 passing through each mixing line 612 can be about 33% of the total flow. When one of the mixing lines 612 is closed and taken offline, about 33% of the total flow can be diverted to the bypass line 640 while about 67% of the total flow continues to pass through the remaining online mixing lines 612.

In a preferred embodiment, and consistent with the capacity limitation of the mixing lines and mixers, the combined flow rate through the remaining online mixing lines 612 can be increased to at least about 70% of total flow, at least about 75% of total flow, at least about 80% of total flow, or at least about 85% of total flow, such as up to about 90% of total flow. In order to maintain the same or similar flow rate of heavy oil feedstock through the system, the corresponding flow rate through the bypass line can be about 30% or less of total flow, or about 25% or less of total flow, or about 20% or less of total flow, or about 15% or less of total flow, such as about 10% of total flow.

Alternatively, the flow rate of heavy oil feedstock 602 through the bypass line 640 can be greater than the flow rate through each of the remaining online mixing lines 612. For example, the flow rate through the bypass line 640 can be at least about 35% of total flow, at least about 40% of total flow, at least about 45% of total flow, or at least about 50% of total flow, such as up to about 55% of total flow, through the mixing system 600. In order to maintain the same or similar flow rate of heavy oil feedstock through the mixing system 600, the combined flow rate through the remaining online mixing lines 612 can be reduced to about 65% or less of total flow, or about 60% or less of total flow, or about 55% or less of total flow, or about 50% or less of total flow, such as about 45% of total flow, through the mixing system 600.

In view of the foregoing, each parallel mixing line 612*a*, 612*b*, 612*c* can have a capacity so as to operate with a flow rate of about 0-53 tonnes per hour, or about 0-56 tonnes per hour, or about 0-59 tonnes per hour, or about 0-62 tonnes per hour, or about 0-65 tonnes per hour. The bypass line 640 may be configured to have a flow capacity of about 0-50 tonnes per hour, about 0-55 tonnes per hour, or about 0-60 tonnes per hour, or about 0-65 tonnes per hour, or about 0-70 tonnes per hour, or about 0-75 tonnes per hour, or about 0-80 tonnes per hour, or about 0-90 tonnes per hour, or about 0-100 tonnes per hour. FIGS. 6A-6B therefore illustrates how the capacity of the mixing system 600 can be increased by about 50% or more without increasing the capacity of each mixing line 612. It will be appreciated, however, that the mixing lines 612 can have smaller or greater capacities as desired.

FIGS. 7A-7B illustrates alternative mixing systems 700 that are similar to the mixing systems 500 in FIGS. 5A-5B and mixing systems 600 in FIGS. 6A-6B but includes four parallel mixing lines 712. The heavy oil feedstock 702 and diluted precursor mixture 708 are fed into a common feed line 710, which is split into four parallel mixing lines 712*a*, 712*b*, 712*c*, 712*d*. By way of example, and not limitation, the mixing systems 700 can be configured to have a total flow rate of heavy oil through the system that is greater than 150 tonnes per hour, such as 200 to 400 tonnes per hour for example, to accommodate the even larger capacity of an even larger hydroprocessing reactor and system.

Each mixing line 712*a*, 712*b*, 712*c*, 712*d* may include an upstream valve 714*a*, 714*b*, 714*c*, 714*d*, which can be selectively opened during operation of the mixing lines 712*a*, 712*b*, 712*c*, 714*d* and closed to take a mixing line 712 offline for maintenance and cleaning. When online, the upstream valves 714*a*, 714*b*, 714*c*, 714*df* are open to permit the divided streams of the heavy oil feedstock 702 and diluted precursor mixture 708 to flow through the first, second, third, fourth mixing lines 712*a*, 712*b*, 712*c*, 714*d*. In a preferred embodiment, the parallel mixing lines 712 are designed with symmetrical piping and mixing equipment so that pressure drop is substantially equal through each parallel mixing line 712 and equal flow between the different mixing lines 712 can be maintained. Nevertheless, mixing lines 712 of different capacity and flow can used, such as when retrofitting a single-train, double-train, or triple-train mixing line to include one or more additional mixing lines.

In the mixing system 700 shown in FIG. 7A, the divided streams of heavy oil feedstock 702 and diluted precursor mixture 708 in mixing lines 712*a*, 712*b*, 712*c*, 712*d* are respectively passed through static inline mixers 716*a*, 716*b*, 716*c*, 716*d* for initial mixing to produce first, second, third, and fourth initial mixed streams, which are passed through corresponding strainers 718*a*, 718*b*, 718*c*, 718*d* to remove any undesirable solids in the initial mixed streams. The mixed streams are then fed respectively into first, second, third, and fourth high shear mixers 720*a*, 720*b*, 720*c*, 720*d*, which provide first, second, third, and fourth conditioned feedstock streams. Optional first, second, third, and fourth flow meters 722*a*, 722*b*, 722*c*, 722*d* can be provided to measure flow through each of the four mixing lines 712 downstream from the high shear mixers 720.

FIG. 7B is similar to FIG. 7A, except that a common static inline mixer 716 is positioned on the common feed line 710 and functions as a pre-mixer upstream from where the first, second, third, and fourth parallel mixing lines 712*a*, 712*b*, 712*c*, and 712*d* diverge, and the individual static inline mixers, 716*a*, 716*b*, 716*c*, 716*d* in the mixing lines 712*a*, 712*b*, 712*c*, and 712*d* are omitted.

Flow control devices 724*a*, 724*b*, 724*c*, 742*d* are positioned downstream from each of the high shear mixers 720*a*, 720*b*, 720*c*, 720*d*, respectively. The flow control devices 724 can provide multiple functions. When the first, second, third, and fourth parallel mixing lines 712*a*, 712*b*, 712*c*, 714*d* are all online, the flow control devices 724*a*, 724*b*, 724*c*, 724*d* will be open. When one or two of the mixing lines 712 is/are taken offline, the corresponding flow control device(s) 724 can be closed to prevent backup of pressured conditioned feedstock from the other mixing lines 712 that are still in operation. The flow control device 724 of each of the mixing lines 712 that is still in operation can be open all the way or, alternatively, can be partially closed to restrict flow and increase upstream pressure to cause or allow a portion of the heavy oil feedstock to enter a bypass line 740.

The conditioned feedstock streams from the first, second, third, and fourth mixing lines 712*a*, 712*b*, 712*c*, 712*d* are fed into and combined in a common discharge line 725 to form a common conditioned feedstock stream 746. The common conditioned feedstock stream 746 passes through or past a common flow measurement device 728 (e.g., flow meter) and then through a common flow control device 726 (e.g., valve), is recombined with any heavy oil feedstock from bypass line 740, and then enters a surge tank 730.

When the parallel mixing lines 712*a*, 712*b*, 712*c*, 712*d* are all online and operational, the flow control device 726 is open. When one or two of the mixing lines 712*a*, 712*b*, 712*c*, 712*d* is/are closed and taken offline, the common flow control device 726 can be partially closed to restrict flow of material through the common discharge line 725 and create a pressure drop to cause or allow a portion of the heavy oil feedstock to enter the bypass line 740. The common flow control device 726 can be used alone or in combination with one or more flow control devices 724 corresponding to the mixing lines 712 that are still in operation.

The bypass line 740 typically does not have heavy oil feedstock 702 flowing through it when the mixing lines 712*a*, 712*b*, 712*c*, 712*d* are all online and in operation. However, when one or two of the parallel mixing lines 712 is closed and taken offline, the portion of the heavy oil feedstock 702 not fed into the remaining online mixing lines 712 is caused or allowed to pass through the bypass line 740 to maintain throughput of the heavy oil feedstock 702 through the mixing system 700. As discussed above, flow of heavy oil feedstock 702 though the bypass line 740 is caused or induced by restricting flow through the common discharge line 725 by partially closing common flow control valve 726 and/or the mixing line valves 724 of the operational mixing lines 712. This induces a pressure drop and increases upstream pressure sufficient to cause a portion of the heavy oil feedstock 702 to enter the bypass line 740. An optional flow meter 742 on the bypass line 740 measures the flow rate of heavy oil feedstock 702 passing through the bypass line 740. The bypass line 740 is joined to the common discharge line 725 to combine the heavy oil feedstock 708 from the bypass line with the common conditioned feedstock stream 746 downstream from the flow control device 726 and the flow meter 728.

The flow rates of divided heavy oil feedstock streams that are passed respectively through the remaining operational mixing lines 712, the common discharge line 725, and the bypass line 740 can be measured, respectively, by respective mixing line flow meters 722, the common flow meter 728, and optionally the bypass flow meter 742. The respective flow rates of material through the remaining operational mixing lines 712 and the bypass line 740 can be adjusted by making adjustments to the common flow control valve 726, mixing line valve 724, and/or a bypass line valve 744. By measuring flow rates using flow meters and making adjustments using flow control devices, a desired balance of flow through the various lines can be achieved and maintained. In addition to adjusting flow rate through the bypass line 740, the bypass line valve 744 can be closed or partially restricted to balance line pressure to ensure that heavy oil feedstock 702 does not pass through the bypass line 740, either in a forward or backward direction, when the four mixing lines 712 are open and operational.

An example method for mixing a catalyst precursor into heavy oil comprises using the mixing system 700 illustrated in FIG. 7A, comprises:

(1) blending a quantity of catalyst precursor 704 with a quantity of diluent 706 to form a diluted precursor mixture 708;

(2) mixing the diluted precursor mixture 708 with a heavy oil feedstock 702 using four parallel mixing lines 712*a*, 712*b*, 712*c*, 714*d* to form four conditioned feedstock streams, each parallel mixing line 712 including one or more mixers 716, 720 and at least one valve 714, 724 for regulating flow in the mixing line 712;

(3) combining the conditioned feedstock streams in a common discharge line 725 downstream from the four parallel mixing lines 712 to form a common conditioned feedstock stream 746;

(4) stopping flow through one or two of the mixing lines 712 and causing or allowing a portion of the heavy oil feedstock 702 to enter a bypass line 740, bypass the parallel mixing lines 712, and combine with the common conditioned feedstock stream 746 in the common discharge line 725; and (5) while the portion of the heavy oil feedstock 702 is passing through the bypass line 740, continuing to mix at least a portion of the diluted precursor mixture 708 with a remaining portion of the heavy oil feedstock 702 using two or three other parallel mixing lines 712.

When using the alternative mixing system 700 illustrated in FIG. 7B, the method alternatively includes the step of pre-mixing the diluted precursor mixture 708 with the heavy oil feedstock 702 using the common static inline mixer 716 upstream from where the first, second, third, and fourth mixing lines 712*a*, 712*b*, 712*c*, 712*d* diverge. This method also omits mixing the diluted precursor mixture 708 with the heavy oil feedstock 702 using the static inline mixers 716*a*, 716*b*, 716*c*, 712*d* in the mixing lines 712*a*, 712*b*, 716*c*, 716*d* illustrated in FIG. 7A.

By way of illustration and not limitation, a very large hydroprocessing system may require a flow rate of heavy oil of 200 to 400 tonnes per hour. When operating the first, second, third, and fourth parallel mixing lines 712*a*, 712*b*, 712*c*, 712*d*, it may be advantageous or preferable to divide the heavy oil feedstock 702 equally so that there is symmetrical (e.g., equal) flow of material through each of the parallel mixing lines 712*a*, 712*b*, 712*c*, 712*d* (e.g., 50 tonnes per hour through each mixing line 712 for a mixing system designed to handle 200 tonnes per hour).

When one or two of the four mixing lines 712 is closed and taken offline, a portion of the heavy oil feedstock is rerouted through the bypass line 740 to maintain the same or similar flow rate of approximately 200 to 400 tonnes per hour of heavy oil feedstock 702 through the mixing system 700. By way of example and not limitation, for a mixing system 700 designed to have a total flow rate of 200 tonnes per hour, the flow rate of heavy oil feedstock 702 through the bypass line 740 and each of the remaining online mixing line 712 can be the same, e.g., approximately 50 tonnes per hour through each line. In a preferred embodiment, the flow rate of heavy oil feedstock 702 through each remaining online mixing line 712 is increased to above 50 tonnes per hour, and the flow rate of heavy oil feedstock 702 through the bypass line 740 is decreased to below 50 tonnes per hour.

For example, the flow rate through at least one remaining online mixing line 712 can be increased, consistent with the capacity limitation of the mixing lines and mixers, to at least about 52 tonnes per hour, at least about 54 tonnes per hour, at least about 56 tonnes per hour, or at least about 58 tonnes per hour, such as up to about 60 tonnes per hour. In order to maintain the same or similar flow rate of heavy oil feedstock through the system of 200 tonnes per hour when one of the mixing lines 712 is closed, the corresponding flow rate through the bypass line can be about 44 tonnes or less per hour, or about 38 tonnes or less per hour, or about 32 tonnes or less per hour, or about 26 tonnes or less per hour, such as about 20 tonnes per hour. In order to maintain the same or similar flow rate of heavy oil feedstock through the system of 200 tonnes per hour when two of the mixing lines 712 are closed, the corresponding flow rate through the bypass line can be about 96 tonnes or less per hour, or about 92 tonnes or less per hour, or about 88 tonnes or less per hour, or about 84 tonnes or less per hour, such as about 80 tonnes per hour.

Alternatively, it is possible for the flow rate of heavy oil feedstock 702 through the bypass line 740 to be greater than the flow rate through the remaining online mixing lines 712. For example, the flow rate through the bypass line 740 can be at least about 55 tonnes per hour, at least about 60 tonnes per hour, at least about 65 tonnes per hour, or at least about 70 tonnes per hour, such as up to about 75 tonnes per hour. In order to maintain the same or similar flow rate of heavy oil feedstock through the system of 200 tonnes per hour, the combined flow rate through the remaining online mixing lines 712 can be reduced to about 145 tonnes or less per hour, or about 140 tonnes or less per hour, or about 135 tonnes or less per hour, or about 130 tonnes or less per hour, such as about 125 tonnes per hour.

It will be appreciated that the mixing system 700 can be scaled up or down depending on the size of the hydroprocessing reactor(s) that is/are being fed and have a flow rate less than or greater than 200 tonnes per hour. In such cases, a percentage of normal capacity can be used to describe flow rates. If 100% represents the normal flow rate of heavy oil feedstock 702 through the mixing system 700, then during normal operation of the four parallel mixing lines 712*a*, 712*b*, 712*c*, 712*d*, the quantity of heavy oil feedstock 702 passing through each mixing line 712 can be about 25% of the total flow. When one of the mixing lines 712 is closed and taken offline, about 25% of the total flow can be diverted to the bypass line 740 while about 75% of the total flow continues to pass through the remaining online mixing lines 712. When two of the mixing lines 712 are closed and taken offline, about 25-50% of the total flow can be diverted to the bypass line 740 while about 50-75% of the total flow continues to pass through the remaining online mixing lines 712.

In a preferred embodiment, and consistent with the capacity limitation of the mixing lines and mixers, the combined flow rate through the remaining online mixing lines 712 can be increased to at least about 75% of total flow, at least about 80% of total flow, at least about 85% of total flow, or at least about 90% of total flow, such as up to about 95% of total flow. In order to maintain the same or similar flow rate of heavy oil feedstock through the system, the corresponding flow rate through the bypass line can be about 25% or less of total flow, or about 20% or less of total flow, or about 15% or less of total flow, or about 10% or less of total flow, such as about 5% of total flow.

Alternatively, the flow rate of heavy oil feedstock 702 through the bypass line 740 can be greater than the flow rate through each of the remaining online mixing lines 712. For example, the flow rate through the bypass line 740 can be at least about 27.5% of total flow, at least about 30% of total flow, at least about 32.5% of total flow, or at least about 35% of total flow, such as up to about 37.5% of total flow, through the mixing system 700. In order to maintain the same or similar flow rate of heavy oil feedstock through the mixing system 700, the combined flow rate through the remaining online mixing lines 712 can be reduced to about 72.5% or less of total flow, or about 70% or less of total flow, or about 67.5% or less of total flow, or about 65% or less of total flow, such as about 62.5% of total flow, through the mixing system 700.

In view of the foregoing, each parallel mixing line 712*a*, 712*b*, 712*c*, 712*d* can have a capacity so as to operate with a flow rate of about 0-52 tonnes per hour, or about 0-54 tonnes per hour, or about 0-56 tonnes per hour, or about 0-58 tonnes per hour, or about 0-60 tonnes per hour. The bypass line 740 may be configured to have a flow capacity of about 0-50 tonnes per hour, about 0-55 tonnes per hour, or about 0-60 tonnes per hour, or about 0-65 tonnes per hour, or about 0-70 tonnes per hour, or about 0-75 tonnes per hour or about 0-80 tonnes per hour, or about 0-90 tonnes per hour, or about 0-100 tonnes per hour. FIGS. 7A and 7B therefore illustrates how the capacity of the mixing system 700 can be increased by about 100% without increasing the capacity of each mixing line 712. It will be appreciated, however, that the mixing lines 712 can have smaller or greater capacities as desired.

In some embodiments, dispersed metal sulfide catalyst particles are formed in situ within an entirety of the heavy oil added to the hydroprocessing reactors. This can be accomplished using the disclosed mixing methods and systems to initially mix a catalyst precursor with a diluent to form a diluted precursor mixture, which is then mixed with the entirety of the heavy oil in multiple parallel mixing lines to form parallel conditioned feedstock streams, which are combined into a common conditioned feedstock stream, periodically with heavy oil feedstock from the bypass line, and then heated to decompose the catalyst precursor and cause or allow catalyst metal to react with sulfur and/or sulfur-containing molecules in and/or added to the heavy oil to form the dispersed metal sulfide catalyst particles in situ.

The catalyst precursor can be oil-soluble and have a decomposition temperature in a range from about 100° C. (212° F.) to about 350° C. (662° F.), or in a range of about 150° C. (302° F.) to about 300° C. (572° F.), or in a range of about 175° C. (347° F.) to about 250° C. (482° F.). Example catalyst precursors include organometallic complexes or compounds, more specifically oil soluble compounds or complexes of transition metals and organic acids, having a decomposition temperature or range high enough to avoid substantial decomposition when mixed with a heavy oil feedstock under suitable mixing conditions. When mixing the catalyst precursor with a hydrocarbon oil diluent, it is advantageous to maintain the diluent at a temperature below which significant decomposition of the catalyst precursor occurs. One skilled in the art can select a mixing temperature profile that results in intimate mixing of a selected precursor composition without substantial decomposition prior to formation of the dispersed metal sulfide catalyst particles in situ.

Example catalyst precursors include, but are not limited to, molybdenum 2-ethylhexanoate, molybdenum octoate, molybdenum naphthenate, vanadium naphthenate, vanadium octoate, molybdenum hexacarbonyl, vanadium hexacarbonyl, and iron pentacarbonyl. Other catalyst precursors include molybdenum salts comprising a plurality of cationic molybdenum atoms and a plurality of carboxylate anions of at least 8 carbon atoms and that are at least one of (a) aromatic, (b) alicyclic, or (c) branched, unsaturated and aliphatic. By way of example, each carboxylate anion may have between 8 and 17 carbon atoms or between 11 and 15 carbon atoms. Examples of carboxylate anions that fit at least one of the foregoing categories include carboxylate anions derived from carboxylic acids selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), and combinations thereof.

In other embodiments, carboxylate anions suitable for use in making oil soluble, thermally stable, molybdenum catalyst precursor compounds are derived from carboxylic acids selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), 10-undecenoic acid, dodecanoic acid, and combinations thereof. It has been discovered that molybdenum catalyst precursors made using carboxylate anions derived from the foregoing carboxylic acids possess improved thermal stability.

Catalyst precursors with higher thermal stability can have a first decomposition temperature higher than 210° C., higher than about 225° C., higher than about 230° C., higher than about 240° C., higher than about 275° C., or higher than about 290° C. Such catalyst precursors can have a peak decomposition temperature higher than 250° C., or higher than about 260° C., or higher than about 270° C., or higher than about 280° C., or higher than about 290° C., or higher than about 330° C.

In some embodiments, the conditioned feedstock is preheated using a heating apparatus before entering the hydroprocessing reactor in order to form at least a portion of the dispersed metal sulfide catalyst particles in situ within the heavy oil before entering the reactor. In other embodiments, the conditioned feedstock can be heated or further heated in the hydroprocessing reactor in order to form at least a portion of the dispersed metal sulfide catalyst particles in situ within the heavy oil.

Using the disclosed mixing methods and systems, the dispersed metal sulfide catalyst particles are formed in a multi-step process. First, an oil-soluble catalyst precursor is premixed with a hydrocarbon diluent to form a diluted precursor mixture. Examples of suitable hydrocarbon diluents include, but are not limited to, vacuum gas oil (which typically has a nominal boiling range of 360-524° C.) (680-975° F.), decant oil or cycle oil (which typically has a nominal boiling range of 360°-550° C.) (680-1022° F.), and atmospheric gas oil (which typically has a nominal boiling range of 200°-360° C.) (392-680° F.), a portion of the heavy oil feedstock, and other hydrocarbons that nominally boil at a temperature higher than about 200° C.

The ratio of catalyst precursor to hydrocarbon oil diluent used to make the diluted precursor mixture can be in a range of about 1:500 to about 1:1, or in a range of about 1:150 to about 1:2, or in a range of about 1:100 to about 1:5 (e.g., 1:100, 1:50, 1:30, or 1:10). The amount of catalyst metal (e.g., molybdenum) in the diluted precursor mixture is preferably in a range of about 100 ppm to about 7000 ppm, more preferably in a range of about 300 ppm to about 4000 ppm, by weight of the diluted precursor mixture.

The catalyst precursor is advantageously mixed with the hydrocarbon diluent below a temperature at which a significant portion of the catalyst precursor decomposes. The mixing may be performed at temperature in a range of about 25° C. (77° F.) to about 250° C. (482° F.), or in range of about 50° C. (122° F.) to about 200° C. (392° F.), or in a range of about 75° C. (167° F.) to about 150° C. (302° F.), to form the diluted precursor mixture. The temperature at which the diluted precursor mixture is formed may depend on the decomposition temperature and/or other characteristics of the catalyst precursor that is utilized and/or characteristics of the hydrocarbon diluent, such as viscosity.

The catalyst precursor is preferably mixed with the diluent for a time period in a range of about 0.1 second to about 5 minutes, or about 0.3 second to about 3 minutes, or about 0.5 second to about 1 minute, or about 0.7 second to about 30 seconds, or about 1 second to about seconds. The actual mixing time is dependent, at least in part, on the temperature (i.e., which affects the viscosity of the fluids) and mixing intensity. Mixing intensity is dependent, at least in part, on the number of stages e.g., for an in-line static mixer.

Pre-blending the catalyst precursor with a hydrocarbon diluent to form a diluted precursor mixture, followed by blending the diluted precursor mixture with the heavy oil feedstock, greatly aids in thoroughly and intimately blending the catalyst precursor into the feedstock, particularly in the relatively short time periods required for large-scale industrial operations. Forming a diluted precursor mixture shortens the overall mixing time by (1) reducing or eliminating differences in solubility between a more polar catalyst precursor and a more hydrophobic heavy oil feedstock, (2) reducing or eliminating differences in rheology between the catalyst precursor and heavy oil feedstock, and/or (3) breaking up catalyst precursor molecules to form a solute within the hydrocarbon diluent that is more easily dispersed within the heavy oil feedstock.

The diluted precursor mixture is combined with heavy oil and mixed for a time sufficient and in a manner so as to disperse the catalyst precursor throughout the heavy oil to form a conditioned feedstock in which the catalyst precursor is thoroughly mixed with the feedstock before thermal decomposition and formation of active metal sulfide catalyst particles in situ. In order to obtain sufficient mixing of the catalyst precursor within the feedstock, the diluted precursor mixture and feedstock are advantageously mixed for a time period in a range of about 0.1 second to about 5 minutes, or in a range from about 0.5 second to about 3 minutes, or in a range of about 1 second to about 1 minute. Increasing the vigorousness and/or shearing energy of the mixing process generally reduce the time required to effect thorough mixing.

Examples of mixing apparatus that can be used to effect thorough mixing of the diluted precursor mixture with heavy oil include, but are not limited to, high shear mixing such as mixing created in a vessel with a propeller or turbine impeller; static in-line mixers; static in-line mixers in combination with in-line high shear mixers; static in-line mixers in combination with in-line high shear mixers followed by a surge tank; combinations of the foregoing followed by one or more multi-stage centrifugal pumps; and one or more multi-stage centrifugal pumps. According to some embodiments, continuous rather than batch-wise mixing can be carried out using high energy pumps having multiple chambers within which the catalyst precursor and heavy oil feedstock are churned and mixed as part of the pumping process itself. The foregoing mixing apparatus may also be used for the pre-mixing process discussed above in which the catalyst precursor is mixed with the hydrocarbon diluent to form the catalyst precursor mixture.

In the case of heavy oil feedstocks that are solid or extremely viscous at room temperature, such feedstocks may advantageously be heated in order to soften them and create a feedstock having sufficiently low viscosity so as to allow good mixing of the oil soluble catalyst precursor into the feedstock. In general, decreasing the viscosity of the heavy oil feedstock will reduce the time required to effect thorough and intimate mixing of the oil soluble precursor composition within the feedstock. However, it can also cause premature decomposition of the catalyst precursor. One can select a catalyst precursor having a decomposition temperature suitable for a given heavy oil feedstock.

The heavy oil feedstock and catalyst precursor and/or diluted precursor mixture are advantageously mixed at a temperature in a range of about 25° C. (77° F.) to about 350° C. (662° F.), or in a range of about 50° C. (122° F.) to about 300° C. (572° F.), or in a range of about 75° C. (167° F.) to about 250° C. (482° F.) to yield a conditioned feedstock.

Because the catalyst precursor is premixed with a hydrocarbon diluent to form a diluted precursor mixture, which is thereafter mixed with a heavy oil feedstock, it may be permissible for the feedstock to be at or above the decomposition temperature of the catalyst precursor. In some cases, the hydrocarbon diluent shields the individual catalyst precursor molecules and prevents them from agglomerating to form larger particles, temporarily insulates the catalyst precursor molecules from heat from the heavy oil during mixing and facilitates dispersion of the catalyst precursor molecules sufficiently quickly throughout the feedstock before decomposing to liberate metal. In addition, additional heating of the feedstock may be necessary to liberate hydrogen sulfide from sulfur-bearing molecules in the heavy oil to form the metal sulfide catalyst particles. In this way, progressive dilution of the catalyst precursor permits a high level of dispersion within the heavy oil, resulting in the formation of highly dispersed metal sulfide catalyst particles, even where the feedstock is at a temperature above the decomposition temperature of the catalyst precursor.

After the catalyst precursor has been well-mixed throughout the heavy oil to yield a conditioned feedstock, this composition is heated to cause decomposition of the catalyst precursor, which liberates catalyst metal therefrom, causes or allows catalyst metal to react with sulfur within and/or added to the heavy oil, and forms the active metal sulfide catalyst particles in situ. Metal from the catalyst precursor may initially form a metal oxide, which then reacts with sulfur in the heavy oil to yield a metal sulfide compound that forms the final active catalyst. In the case where the heavy oil includes sufficient or excess sulfur, the final activated catalyst may be formed in situ by heating the feedstock to a temperature sufficient to liberate sulfur therefrom. In some cases, sulfur may be liberated at the same temperature that the catalyst precursor decomposes. In other cases, further heating to a higher temperature may be required. Hydrogen sulfide gas can be added to heavy oil that lack sufficient sulfur to form active metal sulfide catalyst particles.

If the catalyst precursor is thoroughly mixed throughout the heavy oil, at least a substantial portion of the liberated metal ions will be sufficiently sheltered or shielded from other metal ions so that they can form a molecularly-dispersed catalyst upon reacting with sulfur to form the metal sulfide compound. Under some circumstances, minor agglomeration may occur, yielding colloidal-sized catalyst particles. However, it is believed that taking care to thoroughly mix the catalyst precursor throughout the feedstock prior to thermal decomposition of the catalyst precursor may yield individual catalyst molecules rather than colloidal particles. Simply blending, while failing to sufficiently mix, the catalyst precursor with the feedstock typically causes formation of large, agglomerated metal sulfide compounds that are micron-sized or larger.

In order to form dispersed metal sulfide catalyst particles, the conditioned feedstock is heated to a temperature in a range of about 275° C. (527° F.) to about 450° C. (842° F.), or in a range of about 310° C. (590° F.) to about 430° C. (806° F.), or in a range of about 330° C. (626° F.) to about 410° C. (770° F.).

The concentration of catalyst metal provided by the dispersed metal sulfide catalyst particles in the heavy oil can be in a range of about 1 ppm to about 150 ppm by weight, or in a range of about 5 ppm to about 95 ppm by weight, or in a range of about 10 ppm to about 90 ppm by weight, of the heavy oil and any diluents.

In the case where the heavy oil includes a significant quantity of asphaltene molecules, the dispersed metal sulfide catalyst particles may preferentially associate with or remain in close proximity to the asphaltene molecules. Asphaltene molecules can have a greater affinity for the metal sulfide catalyst particles since asphaltene molecules are generally more hydrophilic and less hydrophobic than other hydrocarbons contained in heavy oil. Because metal sulfide catalyst particles tend to be hydrophilic, the individual particles or molecules will tend to migrate toward more hydrophilic moieties or molecules within the heavy oil.

While the highly polar nature of metal sulfide catalyst particles causes or allows them to associate with asphaltene molecules, it is the general incompatibility between the highly polar catalyst compounds and hydrophobic heavy oil that necessitates the aforementioned intimate or thorough mixing of catalyst precursor within the feedstock prior to decomposition and formation of the active catalyst particles in situ. Because metal catalyst compounds are highly polar, they cannot be effectively dispersed within heavy oil if added directly. In practical terms, forming smaller active catalyst particles results in a greater number of catalyst particles that provide more evenly distributed catalyst sites throughout the heavy oil. It also increases catalyst surface area.

Thorough mixing of catalyst precursor with the heavy oil feedstock prior to thermal decomposition of the catalyst precursor and formation of dispersed metal sulfide catalyst particles substantially reduces the rate of equipment fouling, which can be measured by at least one of: (i) frequency of required heat exchanger clean-outs; (ii) frequency of switching to spare heat exchangers; (iii) frequency of filter changes; (iv) frequency of strainer clean-outs or changes; (v) rate of decrease in equipment skin temperatures, including in equipment selected from heat exchangers, separators, or distillation towers; (vi) rate of increase in furnace tube metal temperatures; (vii) rate of increase in calculated fouling resistance factors for heat exchangers and furnaces; (viii) rate of increase in differential pressure of heat exchangers; (ix) frequency of cleaning atmospheric and/or vacuum distillation towers; or (x) frequency of maintenance turnarounds.

V. Examples

Comparative Example 1

This example involves a conventional mixing system comprising a single mixing line, no parallel mixing line(s), and no bypass line. The mixing line includes one or more high shear mixers, one or more strainers or filters, one or more static inline mixers, and optionally other processing equipment known in the art. At some point during operation of the single mixing line, the mixing line requires a maintenance interval. For example, maintenance may include at least one of cleaning the one or more strainers or filters, cleaning and/or repairing the high shear mixer(s), and cleaning and/or repairing the static inline mixer(s).

Regardless of whatever portion or section of the mixing line is shut down, the mixing line is longer online, and mixing of the catalyst precursor into the heavy oil feedstock is halted. There can be one or more outcomes or consequences of shutting down the mixing line for maintenance, including halting the flow of diluted precursor mixture into the heavy oil feedstock entirely. Doing this would decrease the rate at which hydrocarbon materials are fed into the hydroprocessing reactor downstream from the mixing line, reducing throughput and/or liquid hourly space velocity.

An alternative outcome or consequence would be to continue feeding the diluted precursor mixture into the heavy oil feedstock at the same rate. Doing this maintains the same rate at which hydrocarbon materials are fed into the hydroprocessing reactor, maintaining throughput and/or liquid hourly space velocity. This would only be possible, however, if the mixing system were equipped with a bypass line, a feature that is not currently included in conventional mixing systems used to introduce a catalyst precursor into heavy oil. However, even if such a bypass line were added to an existing single-line mixing system, there would be little or no significant mixing of diluted precursor mixture into the heavy oil, causing the hydrocarbon materials fed into the pre-heater and/or hydroprocessing reactor to contain concentrated regions of diluted precursor mixture containing a more concentrated form of catalyst precursor compared to when the mixing line is online. If the diluted precursor mixture in a more concentrated form were then exposed to high temperatures to cause decomposition of the catalyst precursor, this would result in the formation of substantially larger homogenous catalyst particles e.g., that are 1-300 μm in size, compared to dispersed metal sulfide catalyst particles less than 1 μm in size that are formed in situ when there is thorough mixing of diluted precursor mixture into the heavy oil feedstock prior to thermal decomposition of the catalyst precursor.

Another alternative outcome or consequence would be to continue feeding the hydrocarbon diluent, without the catalyst precursor, into the heavy oil feedstock at the same rate. Again, this would require adding a bypass line to a conventional mixing system that does not include a bypass line. Doing this would essentially maintain the same rate at which hydrocarbon materials are fed into the hydroprocessing reactor, essentially maintaining throughput and/or liquid hourly space velocity. However, without the catalyst precursor, there would be no in situ formation of dispersed metal sulfide catalyst particles or other homogeneous catalyst in the heavy oil feedstock. In such case, the hydroprocessing system would no longer have such in situ formed catalyst in the system but must then rely on the ebullated bed catalyst, fixed bed catalyst, or other catalyst already used in the hydroprocessing reactor.

Yet another alternative is some hybrid of reducing, but not entirely stopping, the flow of diluted precursor mixture into the heavy oil and/or the flow of catalyst precursor into the hydrocarbon diluent. Any of such alternatives would be dependent upon adding a bypass line to a conventional mixing system that does not include a bypass line. They would also essentially eliminate the in situ formation of dispersed metal sulfide catalyst particles having a particles size of less than 1 μm within the heavy oil feedstock.

Comparative Example 2

This example involves a mixing system comprising two full-scale mixing lines that operate independently of each other to mix the entirety of the catalyst precursor mixture into the heavy oil feedstock. Each full-scale mixing line includes one or more high shear mixers, one or more strainers or filters, one or more static inline mixers, and optionally other processing equipment known in the art. When one full-scale mixing line is online and functioning, the other is offline, and vice versa. In this way, whenever one mixing line requires maintenance, the other mixing line performs the entirety of the mixing process with the same mixing efficiency.

Even though providing two full-scale mixing lines can solve many or most of the problems in Comparative Example 1, such mixing system is expensive and wasteful, having twice as much mixing capacity but at approximately double the cost, with half of the mixing system remaining offline and lying dormant at any given time, even when no maintenance is being performed.

Example 3

This example involves a mixing system of the invention comprising two parallel mixing lines and a bypass line. Each mixing line includes one or more high shear mixers, one or more strainers or filters, optionally one or more static inline mixers, and optionally other processing equipment known in the art. The mixing system may optionally include a common static inline mixer upstream from where the two parallel mixing lines diverge. At various times during operation of the mixing system, one of the two parallel mixing lines will require maintenance. For example, a maintenance interval may include at least one of cleaning the one or more strainers or filters, cleaning and/or repairing the high shear mixer(s), and cleaning and/or repairing the static inline mixer(s).

Regardless of whatever portion or section of a mixing line is shut down, the mixing line being maintained is taken offline, and mixing of the catalyst precursor into the heavy oil feedstock is halted through that line. However, the other parallel mixing line remains online to continue mixing the diluted precursor mixture with at least 50% of the heavy oil feedstock to form a conditioned feedstock, with the remaining 50% or less of the feedstock being diverted through the bypass line to rejoin the conditioned feedstock downstream from the remaining mixing line. While mixing efficiency may be reduced when one parallel mixing line is offline, the overall mixing process is substantially improved relative to Comparative Example 1 because the mixing system of Example 3 is still able to provide a conditioned feedstock that forms dispersed metal sulfide catalyst particles in situ within the heavy oil feedstock. In addition, throughput and/or liquid hourly space velocity can be maintained more easily than in Comparative Example 1.

Even though diverting a portion of the heavy oil feedstock through the bypass line during a maintenance interval may reduce the overall mixing efficiency of the mixing system, the drop in overall mixing efficiency can be partially mitigated by increasing the flow rate through the remaining mixing line, subject to its capacity limitations. This increases the mixing efficiency of the remaining mixing line compared to where the flow rate through that mixing line is maintained at approximately 50% of the overall flow rate through the mixing system.

For example, when operating the parallel mixing lines, each mixing line can be operated to mix diluted catalyst precursor mixture into approximately 50% of the total volume of heavy oil feedstock flowing through the mixing system. However, when one of the mixing lines is shut down for maintenance, the remaining parallel mixing line can be temporarily operated at higher flow rate, subject to its capacity limitations, in order to mix diluted precursor mixture with a higher quantity of heavy oil feedstock, such as approximately 55%, 60%, 65%, 70%, or 75% of the total volume of heavy oil feedstock flowing through the mixing system, with the remainder of heavy oil feedstock (approximately 45%, 40%, 35%, 30%, or 25%, respectively) flowing through the bypass line to maintain the same overall throughput of heavy oil through the mixing system and/or the same liquid hourly space velocity of heavy oil through the hydroprocessing reactor.

Example 4

This example involves a mixing system of the invention comprising three parallel mixing lines and a bypass line. Each mixing line includes one or more high shear mixers, one or more strainers or filters, optionally one or more static inline mixers, and optionally other processing equipment known in the art. The mixing system may optionally include a common static inline mixer upstream from where the three parallel mixing lines diverge. At various times during operation of the mixing system, one of the three parallel mixing lines will require maintenance. For example, a maintenance interval may include at least one of cleaning the one or more strainers or filters, cleaning and/or repairing the high shear mixer(s), and cleaning and/or repairing the static inline mixer(s).

Regardless of whatever portion or section of a mixing line is shut down, the mixing line being maintained is taken offline, and mixing of the catalyst precursor into the heavy oil feedstock is halted through that line. However, the other parallel mixing lines remain online to continue mixing the diluted precursor mixture with at least 67% of the heavy oil feedstock to form a conditioned feedstock, with the remaining 33% or less of the feedstock being diverted through the bypass line to rejoin the conditioned feedstock downstream from the remaining mixing line. While mixing efficiency may be reduced when one parallel mixing line is offline, the overall mixing process is substantially improved relative to Comparative Example 1 because the mixing system of Example 4 is still able to provide a conditioned feedstock that forms dispersed metal sulfide catalyst particles in situ within the heavy oil feedstock. In addition, throughput and/or liquid hourly space velocity can be maintained more easily.

Even though diverting a portion of the heavy oil feedstock through the bypass line during a maintenance interval may reduce overall mixing efficiency of the mixing system, the drop in overall mixing efficiency can be partially mitigated by increasing the flow rate through the remaining mixing lines, subject to their capacity limitations. This increases the mixing efficiency of each remaining mixing line compared to where the flow rate through that mixing line is maintained at approximately 33% of the overall flow rate through the mixing system.

For example, when operating the parallel mixing lines, each mixing line can be operated to mix diluted catalyst precursor mixture into approximately 33% of the total volume of heavy oil feedstock flowing through the mixing system. However, when one of the parallel mixing lines is shut down for maintenance, the remaining mixing lines can be temporarily operated at higher flow rates, subject to their capacity limitations, in order to mix diluted precursor mixture with a higher quantity of heavy oil feedstock, such as at a combined volume that is approximately 70%, 75%, 80%, 85%, or 90% of the total volume of heavy oil feedstock flowing through the mixing system, with the remaining heavy oil feedstock (approximately 30%, 25%, 20%, 15%, or 10%, respectively, of the total) flowing through the bypass line to maintain the same overall throughput of heavy oil through the mixing system and/or the same liquid hourly space velocity of heavy oil through the hydroprocessing reactor.

Example 5

This example involves a mixing system of the invention comprising four parallel mixing lines and a bypass line. Each mixing line includes one or more high shear mixers, one or more strainers or filters, optionally one or more static inline mixers, and optionally other processing equipment known in the art. The mixing system may optionally include a common static inline mixer upstream from where the four parallel mixing lines diverge. At various times during operation of the mixing system, one of the four parallel mixing lines will require maintenance. For example, a maintenance interval may include at least one of cleaning the one or more strainers or filters, cleaning and/or repairing the high shear mixer(s), and cleaning and/or repairing the static inline mixer(s).

Regardless of whatever portion or section of a mixing line is shut down, the mixing line being maintained is taken offline, and mixing of the catalyst precursor into the heavy oil feedstock is halted through that line. However, the other parallel mixing lines remain online to continue mixing the diluted precursor mixture with at least 75% of the heavy oil feedstock to form a conditioned feedstock, with the remaining 25% or less of the feedstock being diverted through the bypass line to rejoin the conditioned feedstock downstream from the remaining mixing line. While mixing efficiency may be reduced when one parallel mixing line is offline, the overall mixing process is substantially improved relative to Comparative Example 1 because the mixing system of Example 5 is still able to provide a conditioned feedstock that forms dispersed metal sulfide catalyst particles in situ within the heavy oil feedstock. In addition, throughput and/or liquid hourly space velocity can be maintained more easily.

Even though diverting a portion of the heavy oil feedstock through the bypass line during a maintenance interval may reduce overall mixing efficiency of the mixing system, the drop in overall mixing efficiency can be partially or substantially mitigated by increasing the flow rate through the remaining mixing lines, subject to their capacity limitations. This increases the mixing efficiency of each remaining mixing line compared to where the flow rate through that mixing line is maintained at approximately 25% of the overall flow rate through the mixing system.

For example, when operating the parallel mixing lines, each mixing line can be operated to mix diluted catalyst precursor mixture into approximately 25% of the total volume of heavy oil feedstock flowing through the mixing system. However, when one of the parallel mixing lines is shut down for maintenance, the remaining mixing lines can be temporarily operated at higher flow rates, subject to their capacity limitations, in order to mix diluted precursor mixture with a higher quantity of heavy oil feedstock, such as at a combined volume that is approximately 77%, 80%, 83%, 86%, 89%, 92%, or 95% of the total volume of heavy oil feedstock flowing through the mixing system, with the remainder of heavy oil feedstock (approximately 23%, 20%, 17%, 14%, 11%, 8%, or 5%, respectively, of the total) flowing through the bypass line to maintain the same overall throughput of heavy oil through the mixing system and/or the same liquid hourly space velocity of heavy oil through the hydroprocessing reactor.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of mixing a catalyst precursor into a heavy oil feedstock, comprising:

blending a quantity of catalyst precursor with a quantity of diluent to form a diluted precursor mixture and feeding the diluted precursor mixture and the heavy oil feedstock into a common feed line, which splits into a plurality of parallel mixing lines;

mixing the diluted precursor mixture with the heavy oil feedstock using the plurality of parallel mixing lines to form a plurality of conditioned feedstock streams, each parallel mixing line including one or more mixers, including a high shear mixer, and one or more valves that can be selectively opened and closed for regulating flow rate in the mixing line;

combining the conditioned feedstock streams from the parallel mixing lines in a common discharge line downstream from the parallel mixing lines to form a common conditioned feedstock stream;

stopping flow through a selected mixing line by closing at least one valve of the selected mixing line to take it offline, continuing flow through one or more mixing lines that remain online, and restricting flow through the common discharge line by partially closing at least one valve downstream from the high shear mixer of the one or more mixing lines that remain online to increase upstream pressure, thereby causing or allowing a portion of the heavy oil feedstock to enter a bypass line upstream of where the diluted precursor mixture enters the common feed line, bypass the parallel mixing lines, and combine with the common conditioned feedstock stream in the common discharge line; and while the portion of the heavy oil feedstock is passing through the bypass line, continuing to mix at least a portion of the diluted precursor mixture with a remaining portion of the heavy oil feedstock by the one or more parallel mixing lines that remain online.

2. The method of claim 1, wherein the parallel mixing lines comprise two parallel mixing lines, wherein when the selected mixing line is offline a second mixing line remains online.

3. The method of claim 1, wherein the parallel mixing lines comprise three or more parallel mixing lines, wherein when the selected mixing line is offline at least two other mixing lines remain online.

4. The method of claim 1, wherein each parallel mixing line further includes a static inline mixer and a strainer.

5. The method of claim 1, wherein stopping flow through the selected mixing line comprises closing a first valve upstream of the one or more mixers and a second valve downstream of the high shear mixture of the selected mixing line to isolate the selected mixing line without pressurized hydrocarbons entering the selected mixing line from one or more other mixing lines, the method further comprising performing maintenance on the selected mixing line while it is offline.

6. The method of claim 1, wherein a portion of the heavy oil feedstock is caused to enter the bypass line, bypass the parallel mixing lines, and combine with the common conditioned feedstock stream in the common discharge line by partially closing a valve of a second mixing line downstream from the higher shear mixer of the second mixing line and/or partially closing a valve of the common discharge line upstream of where heavy oil from the bypass line combines with the common discharge line to restrict flow and increase upstream pressure in the common feed line.

7. The method of claim 1, further comprising mixing a same or similar quantity of the diluted precursor mixture with the remaining portion of the heavy oil feedstock when the selected mixing line is offline and the portion of the heavy oil feedstock bypasses the mixing lines and recombines with the common conditioned feedstock stream in the common discharge line.

8. The method of claim 1, further comprising measuring flow rate through the common discharge line using a first flow meter, measuring flow rate through the bypass line using a second flow meter, and adjusting one or more valves to maintain a desired balance of flow between the one or more parallel mixing lines that remain online and the bypass line during maintenance of the selected mixing line when offline.

9. The method of claim 1, further comprising measuring flow rate through each parallel mixing line using a corresponding flow meter associated with the parallel mixing line and adjusting one or more valves to maintain desired flow rates between the parallel mixing lines.

10. The method of claim 1, further comprising adjusting flow rate through one or more of the parallel mixing lines, the common discharge line, or the bypass line by selectively opening or closing one or more valves associated with the parallel mixing lines, the common discharge line, or the bypass line.

11. The method of claim 1, further comprising using a portion of the heavy oil feedstock as a diluent to form the diluted precursor mixture.

12. The method of claim 1, further comprising introducing the common conditioned feedstock stream from the common discharge line and any heavy oil feedstock from the bypass line into a surge tank, the surge tank causing or allowing further mixing of the catalyst precursor throughout the heavy oil feedstock.

13. The method of claim 12, further comprising using a portion of a conditioned feedstock from the surge tank as a diluent to form the diluted precursor mixture.

14. The method of claim 1, further comprising heating the conditioned feedstock downstream from the common discharge line to decompose the catalyst precursor and form dispersed metal sulfide catalyst particles throughout the heavy oil feedstock.

15. The method of claim 14, wherein the dispersed metal sulfide catalyst particles are less than 1 μm in size, or less than about 500 nm in size, or less than about 250 nm in size, or less than about 100 nm in size, or less than about 50 nm in size, or less than about 25 nm in size, or less than about 10 nm in size.

16. The method of claim 1, further comprising causing or allowing the catalyst precursor to form dispersed metal sulfide catalyst particles in situ within the heavy oil feedstock and hydroprocessing the heavy oil feedstock at hydroprocessing conditions to form converted products, the dispersed metal sulfide catalyst particles promoting beneficial upgrading reactions.

17. The method of claim 16, wherein hydroprocessing is performed by at least one hydroprocessing reactor selected from slurry phase reactor, ebullated bed reactor, and fixed bed reactor.

18. A method of mixing a catalyst precursor into a heavy oil feedstock, comprising:

blending a quantity of catalyst precursor with a quantity of diluent to form a diluted precursor mixture and feeding the diluted precursor mixture and the heavy oil feedstock into a common feed line, which splits into a plurality of parallel mixing lines;

during normal operation, mixing the diluted precursor mixture with the heavy oil feedstock using a plurality of parallel mixing lines to form a plurality of conditioned feedstock streams, each parallel mixing line including one or more mixers, including a high shear mixer, a first valve upstream of the one or more mixers, and a second valve downstream of the high shear mixer that can be selectively opened and closed for regulating flow rate in the mixing line;

combining the conditioned feedstock streams from the parallel mixing lines in a common discharge line downstream from the parallel mixing lines to form a common conditioned feedstock stream having a total flow rate during normal operation, wherein the common discharge line includes a common flow control valve;

during modified operation, stopping flow through a selected mixing line by closing at least one of the first valve or the second valve of the selected mixing line to take it offline, continuing flow through one or more mixing lines that remain online, and restricting flow of conditioned feedstock in the common discharge line by partially closing the common flow control valve to increase upstream pressure, thereby causing or allowing a portion of the heavy oil feedstock to enter a bypass line, bypass the parallel mixing lines, and combine with the common conditioned feedstock stream in the common discharge line downstream of the common flow control valve;

while the portion of the heavy oil feedstock is passing through the bypass line, continuing to mix at least a portion of the diluted precursor mixture with a remaining portion of the heavy oil feedstock by at least one other of the parallel mixing lines that remains operational.

19. The method of claim 18, wherein the parallel mixing lines comprise two parallel mixing lines, wherein when the selected mixing line is offline a second mixing line remains online.

20. The method of claim 19, wherein the flow rate in the second mixing line is higher during modified operation than the flow rate during normal operation.

21. The method of claim 20, wherein the flow rate in the bypass line is less than the flow rate in the second mixing line.

22. The method of claim 18, wherein stopping flow through the selected mixing line to take it offline comprises closing the first valve and the second valve to isolate the selected mixing line.

23. The method of claim 18, further comprising mixing a same or similar quantity of the diluted precursor mixture with the remaining portion of the heavy oil feedstock when the selected mixing line is offline and the portion of the heavy oil feedstock bypasses the mixing lines and recombines with the common conditioned feedstock stream in the common discharge line.

24. The method of claim 18, further comprising adjusting a valve of the bypass line to maintain the same or similar flow rate in the common discharge line during modified operation as the total flow rate during normal operation.

25. The method of claim 18, further comprising mixing the conditioned feedstock with the heavy oil feedstock from the bypass line during modified operation in a surge tank to cause mixing of the catalyst precursor from the conditioned feedstock with the heavy oil feedstock.

26. A method of mixing a catalyst precursor into a heavy oil feedstock, comprising:

blending a quantity of catalyst precursor with a quantity of diluent to form a diluted precursor mixture and feeding the diluted precursor mixture and the heavy oil feedstock into a common feed line, which splits into a plurality of parallel mixing lines;

during normal operation, mixing the diluted precursor mixture with the heavy oil feedstock using the plurality of parallel mixing lines to form a plurality of conditioned feedstock streams, each parallel mixing line including one or more mixers, including a high shear mixer, and one or more valves that can be selectively opened and closed for regulating flow rate in the mixing line;

combining the conditioned feedstock streams from the parallel mixing lines in a common discharge line downstream from the parallel mixing lines to form a common conditioned feedstock stream having a total flow rate during normal operation, wherein the common discharge line includes a common flow control value;

during modified operation, stopping flow through a selected mixing line by closing at least one valve of the selected mixing line to take it offline, continuing flow through one or more mixing lines that remain online, and restricting flow of conditioned feedstock by adjusting flow at least in part by partially closing the common flow control valve of the common discharge line to increase upstream pressure, thereby causing or allowing a portion of the heavy oil feedstock to enter a bypass line upstream of where the diluted precursor mixture enters the common feed line, bypass the parallel mixing lines, and combine with the common conditioned feedstock stream in the common discharge line downstream from the common flow control valve of the common discharge line; and while the portion of the heavy oil feedstock is passing through the bypass line, continuing to mix at least a portion of the diluted precursor mixture with a remaining portion of the heavy oil feedstock by the one or more parallel mixing lines that remain online.

27. The method of claim 26, wherein the flow rate in the one or more parallel mixing lines that remain online is higher during modified operation than the flow rate through these one or more parallel mixing lines during normal operation.

28. The method of claim 27, wherein the flow rate in the bypass line is less than the flow rate in the one or more parallel mixing lines that remain online.

29. The method of claim 26, further comprising adjusting a valve of the bypass line to maintain a same or similar flow rate in the common discharge line during modified operation as the total flow rate in the common discharge line during normal operation.

30. The method of claim 26, further comprising mixing the conditioned feedstock with the heavy oil feedstock from the bypass line during modified operation in a surge tank to cause mixing of the catalyst precursor from the conditioned feedstock with the heavy oil feedstock.

31. The method of claim 26, further comprising mixing a same or similar quantity of the diluted precursor mixture with the remaining portion of the heavy oil feedstock when the selected mixing line is offline and the portion of the heavy oil feedstock bypasses the mixing lines and recombines with the common conditioned feedstock stream in the common discharge line.

* * * * *